March 8, 1955 S. J. FINN 2,703,420
MACHINE FOR SHAPING UPPERS OVER LASTS
Filed July 11, 1952 30 Sheets-Sheet 7
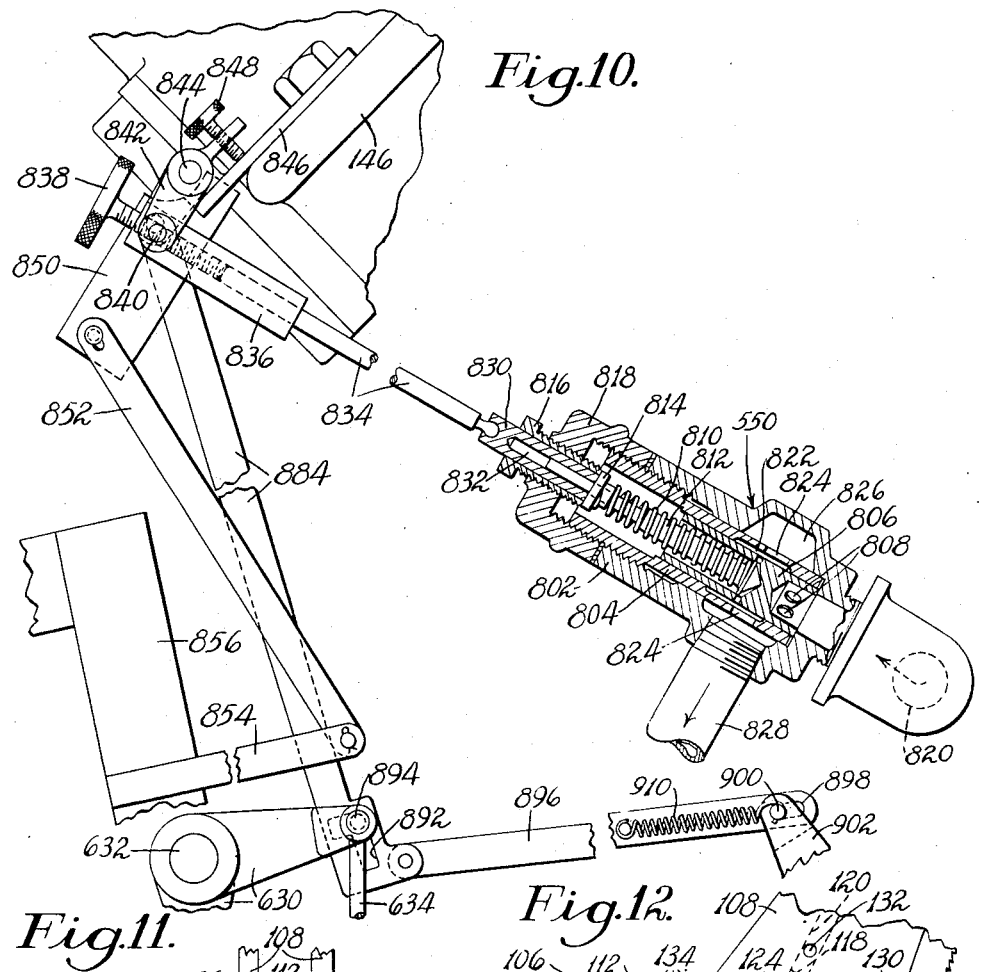
*Inventor*
Sidney J. Finn
By his Attorney

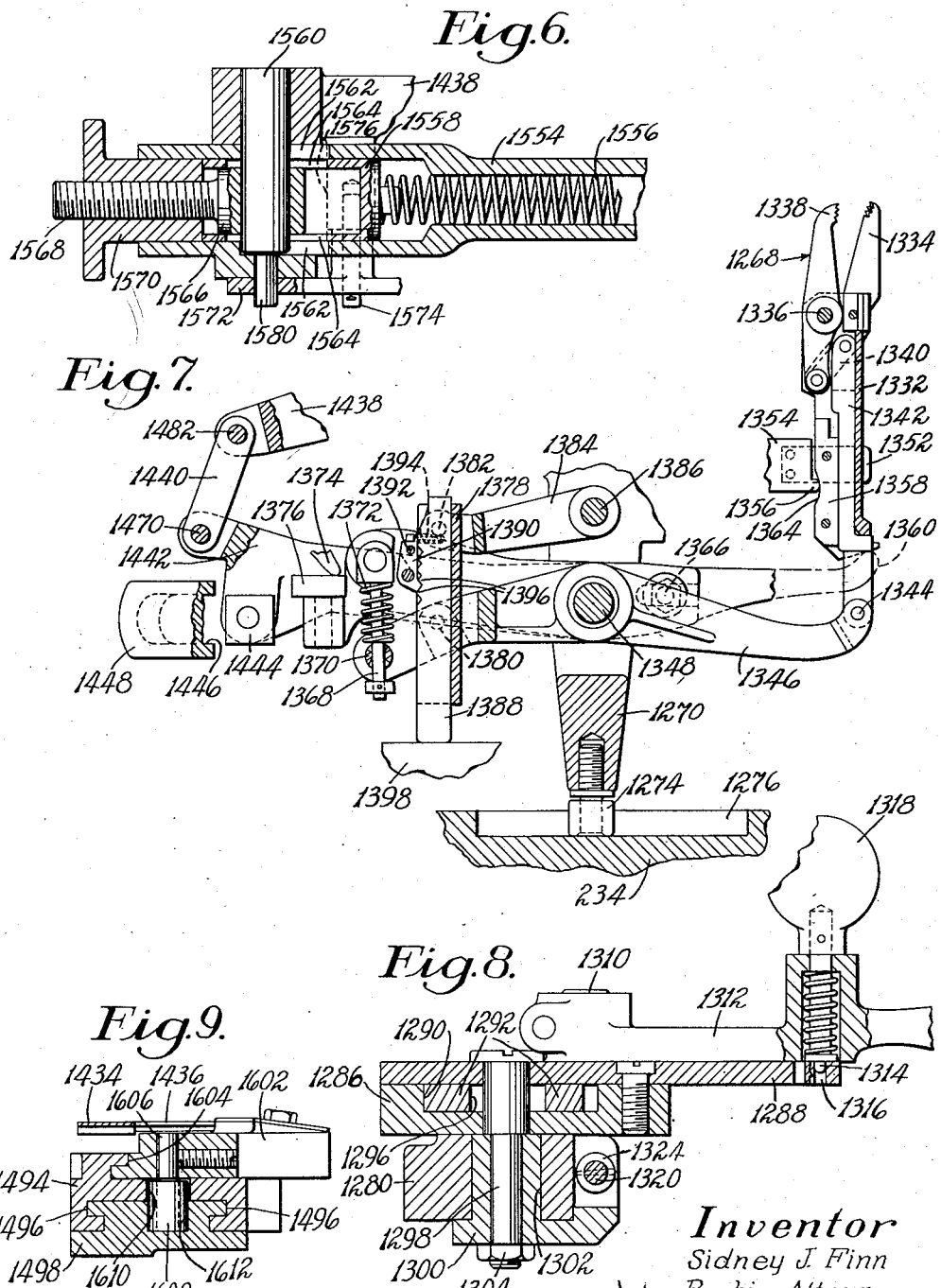

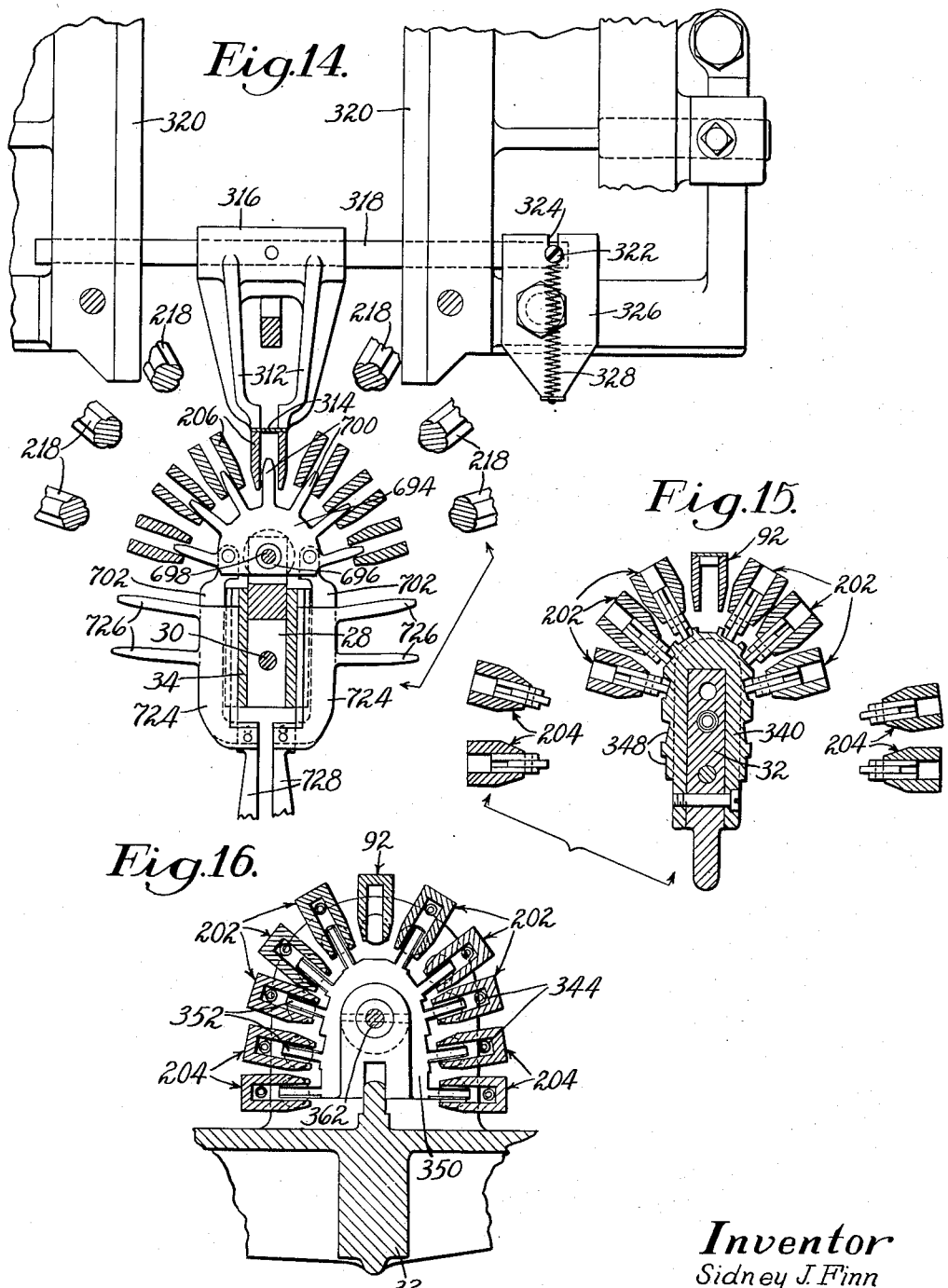

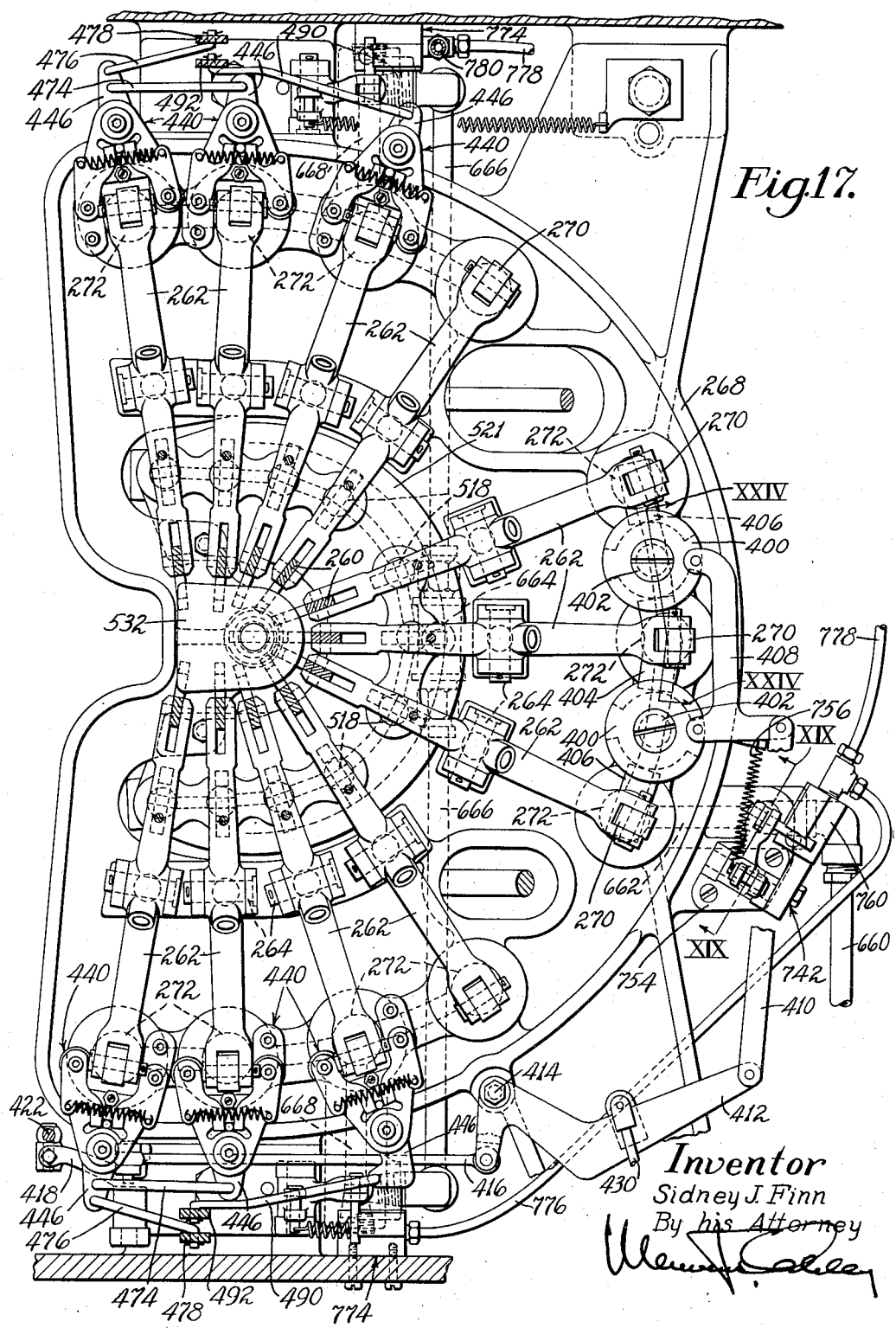

March 8, 1955  S. J. FINN  2,703,420
MACHINE FOR SHAPING UPPERS OVER LASTS
Filed July 11, 1952  30 Sheets-Sheet 11
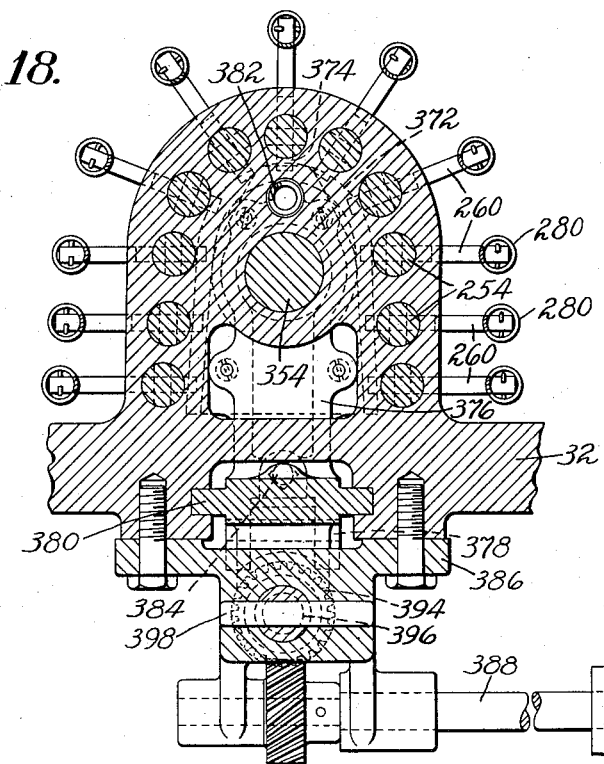
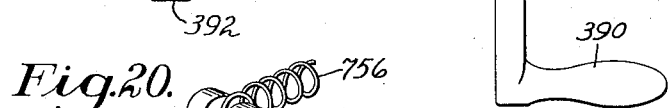
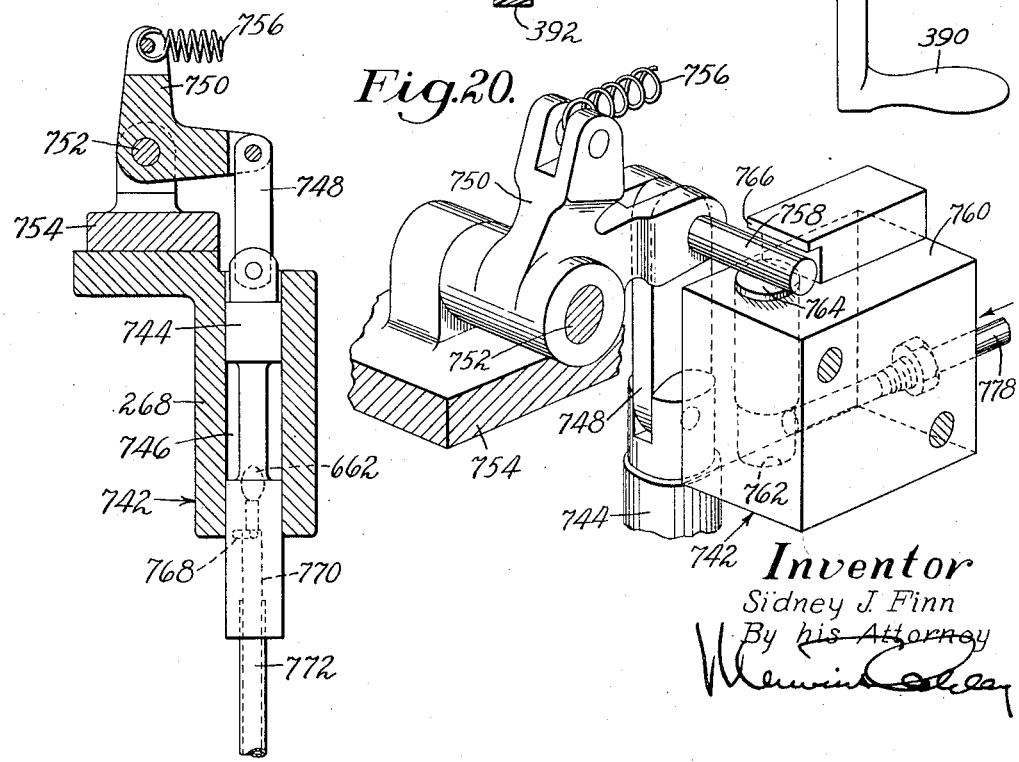
Inventor
Sidney J. Finn
By his Attorney March 8, 1955 S. J. FINN 2,703,420
MACHINE FOR SHAPING UPPERS OVER LASTS
Filed July 11, 1952
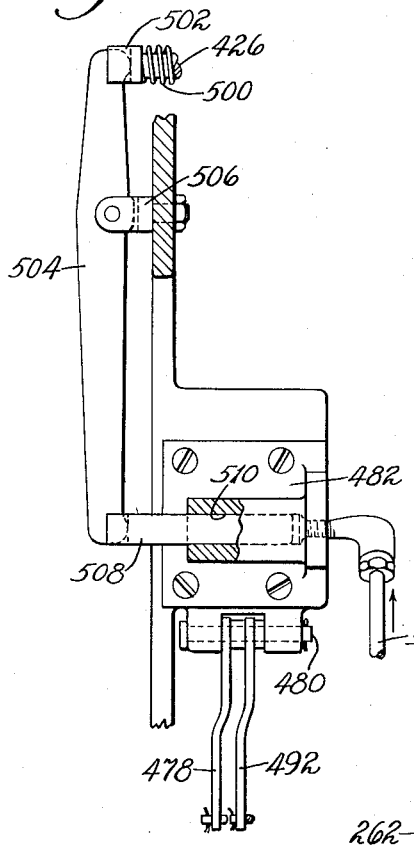
Fig. 21.
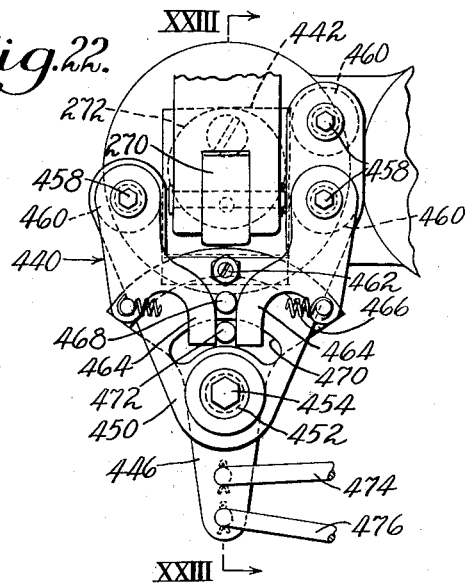
Fig. 22.
Fig. 23.
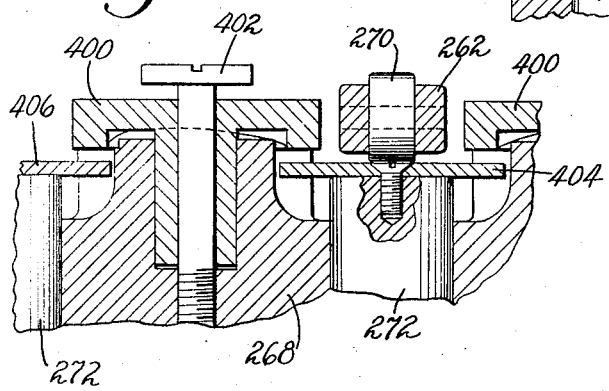
Fig. 24.
Inventor
Sidney J. Finn
By his Attorney

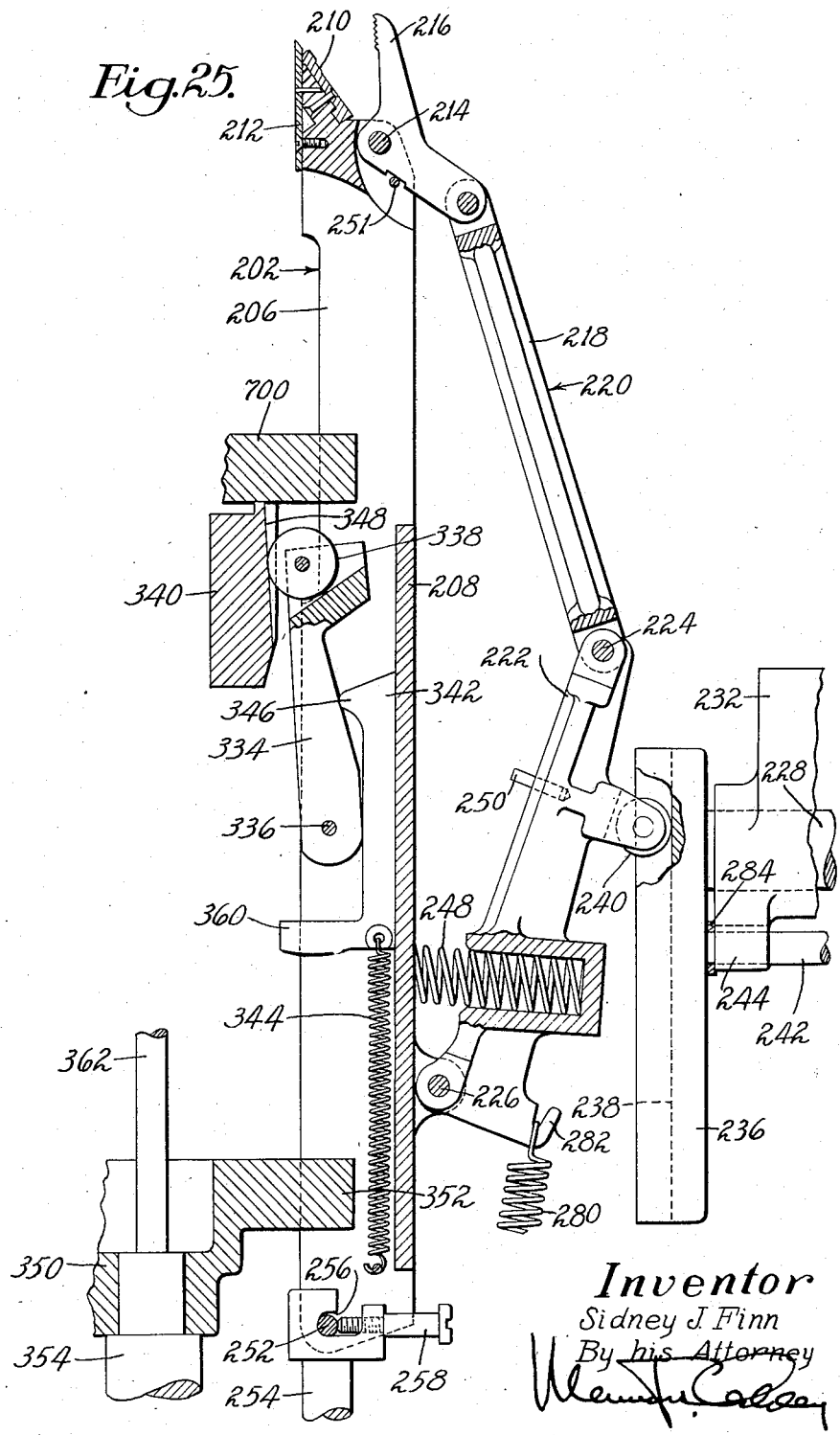

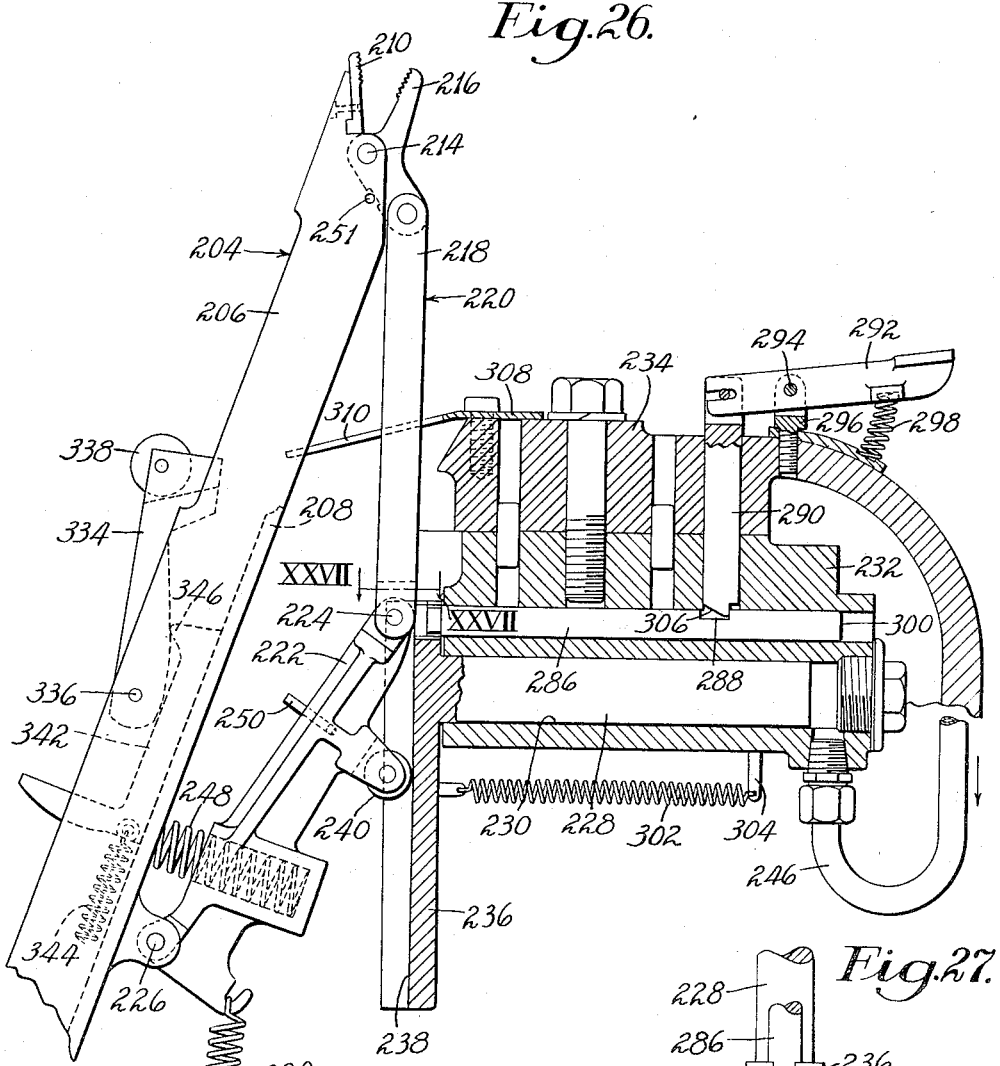

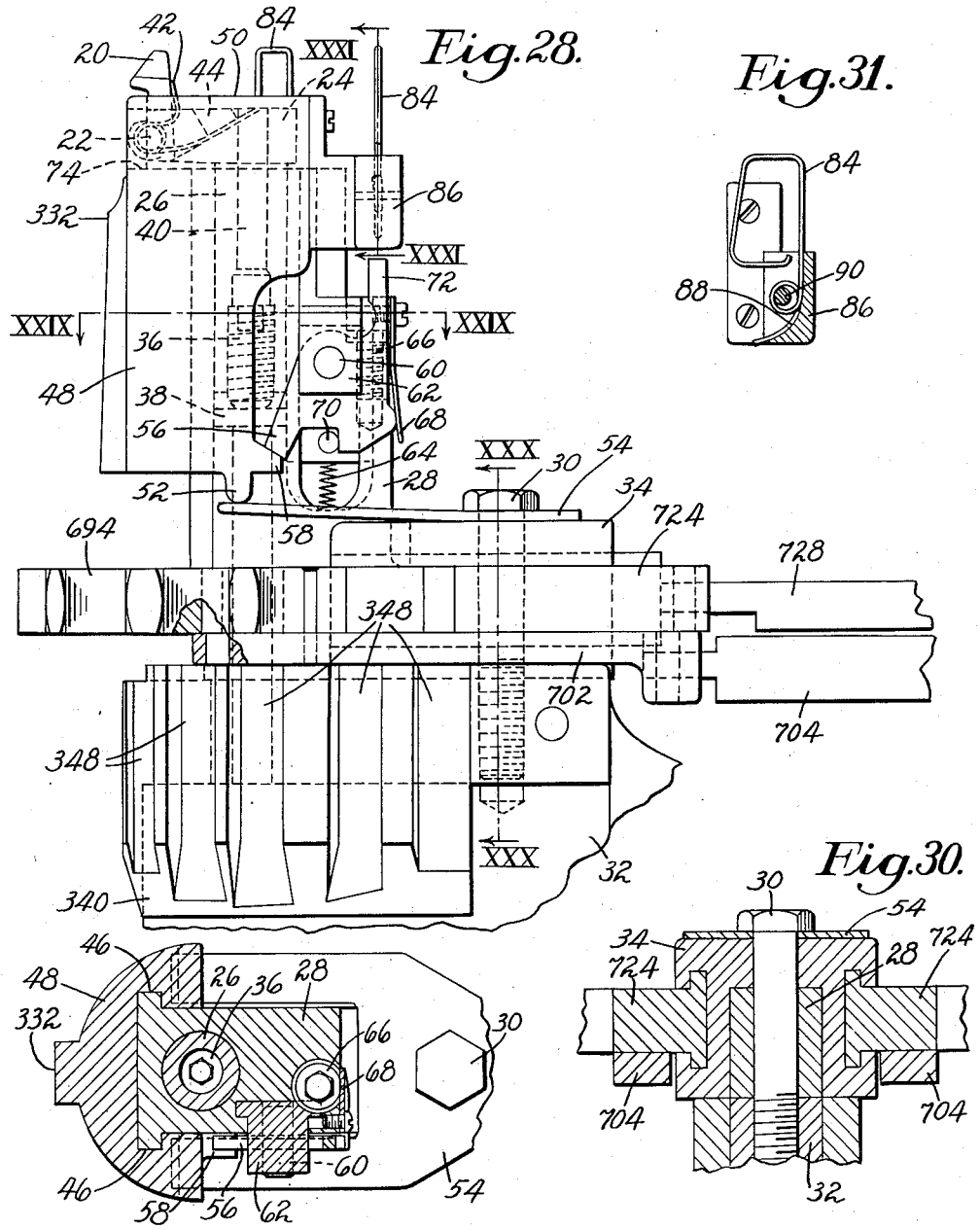

March 8, 1955 S. J. FINN 2,703,420
MACHINE FOR SHAPING UPPERS OVER LASTS
Filed July 11, 1952 30 Sheets-Sheet 16

Inventor
Sidney J. Finn
By his Attorney

March 8, 1955  S. J. FINN  2,703,420
MACHINE FOR SHAPING UPPERS OVER LASTS
Filed July 11, 1952  30 Sheets-Sheet 17

Inventor
Sidney J. Finn
By his Attorney

March 8, 1955     S. J. FINN     2,703,420
MACHINE FOR SHAPING UPPERS OVER LASTS
Filed July 11, 1952     30 Sheets-Sheet 18
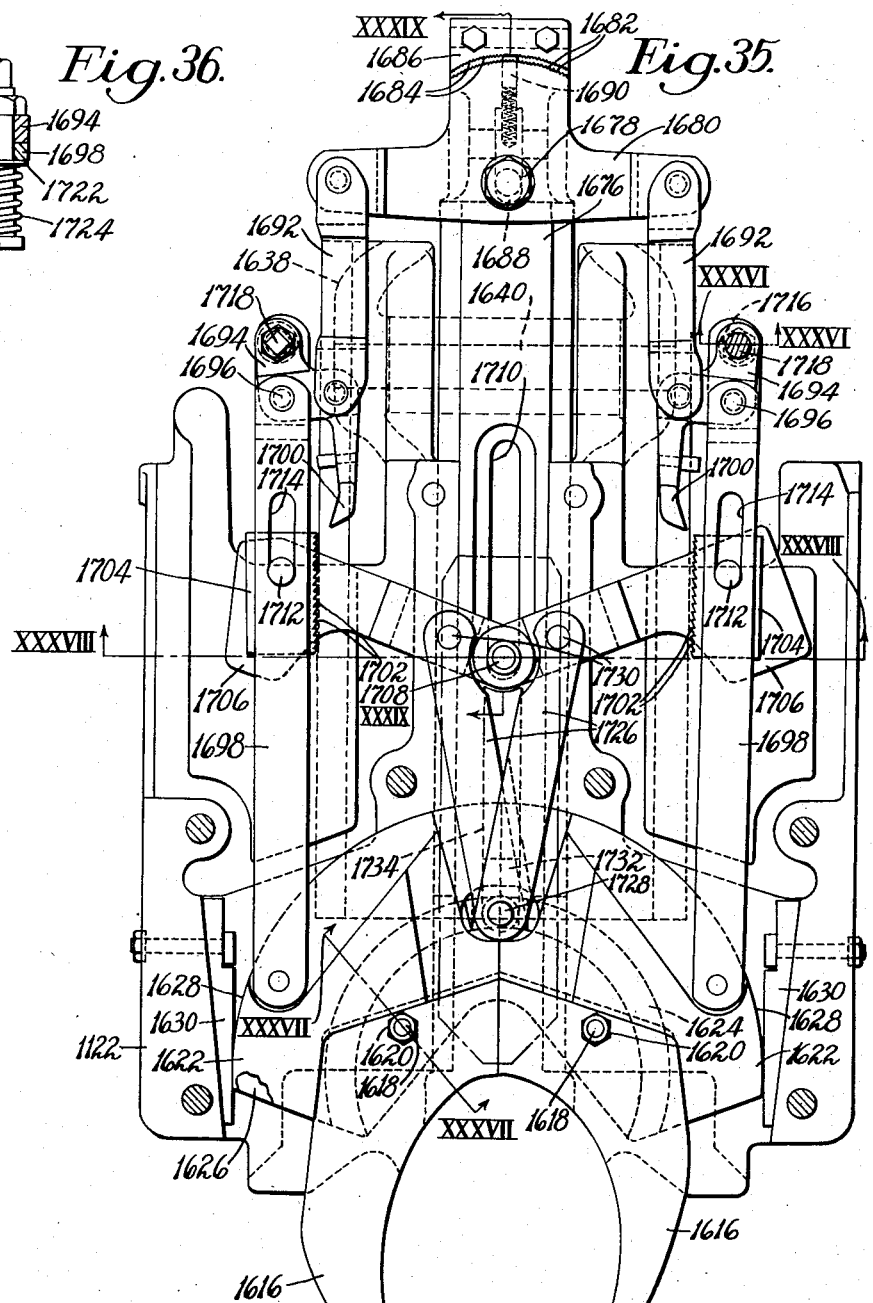
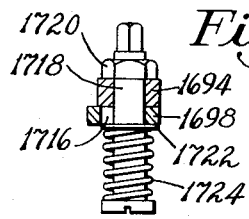
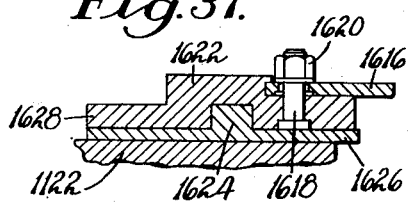
Inventor
Sidney J. Finn
By his Attorney March 8, 1955  S. J. FINN  2,703,420
MACHINE FOR SHAPING UPPERS OVER LASTS
Filed July 11, 1952  30 Sheets-Sheet 19

Inventor
Sidney J. Finn
By his Attorney

March 8, 1955 S. J. FINN 2,703,420
MACHINE FOR SHAPING UPPERS OVER LASTS
Filed July 11, 1952 30 Sheets-Sheet 20

*Inventor*
Sidney J. Finn
By his Attorney

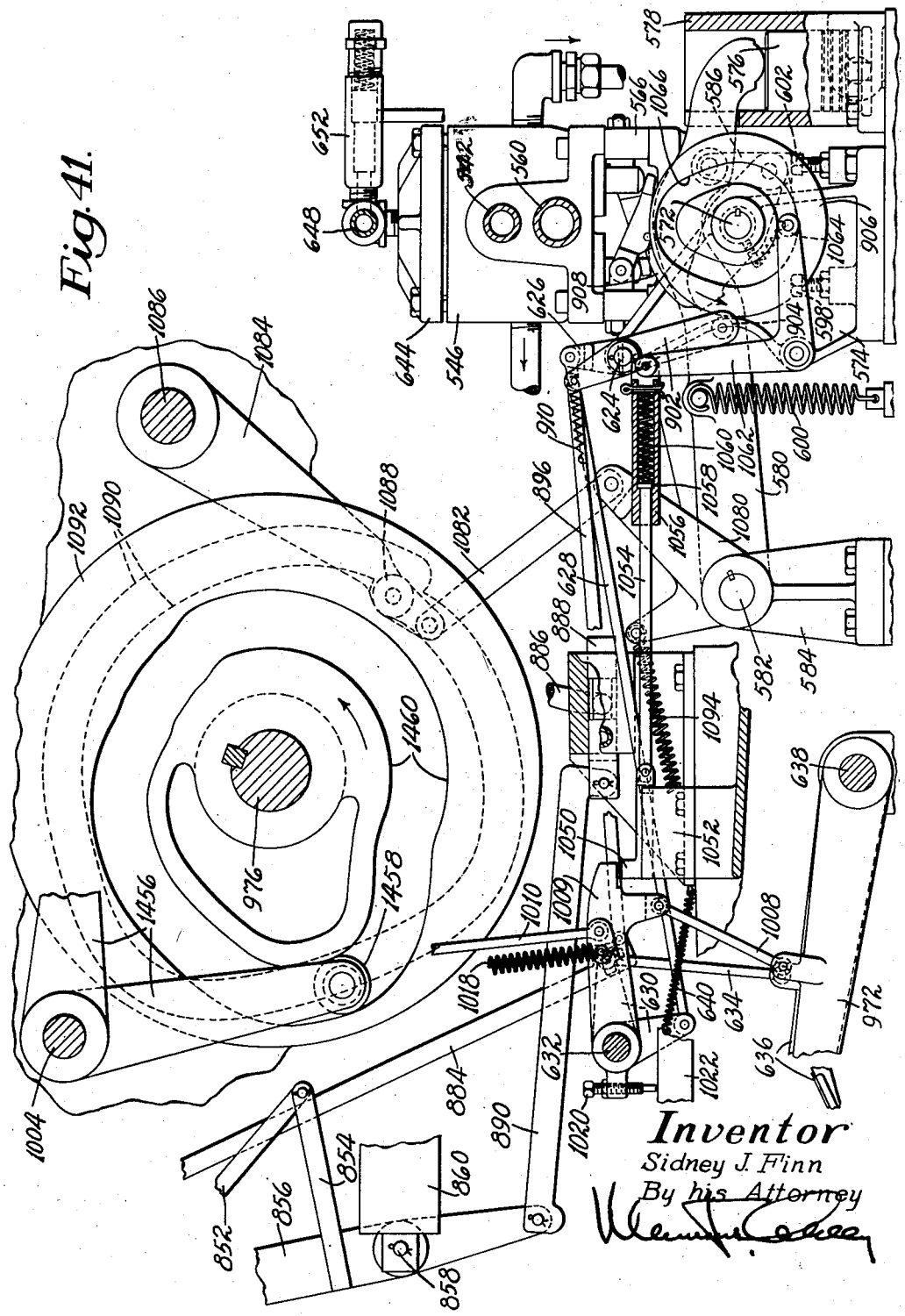

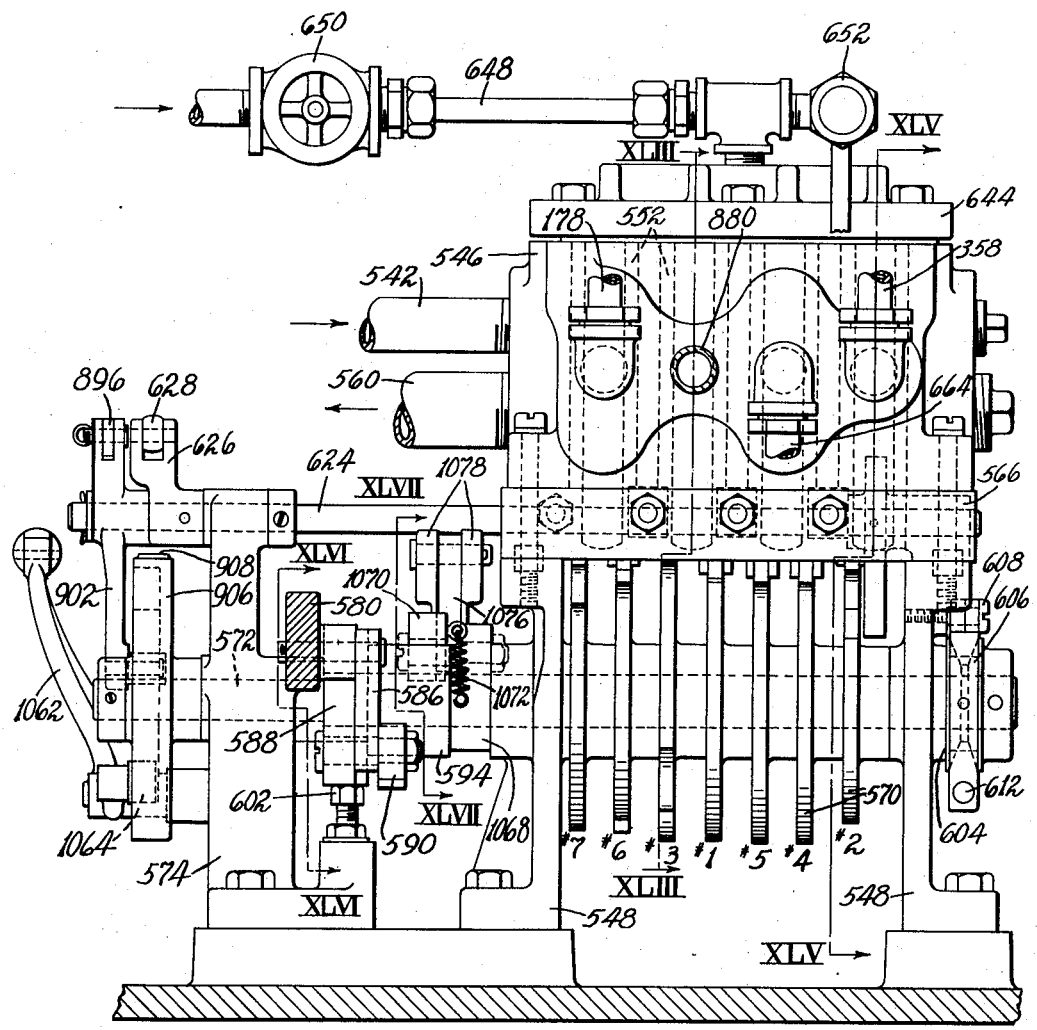

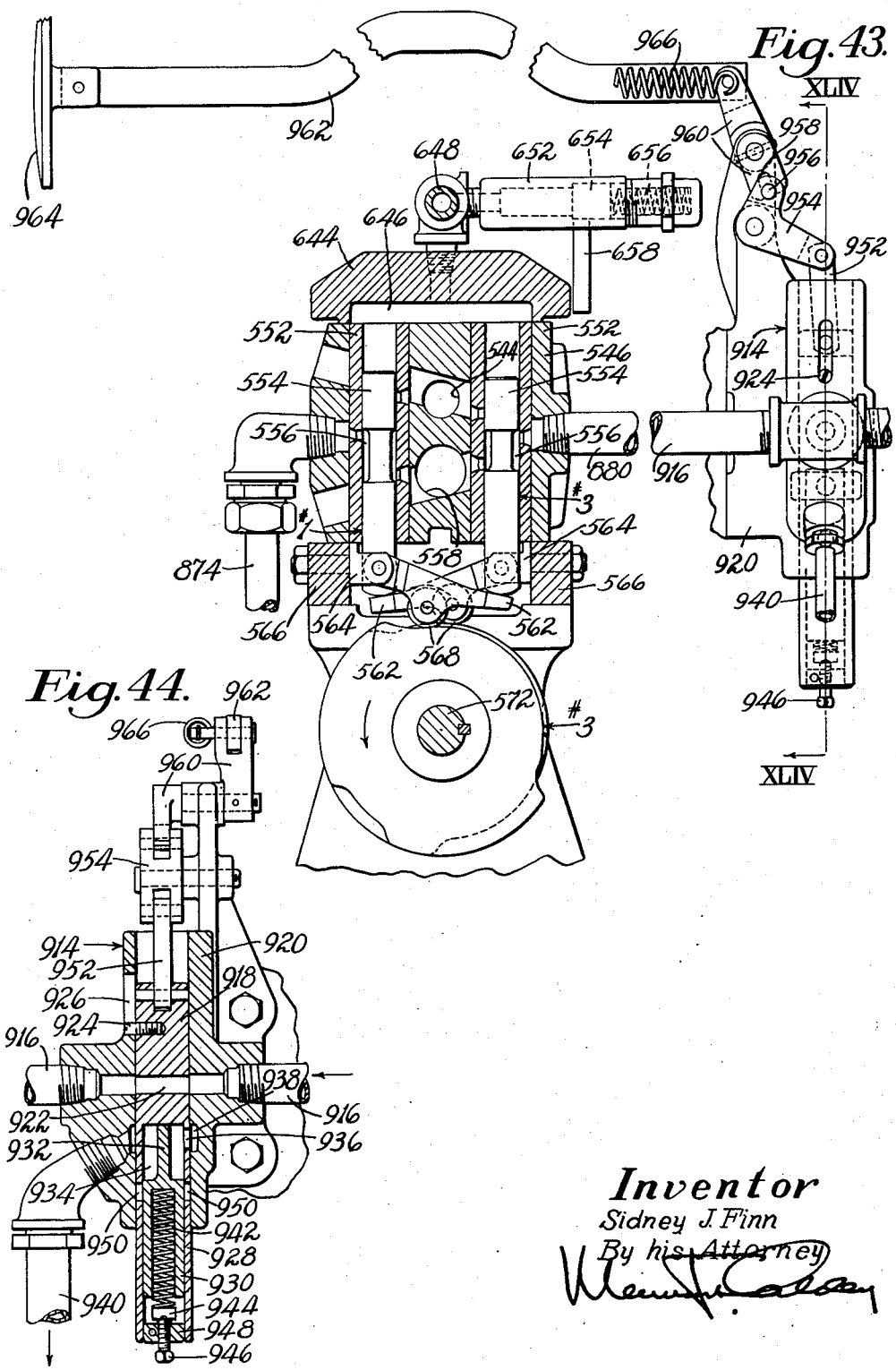

March 8, 1955 S. J. FINN 2,703,420
MACHINE FOR SHAPING UPPERS OVER LASTS
Filed July 11, 1952 30 Sheets-Sheet 24

Inventor
Sidney J. Finn
By his Attorney

March 8, 1955  S. J. FINN  2,703,420
MACHINE FOR SHAPING UPPERS OVER LASTS
Filed July 11, 1952  30 Sheets-Sheet 25
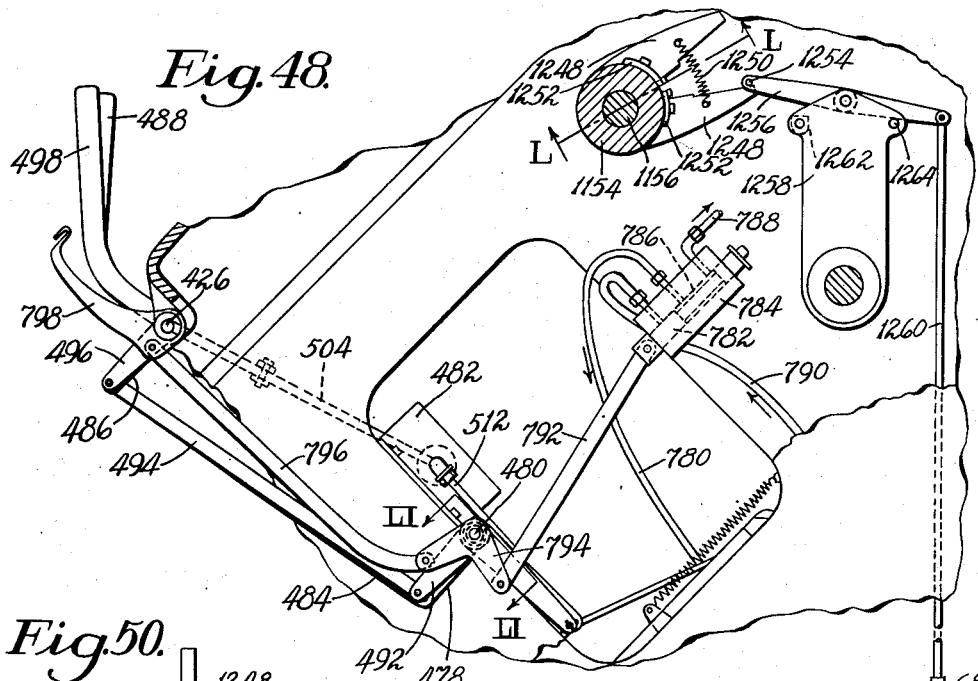
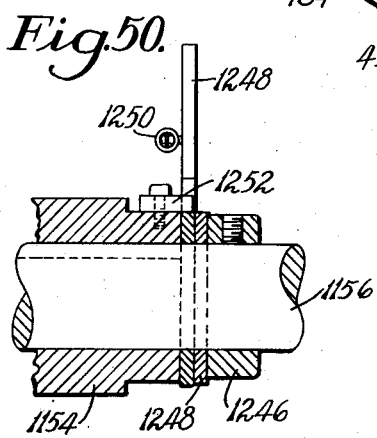
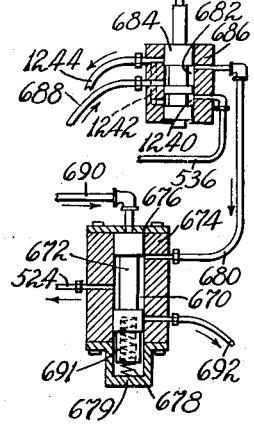
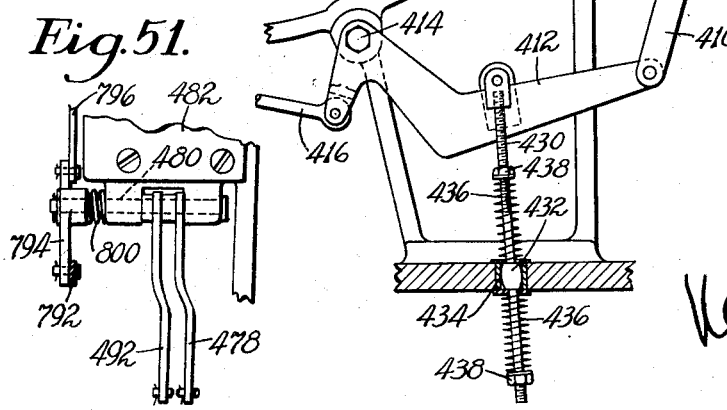
*Inventor*
Sidney J. Finn
By his Attorney March 8, 1955 S. J. FINN 2,703,420
MACHINE FOR SHAPING UPPERS OVER LASTS
Filed July 11, 1952 30 Sheets-Sheet 28

Inventor
Sidney J. Finn
By his Attorney

March 8, 1955   S. J. FINN   2,703,420
MACHINE FOR SHAPING UPPERS OVER LASTS
Filed July 11, 1952   30 Sheets-Sheet 29

Inventor
Sidney J. Finn
By his Attorney

March 8, 1955  S. J. FINN  2,703,420
MACHINE FOR SHAPING UPPERS OVER LASTS
Filed July 11, 1952  30 Sheets-Sheet 30

Inventor
Sidney J. Finn
By his Attorney ic Office 2,703,420
Patented Mar. 8, 1955

2,703,420

MACHINE FOR SHAPING UPPERS OVER LASTS

Sidney J. Finn, Beverly, Mass., assignor to United Shoe Machinery Corporation, Flemington, N. J., a corporation of New Jersey Application July 11, 1952, Serial No. 298,246

208 Claims. (Cl. 12—8.5)

This invention relates to machines for shaping uppers over lasts and is herein shown as embodied in a machine for lasting the entire foreparts of shoes. The machine shown is more particularly intended for use in lasting shoes the uppers of which have not been previously subjected to a pulling-over operation, and in some respects, moreover, is so constructed as to adapt it especially for use on shoes having unlined uppers, which may be uppers of the moccasin type, the margin of the single upper layer being secured by cement in the lasting operation to an insole fast on the last. It is to be understood, however, that in various novel aspects the invention is not limited in utility to the lasting of shoes of that particular character, but is more generally applicable to the manufacture of shoes of different kinds.

The machine in which the invention is herein shown as embodied includes in its organization a plurality of grippers, herein termed forepart grippers, arranged to grip the margin of the upper in different locations around the toe end of the last and at the sides of the forepart beyond the toe and to pull the upper heightwise of the last. One of these grippers, located centrally of the end of the toe, is so controlled as to position the last lengthwise by engagement with its toe-end face when the operator presents it, with an upper and an insole thereon, to the machine, the last being thus presented bottom downward in a rearwardly and upwardly inclined position. The central toe gripper has thereon means for also positioning the toe end of the last laterally when it is thus presented, the position of the last heightwise at this time being determined by displaceable shoe-rest members engaging the margin of the insole respectively at the end of the toe and the sides of the forepart. The machine is further provided with a heel rest arranged to engage the upper on the heel end of the last to position that end of the last laterally and to hold the last against lengthwise displacement in a heelward direction during the operation of the machine, the heel rest having also means for engaging the top of the heel end of the last to hold that end of the last against upward displacement. The heel rest is so mounted and controlled as to permit it to assume, with respect to movements in directions lengthwise and heightwise of the last, a position determined by the last when the last is presented and positioned as above described, after which a heel rest holder is moved into position to support the heel rest against displacement in a direction lengthwise of the last by the pressure of the last and shoe thereon and also to lock it against upward displacement.

In addition to novel features of the means above outlined for positioning and controlling the last and shoe, various other novel features are to be recognized in means provided for controlling and operating the forepart grippers. All these grippers except the central toe gripper are positioned initially with their upper-gripping jaws spaced substantial distances outwardly away from the lateral periphery of the last, and prior to the insertion of the margin of the upper between their jaws they are swung inwardly toward the last and, in the construction herein shown, into engagement with the lateral periphery of the last, the forepart of the upper being at that time held by the operator upwardly away from the last. In this manner the grippers are positioned in the best relation to the last to receive the margin of the upper regardless of the shape or size of the last. Such positioning movements of the grippers are effected by fluid-pressure means acting on jaw-closing mechanisms, herein shown as toggles, with which the grippers are provided, operating fluid, which is preferably light oil, being admitted by a valve to the fluid-pressure means from a source of supply in which the fluid is maintained under pressure by a pump. The pressure of the fluid thus admitted is suitably reduced below the pressure at the source to prevent at this time the closing of the grippers by the forces applied to the jaw-closing mechanisms.

The above-mentioned valve is operated by one of a group of cams mounted to rotate in unison, these cams being rotated in the first instance through an arc of 60° by fluid-operated means responsive to depression of a treadle. At this time a valve operated by another one of the cams admits fluid to fluid-pressure means whereby the heel rest holder is moved into position to control the heel rest as above described. After inserting the margin of the upper between the gripper jaws, the operator again depresses the treadle, thus causing the cams to be rotated through a second arc of 60°, one of the cams at this time operating a valve which admits fluid under greater pressure from the source of supply to operate all the jaw-closing mechanisms and thus to close all the forepart grippers on the upper. In order to prevent the pressure of the grippers, other than the central toe gripper, against the last from being increased by the increased forces thus applied to the jaw-closing mechanisms, fluid-controlled locking members associated with devices which are movably mounted on these grippers and which engage a fixed abutment in the machine cause this abutment to support the grippers positively against the increased jaw-closing forces, this action also occurring in response to the second depression of the treadle. To afford increased insurance that the grippers will be firmly closed on the upper, the pressure of the fluid at the source is substantially increased momentarily by the second depression of the treadle, such increase resulting from an increase in the compression of a spring controlling a relief valve by which the maximum pressure of the fluid at the source is determined.

If it appears, after the closing of the grippers, that the margin of the upper should be readjusted relatively to the gripper jaws, the operator may cause the grippers to open by reducing the pressure effective on the jaw-closing mechanisms, the machine being provided for this purpose with a valve which the operator may move by pressing on a member at the front of the machine. This valve is provided with means for limiting such reduction of pressure, so that sufficient pressure will still remain to hold the grippers which were moved inwardly in their positions against the last. After repositioning the margin of the upper the operator releases this valve, whereupon the former pressure is restored and the grippers are again closed. To insure that they will at this time be firmly closed again, another member is provided by pushing against which the operator may increase, independently of the threadle, the compression of the spring effective on the relief valve, thus causing the pressure at the source to be momentarily increased.

By a third depression of the treadle thereafter the operator causes the group of cams to turn through a third arc of 60°. At this time a pair of valves are operated by two of the cams to admit fluid from the source to fluid-pressure mechanisms for operating different groups of the forepart grippers to pull the upper, these mechanisms including pistons mounted in cylinders to which the fluid is thus admitted. To prevent the grippers from moving too suddenly in the upper-pulling operation, pistons subject to fluid pressure and of smaller diameter than the above-mentioned pistons are provided for retarding the movements of the grippers, means being provided for opening a restricted outlet for the fluid effective on the smaller pistons to decrease their resistance to the movements of the grippers at the beginning of the upper-pulling operation. Since an unlined leather upper does not oppose so much resistance to the force of the pull of the grippers thereon as if a lining were included in the upper materials, it has been found desirable positively to limit the movements of some at least of the grippers, and accordingly the machine herein shown is provided with stop members associated with most of the grippers for thus limiting their upper-pulling movements, these stop members being arranged to act directly on the pistons by which the grippers are operated. These stop members in the construction shown have cam faces thereon and are rotatable after the pulling of the upper to vary through these cam faces the positions of the grippers heightwise of the last. By movements of levers connected respectively to different stop members the operator may thus cause the grippers to increase or decrease the force of their pull on the upper about the end of the toe and at the opposite sides of the forepart selectively or may cause the side grippers to shift the upper widthwise of the last. To facilitate movements of the stop members against the forces applied thereto by the pistons, provision is afforded for reducing temporarily the pressure of the fluid effective on the pistons by opening restricted outlets for the fluid from different groups of cylinders in which the pistons are mounted. This pressure-reducing means is also used preparatory to movements of the grippers, or of some of them, lengthwise of the edge of the shoe bottom to adjust the upper in that respect relatively to the last, if such adjustment is necessary. By manually operated means the several toe grippers may thus be moved as a unit all in the same peripheral direction around the toe, and by other manually operated means the pairs of grippers located farthest from the end of the toe at the opposite sides of the forepart respectively may be independently shifted lengthwise of the last.

After the pulling of the forepart of the upper and after any necessary adjustments have been made as above described, the machine is further operated to complete the lasting of the forepart of the shoe. Such further operation of the machine is wholly automatic and results from the tripping of a one-revolution clutch in response to depression of a second treadle. Through this clutch a plurality of cams are turned through one complete revolution to operate directly a plurality of parts including a toe rest which is moved into holding engagement with the top of the toe end of the shoe, a flexible band which is applied around the toe and along the sides of the forepart to clamp the upper, still held by the forepart grippers, against the periphery of the last, and a pair of toe-embracing wipers, herein termed forepart wipers, by which the marginal portion of the upper is wiped inwardly over the insole after its release by the grippers, these wipers extending far enough thus to act on the upper throughout the length of the forepart of the shoe. By one of the clutch-driven cams the second half-revolution of the previously mentioned group of valve-operating cams is completed in successive stages to cause at the proper times the release of the upper by the forepart grippers and the performance of other operations by fluid pressure, as well as to cause the eventual return of fluid-operated parts to their initial positions. Additional novel features of the invention are to be recognized in the organization thus outlined.

Other novel features are found in a pair of ball-lasting units included in the machine and arranged to operate respectively at the opposite sides of the ball portion of the shoe, including locations where the edge of the shoe bottom curves inwardly toward the shank beyond the ball line. These units are mounted for manual adjustment relatively to each other in directions lengthwise of the shoe and are further moved lengthwise of each shoe to operative positions by the means whereby the previously mentioned heel rest holder is moved into position to control the heel rest, the positions of the units lengthwise of the shoe being therefore determined by the position of the heel rest. Each of the units includes a gripper for pulling the upper and a pair of wipers for wiping its margin inwardly over the insole. The gripper is operated by a lever first to grip and thereafter to pull the upper, another lever being provided for holding it against movement until it has gripped the upper and for then releasing it. The gripper-operating lever is operated by fluid-pressure means to which fluid is admitted from the source of supply by a valve operated by one of the first-mentioned group of cams, this fluid-pressure means including two pistons, one within the other, which are both operated to cause the gripper to grip the upper. Thereafter the movement of one of the pistons is stopped while the other continues its movement to impart with less force the upper-pulling movement to the gripper. One of the pair of wipers of each ball-lasting unit is arranged to extend initially somewhat farther toward the toe end of the shoe than the other wiper, both wipers being moved in that relation obliquely widthwise of the shoe and lengthwise thereof toward its toe end into positions to engage the upper. Resistance of the upper, still held under tension by the ball gripper, to further movements of the wipers then causes a relative movement of parts of the wiper-operating mechanism, and in response to such relative movement of the parts fluid is released from the gripper-operating means to cause the gripper to release the upper. As the wipers then wipe the upper inwardly over the insole the wiper extending farther toward the toe end of the shoe is deflected to move more directly widthwise of the shoe while the other wiper continues to move in the same oblique direction in which both wipers were moved toward the shoe, this other wiper having therein a recess within which the wiper extending farther toward the toe end is received in response to such relative movement of the two wipers. Such movement of one wiper more directly widthwise of the shoe than the other wiper counteracts any tendency for the margin of the upper near the ball line to be unduly deflected toward the toe end of the shoe. The wipers of the ball units are operated by cams which are driven through the clutch, and by other clutch-driven cams the wipers of these units, after completing their inward wiping movements, are caused to move downwardly away from the shoe before the previously mentioned forepart wipers have completed their operative movements, these wipers moving far enough to extend over portions of the margin of the upper previously wiped inwardly by the ball wipers.

Still other novel features are to be recognized in wiper-operating means herein shown as provided for operating the forepart wipers. These wipers, in the illustrative embodiment of the invention, are advanced bodily lengthwise of the shoe by a wiper carrier until they have begun to wipe the upper inwardly over the insole at the end of the toe before they receive any closing movements widthwise of the shoe. For thereafter closing them the construction shown includes a crossbar movable bodily lengthwise of the shoe and having link connections extending from its opposite ends respectively to wiper holders supporting the different wipers, the crossbar being pivotally mounted midway between its opposite ends for swinging movement to permit the wipers to adjust themselves to the shoe upon engagement with the opposite side portions thereof. In response to resistance of the shoe to further closing movements of the wipers the crossbar is then locked against any further swinging movement, so that the wipers thereafter are closed equal distances by further bodily movement of the crossbar. For imparting to the wipers at the same time further bodily wiping movements lengthwise of the shoe proportional to the extent of their closing movements, mechanism is provided which is also operated by the crossbar only after the wipers have adjusted themselves as above described to the shoe. More particularly, in the construction herein shown a plate slidingly movable on the wiper carrier and supporting the wipers is connected by links to a pair of levers which remain stationary until the wipers have adjusted themselves to the shoe, after which members carried by the link connections between the crossbar and the wiper holders are rendered effective, in response to resistance of the shoe to further closing movements of the wipers, to operate the levers as the crossbar continues its movement to close the wipers over the insole. In this manner the plate is moved relatively to the wiper carrier further to advance the wipers.

The forepart wipers herein shown have plane wiping faces. To render such wipers properly effective in wiping the margin of the upper inwardly over the insole along the sides of the forepart of a shoe the bottom of which has some convex lengthwise curvature, the wipers are provided with inwardly curved ends arranged to engage portions of the upper previously wiped inwardly over the insole in locations where the bottom of the shoe is inclined toward the shank beyond the ball line before other portions thereof at the sides of the shoe arrive in positions to act on the upper and as the wipers continue their closing movements to impart to the forepart of the shoe a short heightwise movement, so that by the time the portions of the wipers which act on the upper at the sides of the forepart nearer the toe portion are in positions to wipe the upper inwardly the shoe will be in such relation to the wipers that they will act properly on those portions of the upper without displacement of the edge of the insole.

The above and other features of the invention, including various novel details of construction and combinations of parts, will now be more particularly described with reference to the accompanying drawings and thereafter pointed out in the claims.

In the drawings,

Fig. 6 is a section on the line VI—VI of Fig. 5;

Fig. 7 is a view similar to Fig. 5 of a portion of the structure, with parts omitted and others broken away;

Fig. 8 is a section on the line VIII—VIII of Fig. 3;

Fig. 9 is a section on the line IX—IX of Fig. 3;

Fig. 10 is a view partly in right-hand side elevation and partly in section of relief-valve-controlling mechanism with which the machine is provided;

Fig. 11 is a section on the line XI—XI of Fig. 4;

Fig. 12 is a view mainly in right-hand side elevation of certain parts shown in Fig. 4 and parts associated therewith;

Fig. 14 is a section on the line XIV—XIV of Fig. 13;

Fig. 15 is a section on the line XV—XV of Fig. 13;

Fig. 16 is a section on the line XVI—XVI of Fig. 13;

Fig. 17 is a view on an enlarged scale in the direction of the arrow XVII in Fig. 13, showing portions of the mechanisms for operating and controlling the several forepart grippers, with parts in section;

Fig. 18 is a section on the line XVIII—XVIII of Fig. 13;

Fig. 19 is a section on the line XIX—XIX of Fig. 17;

Fig. 20 is a perspective view of one of three valve units shown in Fig. 17;

Fig. 21 is a view in the direction of the arrow XXI of Fig. 1 of certain parts at the right-hand side of the machine, with portions of the structure broken away;

Fig. 22 is a view on a larger scale in the same direction as in Fig. 17 of one of several mechanisms shown in that figure for variably limiting pulling movements of some of the grippers;

Fig. 23 is a section on the line XXIII—XXIII of Fig. 22;

Fig. 24 is a section on the line XXIV—XXIV of Fig. 17;

Fig. 25 is a view partly in elevation and partly in section, showing one of the several forepart grippers and means for controlling it;

Fig. 26 is a view partly in elevation and partly in section, showing another one of the forepart grippers and means for controlling it;

Fig. 27 is a section on the line XXVII—XXVII of Fig. 26;

Fig. 28 is a view in left-hand side elevation of shoe-supporting means with which the machine is provided and of parts associated therewith, the parts being differently oriented than in the machine;

Fig. 29 is a section on the line XXIX—XXIX of Fig. 28;

Fig. 30 is a section on the line XXX—XXX of Fig. 28;

Fig. 31 is a section on the line XXXI—XXXI of Fig. 28;

Fig. 35 is a view in the same direction as in Fig. 2, with parts removed, showing on an enlarged scale the toe wipers and portions of their operating mechanism;

Fig. 36 is a section on the line XXXVI—XXXVI of Fig. 35;

Fig. 37 is a section on the line XXXVII—XXXVII of Fig. 35;

Fig. 41 is mainly a view in right-hand side elevation of portions of the structure shown in Fig. 40 and of other structure located above it;

Fig. 42 is a view mainly in rear elevation of portions of the structure shown in Figs. 40 and 41, with parts broken away;

Fig. 43 is a view partly in right-hand side elevation and partly in section on the line XLIII—XLIII of Fig. 42 of a portion of the structure shown in Fig. 40;

Fig. 44 is a section on the line XLIV—XLIV of Fig. 43;

Fig. 48 is mainly a view in right-hand side elevation of certain parts at the left-hand side of the machine, with parts in section;

Fig. 49 is a view in the same direction as in Fig. 17 of certain parts shown in that figure and of other parts connected thereto;

Fig. 50 is a section on the line L—L of Fig. 48;

Fig. 51 is a section on the line LI—LI of Fig. 48;

Figure 53:
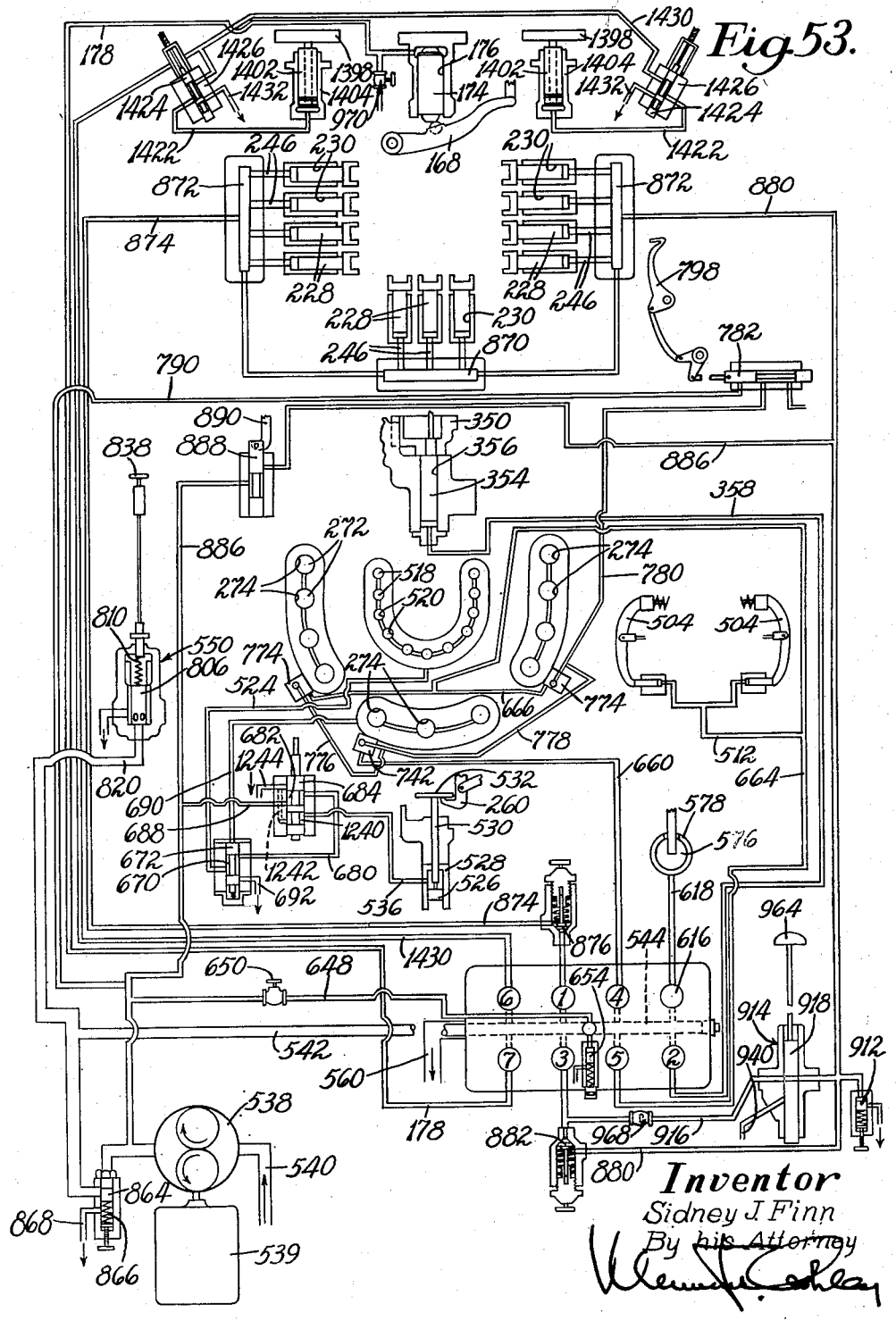

Fig. 53 is a view showing diagrammatically the assemblage of fluid-operated mechanisms included in the machine and illustrating their relation to the source of operating fluid and to the means for admitting fluid thereto and releasing it therefrom, and Figs. 54 to 62 inclusive are views illustrating the relation of various parts of the machine to the shoe at different times in the operation of the machine.

Figure 55:
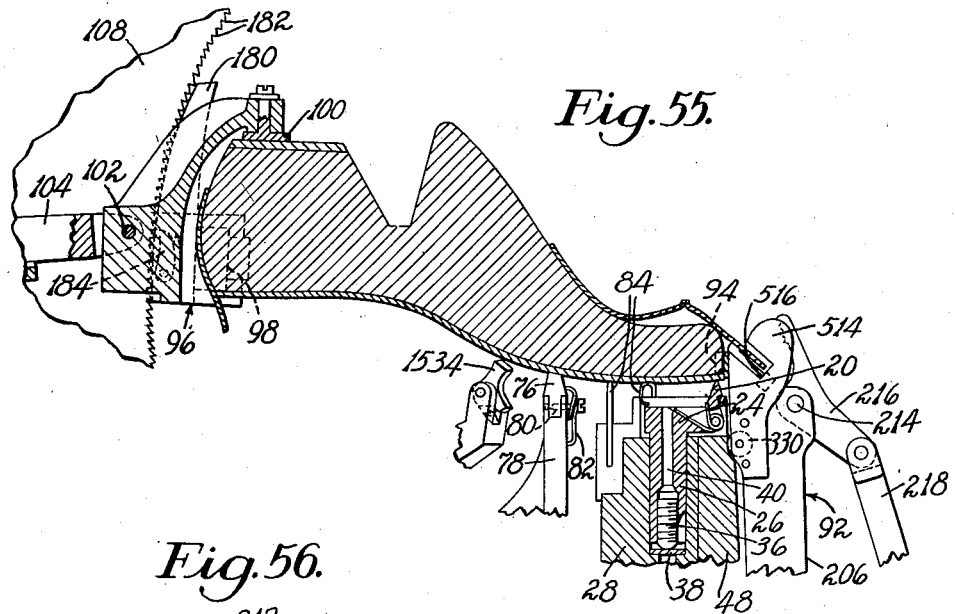

Preparatory to the operation of the machine the last and shoe are supported bottom downward in a forwardly and rearwardly inclined position by means including a finger 20 (Figs. 3, 4 and 28) arranged to engage the margin of the extreme toe end of an insole fast on the last as shown in Fig. 55, this finger being pivotally mounted for swinging movements lengthwise of the shoe on a pin 22 mounted in a block 24. This block is provided with a hollow stem 26 extending downwardly into a block 28 secured by a screw 30 to a casting 32 fast on the frame of the machine, the screw acting on the block 28 through a member 34 hereinafter more particularly described. Threaded in the lower end of the stem 26 is a screw 36 the lower end of which engages a washer 38 supported on a shoulder formed on the block 28. By means of a suitable wrench inserted in a bore 40 in the stem 26 the screw 36 may be turned to adjust the block 24 heightwise relatively to the block 28. By means of a wire spring 42 extending around the pin 22 the finger 20 is held normally in the position shown in Figs. 4 and 28 for engagement with the margin of the insole when the work is presented to the machine. When the margin of the upper is wiped inwardly over the insole by the forepart wipers hereinafter described, the finger 20 swings inwardly and downwardly about the pin 22 in response to pressure of the upper against it and is thus moved away from the insole into a recess 44 in the block 24 to make way for the wipers.

Mounted for movements heightwise of the shoe along guideways 46 (Fig. 29) on the block 28 is a member 48 which performs the function of a retarder and is hereinafter so termed. As the upper is wiped inwardly over the insole by the forepart wipers the retarder engages the margin of the upper around the toe and bends it outwardly over the wipers until the latter by their continued movements withdraw the upper from engagement therewith and wipe it flat against the insole. As illustrated especially in Fig. 3, the retarder 48 has an upwardly extending rim 50 having a curvature generally similar to that of the edge of the toe end of the insole and extending part way around the above-mentioned block 24, this rim being initially spaced downwardly from the margin of the insole a distance less than the thickness of the wipers plus the thickness of the upper, so that by the wedging action of the wipers and the upper thereon it will be forced farther downwardly in the wiping operation. Formed on the lower end of each side of the retarder 48 is a lug 52 engaged underneath by one arm of a forked leaf spring 54 secured by the screw 30 on the top of the member 34, the spring being yieldable to permit the retarder to be forced downwardly by the wipers as above described. Cooperating with the spring to position the retarder initially at the proper height is a latch 56 arranged to engage a lug 58 on the retarder, this latch being mounted to turn about a pin 60 in a block 62 which is mounted in a guideway in the block 28 for movements heightwise of the shoe. A spring 64 in the block 28 tends to move the block 62 in an upward direction and holds it in a position adjustably determined by a screw 66 which is threaded in the block 28 and has on its upper end a flange engaging a shoulder on one corner of the block 62. A leaf spring 68 secured to the block 28 tends to swing the latch 56 in a clockwise direction with reference to Fig. 28 and holds it normally in a position determined by engagement of a shoulder thereon with a pin 70 on the block 62. The latch is provided with an upwardly extending finger 72 by means of which it may be swung against the resistance of the spring 68 to release the retarder 48 and thus to permit the retarder to be removed from the block 28 with the block 24. In the upwardly extending rim 50 of the retarder is a recess 74 which provides clearance for portions of the pin 22 and the spring 42. Swinging movement of the finger 20 by the spring 42 is limited by engagement of the finger with the rim of the retarder.

Arranged to cooperate with the finger 20 to position the last and shoe heightwise and to hold the last against the force of the pull of the grippers on the upper are two other fingers 76 (Figs. 3 and 5) arranged to engage the margin of the insole respectively at the opposite sides of the forepart in locations nearer the toe end of the shoe than the ball line. The fingers 20 and 76 thus determine the position of the bottom of the forepart of the shoe relatively to the plane of the forepart wipers. Each of the fingers 76 is supported on a bracket 78 which is itself supported as hereinafter described, and each finger is mounted on a stud 80 on the bracket for swinging movements widthwise of the shoe. Associated with each finger is a wire spring 82 anchored at its opposite ends to the bracket and the finger and yieldable to permit the finger to be swung inwardly in the wiping operation in the same manner as the finger 20 at the end of the toe. The fingers 76 are thus swung inwardly and downwardly by the wipers to positions out of engagement with the insole. It will be understood that by the springs 82 the fingers are held initially in positions determined by engagement of shoulders thereon with the brackets 78.

To insure that portions of the margin of the insole between the finger 20 and the fingers 76 will be held close against the bottom of the last and will not be displaced by the wipers, the retarder 48 carries four members 84 which, as well as the fingers 20 and 76, may be termed insole edge holddowns. Two of these members, located farthest from the end of the toe, are mounted on blocks 86 (Figs. 28 and 31) which are secured to the retarder. Each of these two members is made of resilient wire shaped as shown in Fig. 31. It includes an approximately rectangular upper portion and a lower portion lying in a groove in the block in engagement with a curved wall 88 of the groove, this lower portion being further anchored by extending loosely around a pin 90 in the block. The other two members 84, located nearer the end of the toe, are similarly formed and mounted in the retarder 48 itself. The several members 84 are thus sufficiently yieldable in a downward direction to permit them to adjust themselves to the shoe positioned on the fingers 20 and 76, and when the wipers wipe the upper inwardly over the insole their upper portions are forced inwardly by the engagement of the upper therewith to make way for the wipers and are carried downwardly by the retarder as the latter is depressed. By reference to Fig. 3 it will be evident that the two members 84 located farthest from the end of the toe lie in a plane extending in substantially perpendicular relation to the longitudinal median line of the forepart of the shoe and that the two members located nearer the end of the toe lie in planes extending in oblique relation to that median line in view of the directions of movement of the corresponding portions of the edges of the forepart wipers.

When the operator presents the last and shoe to the machine he positions the toe-end face of the last against a central toe gripper 92 (Figs. 4 and 55) which, as hereinafter described, is one of several grippers provided for pulling the upper in different locations about the forepart of the last. As further hereinafter described, this gripper is initially locked against movement lengthwise of the last and therefore serves as effective means for determining the position of the last and shoe lengthwise in the machine. This gripper has thereon a small last-engaging plate 94 (Fig. 4) arranged to extend a short distance widthwise of the last and so shaped as to position the toe end of the last also laterally. For holding the last against the central toe gripper after the operator has thus presented it, the machine is provided with a heel rest 96 (Fig. 4) a portion of which is substantially V-shaped for positioning the heel end of the last laterally and has thereon pads 98 for engaging the upper on the heel end of the last. Another portion of the heel rest is curved to extend over the top of the heel end of the last and has secured thereon a plate 100 arranged to engage the top face of this portion of the last. The heel rest 96 is pivotally mounted for swinging movements heightwise of the shoe on a pin 102 mounted in a forked end of a bar 104 and is prevented from swinging any farther downwardly than shown in Fig. 4 by engagement with a shoulder on the end of the bar. The bar 104 is supported in a trough-shaped member 106 (Fig. 11) which extends forwardly and rearwardly between two parallel plates 108 forming opposite sides of a U-shaped member 110, the member 106 being mounted on the member 110 as will presently be described. A pin 112 extends from the sides of the member 106 through a slot 114 (Fig. 4) in the bar 104, and mounted in a bore in the bar is a spring 116 one end of which abuts against a washer in engagement with the pin 112. It will thus be seen that the spring tends to move the bar and the heel rest in a direction toward the shoe while permitting them to be moved yieldingly in the opposite direction against the resistance of the spring. The pin 112 is so located as to provide some clearance between the lower face of the bar and the member 106 under the pin, thus permitting some limited upward and downward swinging movement of the bar and the heel rest about the pin. When the operator presents the work to the machine he positions the heel end of the shoe against the V-shaped portion of the heel rest with the top of the heel end of the last in engagement with the plate 100 and moves the heel rest against the resistance of the spring 116 in a direction away from the central toe gripper 92 until the toe-end face of the last is in proper position to engage the plate 94 on this gripper. By reason of the provision for swinging movement of the heel rest about the pin 102 on the bar 104 and for swinging movement of the bar about the pin 112 the heel rest adjusts itself heightwise to the position of the shoe determined by the insole-engaging fingers 20 and 76.

Since the amount of movement of the bar 104 about the pin 112 is limited by engagement of the bar with the member 106, there is formed on one side of this member a key 118 (Fig. 12) which lies in a slot 120 formed in the inner side of the right-hand plate 108 of the member 110. The member 106, therefore, may be moved adjustably in directions heightwise of the shoe to locate the heel rest preliminarily in positions appropriate for shoes of different styles. It is held in the adjusted position shown by a pin 122 which extends through a hole in the plate 108 into a hole in the key 118, this pin extending inwardly from a knob 124 fast on a leaf spring 126 secured at one end to the plate 108 by a screw 128. When the member 106 is to be adjusted upwardly or downwardly from the position in which it is shown, the leaf spring is detached by removing the screw 128, and the screw is thereafter inserted in one or the other of two holes 130 in the plate 108 to locate the spring and its pin 122 in a higher or a lower position, the pin then extending through one or the other of two holes 132 in the plate 108 into the hole in the key 118 to secure the member 106 in its adjusted position. There is, moreover, provision for adjustment of the bar 104 lengthwise relatively to the member 106 for shoes which vary substantially in length, comprising three holes 134 in the sides of the member to receive selectively the pin 112 on which the bar 104 is pivotally mounted.

The U-shaped member 110 is secured to a slide 136 (Figs. 4 and 11) mounted for movements lengthwise of the shoe on a plate 138, guideways for the slide being provided by gibs 140 secured to the plate. The plate 138 is held against movement lengthwise of the shoe but is adjustably movable in directions widthwise of the shoe about an axis extending heightwise of the shoe and located near the end of the toe. For this purpose the plate is supported, in part, on an arc-shaped guide 142 (Figs. 3 and 4) which is secured near its opposite ends to a casting 144 supported, in turn, on another casting 146 on the frame of the machine. Adjustment of the plate 138 along the guide 142 carries the heel rest to positions corresponding to the laterally offset positions of the heel ends of right and left shoes. For holding the plate in adjusted position there is provided a pin 148 (Fig. 3) arranged to extend through a hole in the plate into one or another of a plurality of holes 150 in the guide 142. The pin 148 extends inwardly from a knob 152 fast on a leaf spring 154 which is secured at one end to the plate 138.

The plate 138 is further supported, in part, on the top face of the casting 144 and on a slide 156 movable in directions lengthwise of the shoe along guideways in this casting. Movement of the slide 136 along its guideways is effected by similar movement of the slide 156. For this purpose there is threaded in a downwardly extending end portion (Fig. 4) of the slide 136 a screw 158 on the lower head end of which is mounted a block 160 lying in a guideway 162 (Fig. 3) in the slide 156, this guideway being curved about the same axis as the arc-shaped guide 142. Whatever may be the adjusted position of the plate 138, therefore, the screw 158 and the block 160 provide an operating connection between the slide 156 and the slide 136. Secured to the lower face of the slide 156 is a block 164 connected by a link 166 to the upper end of a lever 168 which is pivotally mounted at its lower end on a plate 170 fast on the casting 146. Mounted on this lever is a roll 172 arranged to be engaged by a piston 174 mounted in a cylinder 176 supported by the casting 146. As more particularly hereinafter explained, operating fluid is admitted to the cylinder 176 through a fluid line 178 after the operator has presented the shoe to the machine and while he is holding it in the position in which it is thus presented. As a result the piston 174 swings the lever 168 rearwardly and through the connections described moves the slide 136 rearwardly to carry the U-shaped member 110 toward the shoe. The first effect of this movement of the member 110 is further to compress the spring 116 in the bar 104, after which the rear edges of its side plates 108, which have a concave curvature heightwise of the shoe, are carried into engagement with complementally curved front edges of extensions 180 on the opposite sides of the heel rest 96. In this manner the force of the piston 174 is applied to the heel rest to press it more firmly against the shoe, the member 110 acting thereafter as a holder for the heel rest. At the same time the heel rest is locked against upward movement from the position which it previously assumed in adjusting itself to the last and shoe. For this purpose the curved rear edges of the plates 108 are provided with teeth 182 engaged by spring-pressed detents 184 mounted on the extensions 180 of the heel rest, one of these detents being shown in dotted lines in Fig. 4.

After the heel rest has thus been pressed against the shoe by the piston 174 it is held positively against any reverse movement in response to pressure of the shoe thereon by one or the other of two pawls 186 (Figs. 11 and 12) pivotally mounted in staggered relation on a pin 188 on the left-hand plate 108 of the holder 110 and engaging teeth 190 formed on the left-hand gib 140, the pawls being held in engagement with the teeth by springs 192. To permit the heel rest to be returned to its initial position after the operation of the machine on each shoe there is provided a hand lever 194 pivotally mounted on a pin 196 on the left-hand plate 108 and connected by a link 198 to the tail ends of the pawls 186. Upon the lifting of this hand lever by the operator the parts which were moved rearwardly by the piston 174 and the lever 168 are returned by gravity along their forwardly and downwardly inclined paths, causing at the same time the return of the piston 174 to the front end of its cylinder 176, such return movements of the parts being limited by engagement of a flange 200 on the piston with the cylinder casting. As further hereinafter more particularly explained, the piston 174 having been operated by the fluid admitted to the cylinder 176, the fluid is trapped in the fluid line 178, so that there is no tendency to force the heel rest any farther in the direction toward the shoe.

In addition to the central toe gripper 92 the machine herein shown is provided with six other toe grippers 202 (Figs. 25 and 57), three at each side of the central toe gripper, for pulling the upper in different locations around the toe, and is further provided, beyond the toe grippers, with four additional grippers 204 (Figs. 26 and 57), two at each side of the forepart, for pulling the upper in those locations. Except for differences hereinafter noted between the central toe gripper and the other grippers, these eleven grippers, which may all be termed forepart grippers, are all substantially alike. Each of them includes a casing 206 opposite side portions of which are spaced a short distance from each other and are connected together throughout a portion only of the length of the casing by a web 208. At the upper end of the casing its opposite side portions are joined together and have secured thereto a plate 210 which serves as one of the upper-gripping jaws. Secured also to this portion of the casing of each of the toe grippers except the central gripper is another plate 212 arranged to engage what may be termed the lateral periphery of the last prior to the gripping of the upper. Pivotally mounted on a pin 214 in the upper end of the casing is a jaw 216 arranged to cooperate with the jaw 210 in gripping the upper. A tail portion of the jaw 216 is pivotally connected to one end of a link 218 which is part of a toggle 220, the other link 222 of the toggle being pivotally connected to the link 218 by a pin 224 and being pivotally mounted at its lower end on a pin 226 on the gripper casing. It is by the straightening of the toggle 220 that the pivoted jaw 216 is swung toward the jaw 210 to grip the margin of the upper. For this purpose there is associated with each gripper a piston 228 mounted in a cylinder 230 (Fig. 13) formed in a casting 232 which is fast on a top frame casting 234. Formed on the piston is an upwardly and downwardly extending guide 236 having therein a guideway 238 for a roll 240 mounted on the lower link 222 of the toggle. The piston 228 associated with each of the grippers except the forepart side grippers 204 is held from turning by a pin 242 (Fig. 25) fast on the guide 236 and extending through a recess in a lug 244 on the casting 232. As more particularly hereinafter described, fluid is admitted at the proper time through a pipe 246 to each cylinder 230 for closing the gripper on the upper, the toggle 220 being moved toward straightened position against the resistance of a return spring 248 mounted in a socket in the link 222 and engaging the gripper casing 206. It will be understood that the amount of straightening movement of the toggle may vary in accordance with the thickness of the upper, the link 222 being provided with a pin 250 for limiting such movement of the toggle by engagement with the casing 206. Return of the toggle by the spring 248 is limited by engagement of the tail portion of the jaw 216 with a pin 251 in the casing 206.

Figure 13:
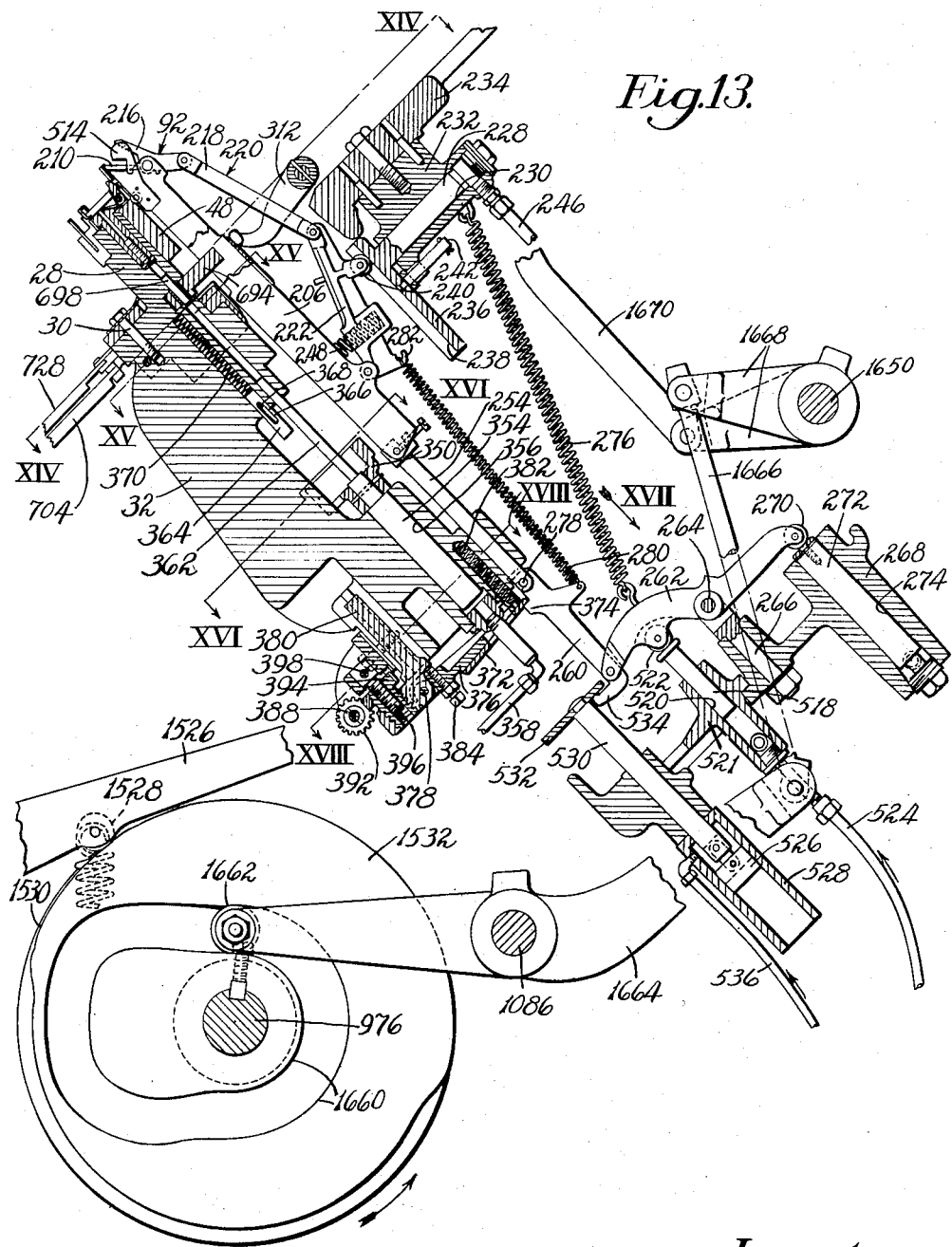
Fig. 13 is a view partly in right-hand side elevation and partly in section, showing mainly the central toe gripper and the means for operating and controlling it.

At its lower end each of the gripper casings 206 is pivotally connected by a pin 252 (Fig. 25) to a rod 254 slidingly mounted in a guideway in the lower end portion of the previously mentioned casting 32 (Fig. 13). A head on the rod 254 is positioned between the lower ends of the opposite sides of the casing 206 and has therein a slot 256 to receive the pin 252 which is fast in the casing. The pin is held loosely in the slot by a setscrew 258 threaded in the head of the rod 254, this construction permitting the gripper to be readily detached from the rod when desired. Connected to the lower end of each rod 254 is a link 260 (Fig. 13) which connects the rod to one end of a lever 262 pivotally mounted between its ends on a pin 264, this pin being mounted in the forked head of a bolt 266 in a casting 268 on the frame. The other end of the lever has thereon a roll 270 positioned over a piston 272 which is mounted in a cylinder 274 formed in the casting 268. Accordingly, fluid admitted at the proper time to the lower end of the cylinder 274 swings the lever 262 about the pin 264 to impart upper-pulling movement heightwise of the last to the gripper, this movement of the lever being effected against the resistance of a return spring 276 connected to the lever and to the casting 232.

The connection between each of the links 260 and the corresponding rod 254 comprises a pin 278 mounted in the lower end of the rod and lying in a slot in the upper end of the link, this slot being open laterally of the link. The link, therefore, may be readily disconnected from the rod by swinging it laterally about its connection with the lever 262. To hold the link normally in the position in which it is connected to the rod there is provided a spring 280 connected to a lateral extension on the link and to a hook 282 formed on the lower end of the toggle link 222. It will be evident that the spring 280, in addition to holding the link 260 in operative relation to the rod 254, tends to swing the gripper as a whole in an outward direction relatively to the rod 254 and therefore holds the roll 240 in engagement with the guide 236 in the guideway 238 after the toggle 220 has been broken by the spring 248 as far as permitted by the pin 251. It will further be evident that both the spring 248 and the spring 280 cooperate to return the piston 228 when fluid is released from the cylinder 230. Return movement of the piston 228 associated with each of the several toe grippers 202 is limited by engagement of a washer 284 on the pin 242 with the lug 244 (Fig. 25) on the casting 232.

In operating on comparatively small shoes it may be desired not to use some or all of the forepart side grippers 204. Provision is therefore afforded for maintaining each of these grippers, if desired, in an outwardly retracted idle position where it will not operate on the upper, as illustrated in Figs. 15 and 26. For this purpose there is associated with each of these grippers a rod 286 mounted for sliding movements in directions widthwise of the shoe in the casting 232, the inner end of this rod being connected in the manner illustrated in Fig. 27 to the upper end of the guide 236 carried by the piston 228. This rod has therein a notch 288 into which the lower end of a latch 290 slidingly mounted in the castings 232 and 234 is arranged to extend to hold the piston 228 in outwardly retracted position as shown, the gripper occupying a correspondingly retracted inoperative position by reason of the action of the spring 280 which holds the roll 240 in engagement with the guide 236. For withdrawing the latch from the notch there is connected to its upper end a lever 292 pivotally mounted on a pin 294 in a bifurcated holder 296 fast on the casting 234, this lever being controlled by a spring 298 which tends to force the latch downwardly. By depression of the outer end of the lever the latch may be withdrawn from the notch 288, after which the operator swings the gripper inwardly toward the shoe. This movement of the gripper is accompanied by movements in the same direction of the piston 228 and the rod 286 because of the weight of the liquid operating fluid in portions of the pipe 246 which are higher than the cylinder 230. When the outer end face 300 of the rod 286 passes the latch 290 the operator releases the latch which is then moved by the spring 298 into position to engage the end of the rod and thus to determine the operative position of the gripper. To assist in holding the rod against the latch a light spring 302 is connected to the guide 236 on the piston 228 and to a pin 304 on the casting 232. It will be evident that when the gripper is in position for use the piston 228 will be partly out of the cylinder 230, as distinguished from the piston associated with each of the toe grippers 202 most of which is initially within the cylinder. Associated with the two forepart side grippers at each side of the shoe is a plate 308 (Fig. 2) fastened to the casting 234 and provided with fingers 310 to assist in positioning these grippers lengthwise of the shoe when they are outwardly retracted. It will be understood that when these grippers are in such idle positions they are nevertheless moved downwardly by the action of the corresponding pistons 272 but without effect on the upper the margin of which is not between their jaws.

Figure 4:
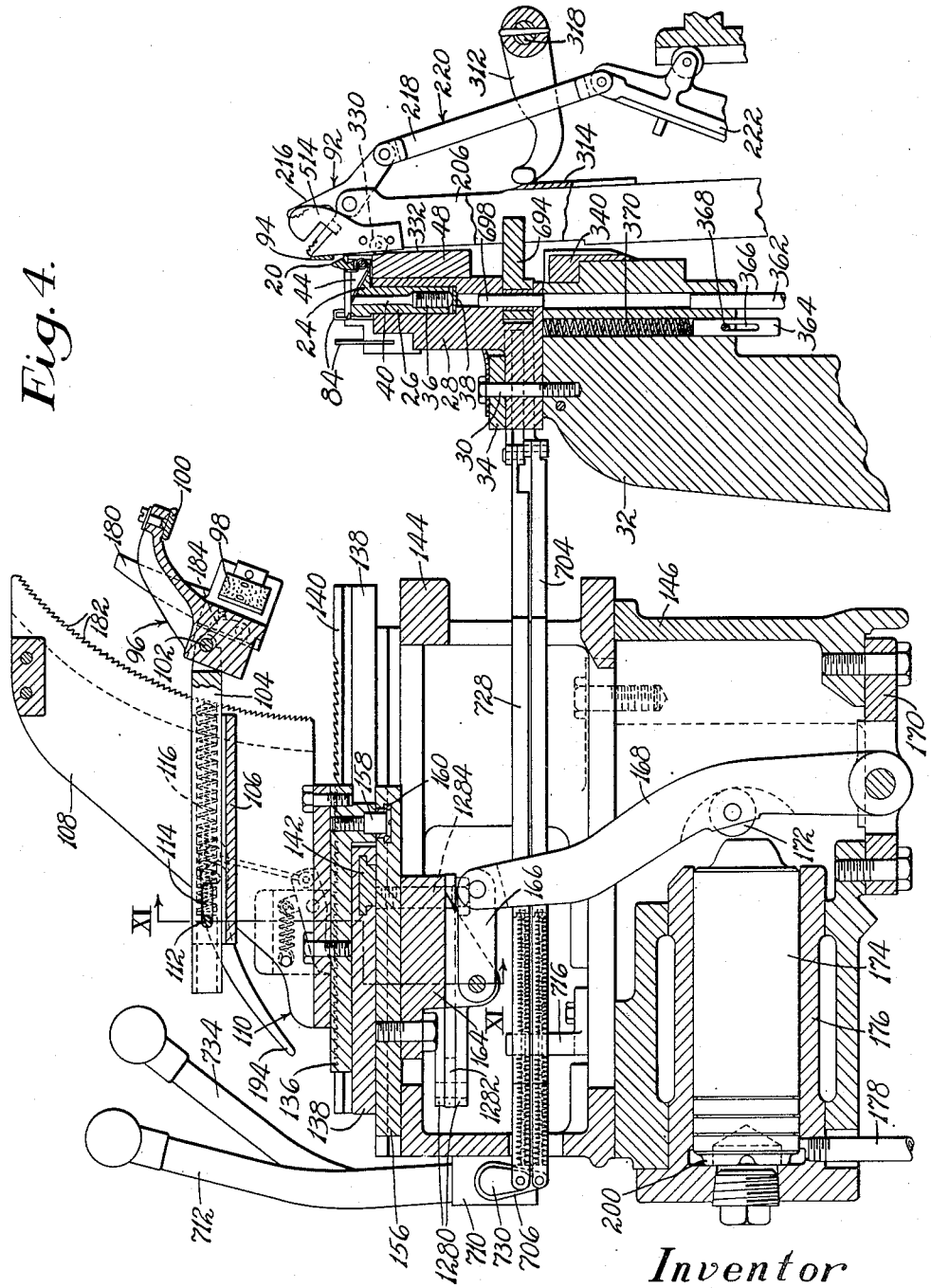
Fig. 4 is a section on the line IV—IV of Fig. 3.

For locking the central toe gripper 92 against rearward movement in a direction lengthwise of the last to serve initially as an end gage or stop for the last as hereinbefore described, the machine is provided with a pair of arms 312 (Figs. 4, 13 and 14) the front ends of which are immediately at the rear of the two sides of the casing 206 of the gripper and are arranged to engage a plate 314 fast on the casing. The two arms extend from a common hub 316 which is fast on a rockshaft 318 mounted in bearings in a pair of brackets 320 fast on the top frame casting 234. Mounted on the right-hand end of the shaft is a screw 322 extending through a slot 324 in a plate 326 fast on one of the brackets 320. Connected to this screw and to the plate is a spring 328 which tends to turn the rockshaft in the direction to swing the arms 312 downwardly, the limit of such downward movement of the arms being determined by engagement of the screw 322 with the plate 326 in the slot 324. The arms are therefore normally positioned at the height thus determined. To avoid any danger that the gripper may displace the margin of the toe end of the insole by engagement therewith when the gripper is operated to pull the upper, the arrangement of the arms 312 and the plate 314 is such that the plate passes down beyond the ends of the arms immediately after the beginning of the upper-pulling movement of the gripper. Clearance is thus provided between the ends of the arms and the side portions of the gripper casing, and to increase this clearance the sides of the casing are recessed above the plate 314 (Fig. 4). Additionally the gripper carries a roll 330 engaged by a deflecting face 332 (Fig. 28) on the retarder 48 to swing the gripper rearwardly a short distance lengthwise of the last in response to its downward upper-pulling movement, as permitted by the above-mentioned clearance between the arms 312 and the gripper casing. When the gripper is moved upwardly in the return of the parts to starting positions the spring 328 may yield to permit upward movements of the arms 312 if the upper edge of the plate 314 catches on the arms, thus avoiding danger of breakage. It will be understood that in this event the spring will have returned the arms to their normal positions by the time the return movement of the gripper has been completed.

The other six toe grippers, and also the forepart side grippers 204 when they are used, are all positioned initially with their jaws spaced somewhat outwardly from the lateral periphery of the last in locations opposite said periphery to facilitate the presentation and positioning of the last in the manner hereinbefore described. Prior to the insertion of the margin of the upper, however, between the jaws of these grippers they are swung inwardly into engagement with the lateral periphery of the last. This is accomplished by the admission of operating fluid under comparatively light pressure to the cylinders 230 to operate the pistons 228, the pressure of the fluid being sufficient to swing the grippers inwardly into engagement with the last and thus to position them as determined by the last but not sufficient to straighten the toggles 220 for closing the jaws on the upper. The closing of the jaws is effected thereafter by the admission of fluid under greater pressure to the cylinders 230. The machine is provided with means for preventing the grippers from being forced any harder against the last when the greater force is thus applied to the toggles 220. For this purpose each of the above-mentioned grippers is provided with an arm 334 (Fig. 25) located between the two sides of its casing 206 and pivotally mounted on a pin 336 on the casing, the arm having mounted on its upper end a roll 338 arranged to engage an abutment member 340 (Figs. 15 and 28) secured on the casting 32. Mounted also in each gripper casing is a locking member 342 controlled by a spring 344 which tends to move it downwardly in the casing. Initially this locking member, as illustrated in Fig. 25, is held down by the spring as far as permitted by engagement of a projection 346 on its upper end with the arm 334, the arm being thus locked between the gripper casing and the abutment member 340. Prior to the inward swinging movements of the grippers into engagement with the last the several locking members 342 are moved upwardly by means hereinafter described to release the arms 334 and thus to permit them to assume relatively to the gripper casings positions determined by the positions of the grippers in engagement with the last. After the grippers have thus engaged the last and prior to the operation of the toggles 220 to close them on the upper, the locking members 342 are released to permit their springs 344 to move them downwardly and thus to lock the arms 334 in the positions which they have assumed relatively to the gripper casings. The increased force applied to the toggles to close the grippers, therefore, does not press the grippers any harder against the last, but only presses the rolls 338 harder against the abutment member 340. To prevent any danger of displacement of the edge of the insole by these several grippers in the upper-pulling operation the abutment member 340 has thereon roll-engaging faces 348 so inclined as to swing the grippers short distances outwardly from the last in response to their upper-pulling movements, these faces being effective thus to swing the grippers by reason of the manner in which the arms 334 are controlled by the locking members 342.

For controlling the locking members 342 in such manner as to produce the results above described there is provided a member 350 (Figs. 13 and 16) having thereon fingers 352 extending loosely within the casings of the several grippers 202 and 204, this member being secured on the upper end of a piston 354 mounted in a cylinder 356 formed in the lower end of the casting 32. Communicating with the lower end of the cylinder is a pipe 358 through which fluid is admitted to the cylinder at the proper times by valve means hereinafter described. When the piston is moved upwardly the fingers 352 on the member 350 are carried into engagement with fingers 360, one of which is shown in Fig. 25, projecting laterally from the lower ends of the locking members 342, and raise the locking members to release the arms 334. The piston 354 is further guided in its movements by a pilot rod 362 extending therefrom into a bore in the casting 32. To retard the latter portion of the upward movement of the piston and to limit its movement there is provided a short rod 364 slidingly mounted in the casting 32 and having therein a slot 366 through which extends a pin 368 in the casting, the rod being engaged on its upper end by a spring 370. Near the end of the upward movement of the piston the member 350 engages the rod 364 and thereafter moves the rod upwardly against the resistance of the spring 370 as far as permitted by the pin 368. The movement of the piston is thus stopped before the fingers 360 on the locking members 342 engage the lower ends of the arms 334. It will be understood that when the fluid is released from the cylinder 356 the springs 344 move the locking members 342 downwardly into operative positions, the fingers 360 acting on the member 350 to start the return movement of the piston 354 which is completed by gravity.

The initial positions of the several toe grippers and of the forepart side grippers 204 heightwise of the shoe are adjustably determined by a plate 372 (Figs. 13 and 18) in engagement with lugs 374 formed on the links 260 connected to these grippers. This plate is secured to a lever 376 pivotally mounted on a pin 378 in a slide 380 rectilinearly adjustable in directions heightwise of the shoe in guideways formed in the casting 32 (Fig. 18). A light spring 382 in the casting 32 tends to swing the lever 376 in a downward direction, its swinging movement in this direction when the plate 372 is not engaged by the lugs 374 being limited to a short movement by engagement of a shoulder (not shown) on the lever with the slide 380. Upward swinging movement of the lever about the pin 378 is adjustably limited by a screw 384 threaded in the lever and arranged to engage a shoulder on the slide 380. It will be understood that when the grippers are held up in their initial positions by the springs 276 the lugs 374 on the links 260 are in engagement with the plate 372 and hold the lever 376 up as far as permitted by the engagement of the screw 384 with the slide 380. It will be evident that, in view of the position of the pin 378, adjustment of the lever in response to turning of the screw 384 will serve to adjust heightwise of the shoe the grippers located at and near the end of the toe to a greater extent than the grippers located farther from the end of the toe. In this manner the grippers may be relatively adjusted heightwise of the shoe to position them in the best relation to the edge of the shoe bottom. Adjustment of all the above-mentioned grippers equally heightwise of the shoe is effected by movement of the slide 380 along its guideways. For this purpose there is mounted in bearings in a bracket 386 (Fig. 18) fast on the casting 32 a shaft 388 having thereon a hand crank 390 and also a worm gear 392 in engagement with another worm gear 394. The gear 394 is threaded interiorly on a spindle 396 secured by a pin 398 in the bracket 386, and is also threaded exteriorly in the slide 380. Its interior threads connecting it to the spindle are right-hand threads and its exterior threads connecting it to the slide are left-hand threads. Thus, as the gear 394 is rotated in either direction, the slide 380 will be moved along in one direction or the other by the combined action of the exterior threads on the slide and a slight bodily displacement of the gear axially along the spindle 396. Inasmuch as the interior threads of the gear are of relatively fine pitch, such axial displacement of the gear, within the full range of adjusting movement of the slide, will not be sufficient to cause gear 394 to get out of mesh with the gear 392.

In operating on shoes having unlined leather uppers, since there is no lining to assist in resisting the force of the pull of the grippers, it has been found desirable to limit the upper-pulling movements of some, at least, of the several forepart grippers independently of the resistance of the upper, especially if the upper is made of comparatively light stock. In the construction herein shown such limiting means is associated with all the forepart grippers except the two toe grippers which are second in order from the central toe gripper. The limiting means for controlling the central toe gripper and the grippers located next thereto at the opposite sides thereof includes two stop members 400 (Figs. 17 and 24) rotatably mounted on headed spindles 402 threaded in the casting 268, these members having cam faces on their lower sides. Secured on the upper end of the piston 272 which operates the central toe gripper is a plate 404 the opposite ends of which are arranged to engage similar cam faces on both the members 400. Secured on the upper ends of the pistons 272 which are next in order at the opposite sides of the central piston are plates 406 arranged to engage other cam faces on the members 400, these cam faces being similar to the faces engaged by the plate 404. By the upward movements of the pistons 272, therefore, the members 400 are moved upwardly without any tendency to cramp them on the spindles 402 until they engage the heads of the spindles which thus limit the upper-pulling movements of the corresponding grippers. It will be evident that by turning the threaded spindles the limits of the movements of the grippers may be adjustably varied. To provide means whereby the operator may, if desired, vary the limits of the movements of the grippers in operating on any particular shoe, after the pull on the upper has taken place and, it may be, after the force of the pull has been temporarily relieved by means hereinafter described, there is pivotally connected to both the stop members 400 a link 408 connected by another link 410 to one arm of a lever 412 pivotally mounted on a stud 414 on the casting 268. The other arm of this lever is connected by a link 416 to one arm of a bell-crank lever 418 (Figs. 1 and 17) pivotally mounted on a bracket 420 on the casting 268, and the other arm of this bell-crank lever is connected by an upwardly extending link 422 to a bell-crank lever 424 (Figs. 2 and 3) mounted to swing about a rod 426 supported in bearings in the top frame casting 234. The bell-crank lever 424 has an upwardly extending arm 428 by which the operator may turn the stop members 400 through the connections described. The stop members are held normally in predetermined positions by mechanism shown in Fig. 49. This mechanism includes a rod 430 pivotally connected at one end to the lever 412 and extending slidingly through a member 432 which is swivelled in a holder 434 mounted in an opening in the frame. In engagement respectively with the opposite sides of the holder are two springs 436 held under compression by nuts 438. It will thus be seen that when the two springs are in balanced relation the members 400 occupy predetermined positions with respect to movements about the spindles 402, and that the turning movements of the members by the arm 428 is effected against the resistance of one or the other of the springs. Means whereby the members will be held temporarily, regardless of the springs 436, in any positions to which they are moved by the arm 428 will be hereinafter described.

For similarly limiting the upper-pulling movements of those toe grippers 202 which are located farthest from the end of the toe and of the forepart side grippers 204, there are associated respectively with these different grippers limiting units 440 all of which are essentially alike and the parts of which are identified by the same reference characters in so far as such characters are used. That unit which is associated with the right-hand forepart side gripper located farthest from the end of the toe is shown in Figs. 22 and 23, and a description of this unit will suffice for an understanding of all of them. Secured on the upper end of the corresponding piston 272 is a plate 442 having on one end an upstanding lug 444 engaged by a cam face formed on the lower side of a stop member 446. A stud 448 extending upwardly from this member and integral therewith is rotatably mounted in a bearing formed in a plate 450. A washer 452 held by a screw 454 on the upper end of the stud overlaps an upwardly extending boss 456 on the plate 450 to limit downward movement of the member 446 relatively to the plate. The plate is secured to the casting 268 by three screws 458 which extend through spacing sleeves 460 between the plate and the casting. By the upward movement of the piston 272 the member 446 is moved upwardly until it engages a screw 462 threaded in the plate 450, this screw determining by its adjustment the limit of the upper-pulling movement of the gripper. By means about to be described the member 446, like the above-mentioned members 400, may be turned about the axis of the stud 448 to vary the limit of the movement of the corresponding gripper after the pull has been applied to the upper. For holding it normally in a predetermined position with respect to such turning movement there are mounted to swing about bushings mounted on the upper ends of two of the screws 458 arms 464 controlled by a spring 466 which tends to swing them toward each other and holds them normally in positions determined by their engagement with a pin 468 fast in the plate 450. Extending upwardly from the member 446 through an arcuate slot 470 in the plate 450 is a pin 472 also arranged to be engaged by the arms 464 for positioning the member as determined by the engagement of the arms with the fixed pin 468. It will be understood that when the member 446 is turned in one direction or the other its pin 472 swings one or the other of the arms 464 against the resistance of the return spring 466. Means whereby the member will be temporarily held against return movement by the spring will be hereinafter described.

Figure 1:
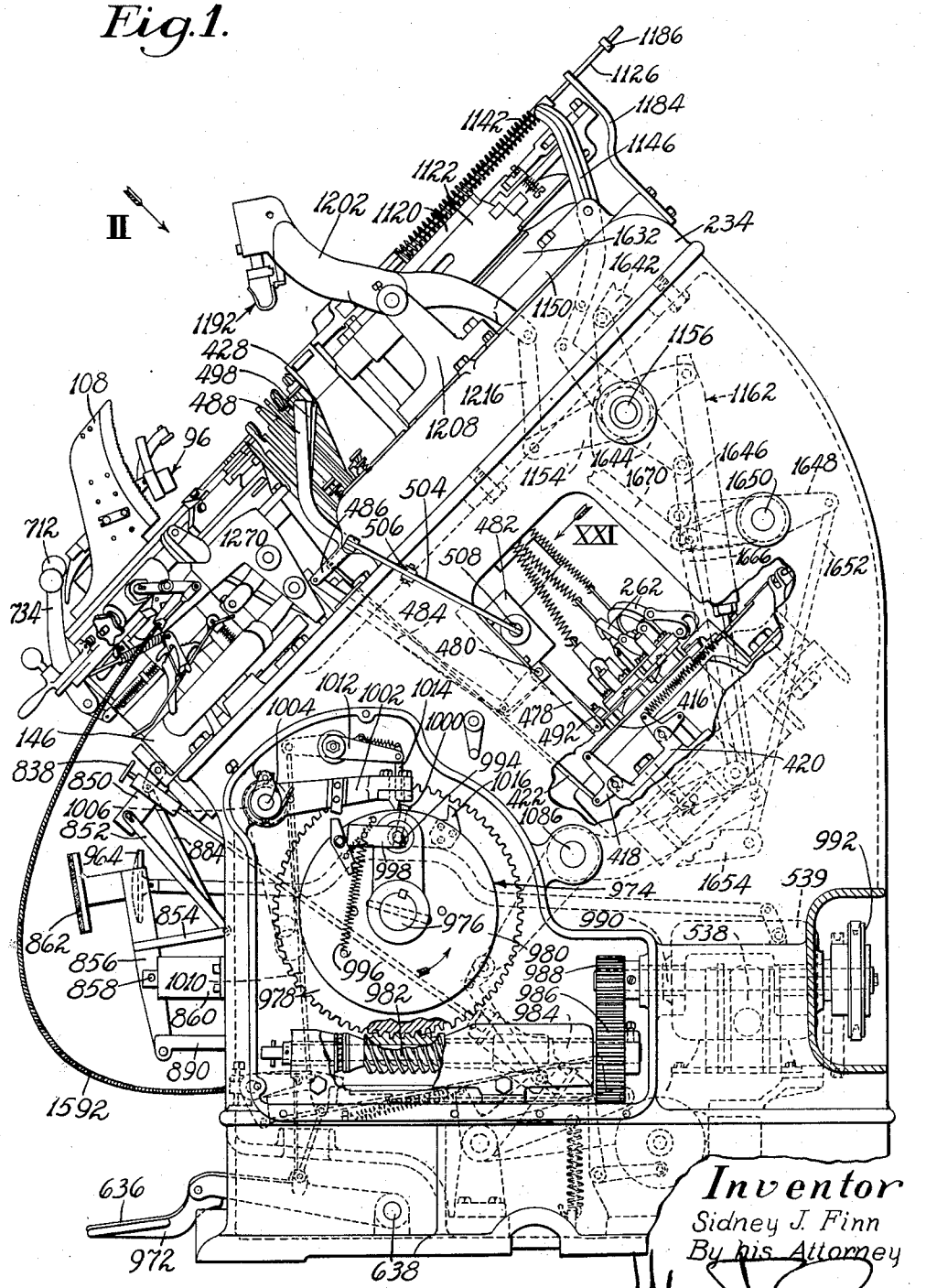
Fig. 1 is a view in right-hand side elevation of the machine in which the invention is herein shown as embodied, with parts broken away.
Figure 2:
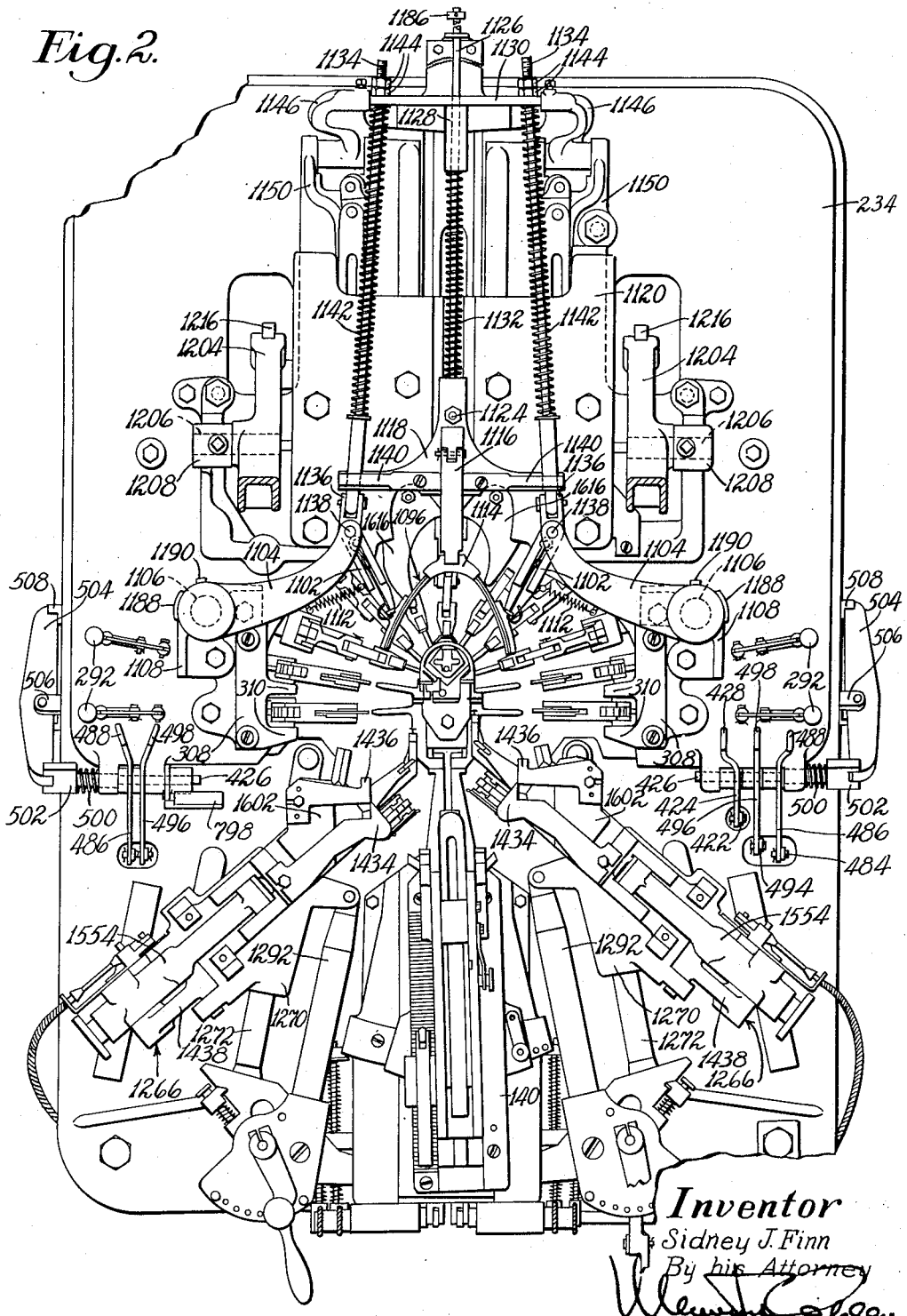
Fig. 2 is a view of the machine in the direction of the arrow II in Fig. 1, with parts broken away.

The two stop members 446 associated with the two forepart side grippers at the right-hand side of the shoe are connected together by a link 474 (Fig. 17), so that these members are turned in unison. For thus turning them one of the members is connected by a link 476 to one arm of a bell-crank lever 478 (Fig. 1) mounted to swing about a pin 480 on a bracket 482 secured to the right-hand side portion of the frame of the machine. The other arm of the bell-crank lever 478 is connected by a link 484 to a bell-crank lever 486 mounted to swing about the rod 426 (Figs. 2 and 3), this bell-crank lever being formed to provide an upwardly extending arm 488 for use by the operator. The stop member 446 associated with the toe gripper which is farthest from the end of the toe at the right-hand side of the shoe is connected by a link 490 to a bell-crank lever 492 also mounted to swing about the pin 480, this bell-crank lever being connected by an upwardly extending link 494 to a bell-crank lever 496 (Figs. 2 and 3) mounted on the rod 426 and formed to provide an upwardly extending arm 498. By the use of this arm, therefore, the operator may move separately the stop member 446 associated with that toe gripper. As illustrated in Fig. 2, there are at the left-hand side of the machine other bell-crank levers 486 and 496 having arms 488 and 498 and mounted on another rod 426, these levers being connected by parts like those at the right-hand side of the machine to the corresponding stop members 446 for controlling like grippers at the left-hand side of the shoe.

For holding the stop members 400 and 446 in the positions to which they may have been moved by the operator after the pull on the upper, despite the tendency of the springs 436 and 466 to return them to their normal positions, each of the rods 426 (Fig. 2) is slidingly movable lengthwise in its bearings in the top frame casting 234 and has in one of the bearings a diametrically enlarged portion arranged to abut against the hub of the bell-crank lever 486. A spring 500 mounted on the enlarged portion of each rod between the adjacent bearing and a head 502 on the outer end of the rod holds the rod initially in a position such that its enlarged portion does not apply pressure to the hub of the bell-crank lever 486, so that the members 400 and 446 will be in their normal positions under the influence of their return springs. The outer end of the head 502 of each rod is provided with a slot in which lies one end of a lever 504 pivotally mounted between its ends on a member 506 fast on the frame, the opposite end of this lever similarly engaging the outer end of a fluid-operated piston 508. Each of these pistons is mounted in a cylinder 510 formed in the bracket 482 at the same side of the machine, the parts at the right side of the machine being shown in Fig. 21. Through a pipe line 512 fluid is admitted to both cylinders 510 at the time in the operation of the machine when it is admitted to the cylinders 274 for imparting the upper-pulling movements to the forepart grippers (see Fig. 53). Accordingly the force applied by the lever 504 to the rod 426 at the right-hand side of the machine presses the hubs of the bell-crank levers 424, 486 and 496 against one another and the hub of the lever 424 against one of the rod bearings in such manner that these levers will be held fractionally in any positions to which they are moved by the operator, so that the corresponding stop members 400 and 446 also will remain in their adjusted positions. It will be understood that the two corresponding levers 486 and 496 at the left-hand side of the machine will be similarly controlled by the fluid-operated lever 504 at that side of the machine. Prior to the completion of the operation of the machine, when the fluid is released from the cylinders 274, it is released from the two cylinders 510 to permit the rods 426 to be returned by their springs 500.

In order that the effect of the pull of the forepart grippers on the upper may be still more precisely predetermined, some of these grippers are provided with means for limiting the extent to which the margin of the upper is inserted between their jaws. In the construction herein shown such means is applied to the central toe gripper and to each alternate gripper counting therefrom in opposite directions. For this purpose each of these grippers has secured to opposite sides of the upper end of its casing 206 plates 514 each having therein a slot 516 (Figs. 54 and 55) to receive the margin of the upper. The extent of projection of the margin inwardly between the jaws is thus determined by engagement of its edge with the plates at the inner ends of the slots.

To cause the upper to be subjected to a gradual rather than a rapid pull by the forepart grippers, there is associated with each of the gripper-operating levers 262 (Figs. 13 and 17) a small piston 518 mounted in a cylinder 520 formed in a casting 521, this piston being arranged to engage a roll 522 on the lever to retard the movement of the lever by the piston 272 and being of smaller diameter than the latter piston. The cylinders 520 are all in communication with one another at their lower ends through passages in the casting 521 and receive fluid from a pipe 524 which, as hereinafter more particularly described, is initially in open communication with the source of fluid supply. Accordingly the pistons 518 are initially subjected to the pressure of the fluid and are held upraised when the fluid at the source is under pressure. These pistons further assist in returning the grippers to their initial positions when the fluid is released from the cylinders 274.

When the grippers release the upper, in response to release of the fluid from the cylinders 230, it is desirable that they be moved quickly farther in the direction of their pull on the upper to out-of-the-way positions. For this purpose, especially in view of the fact that the movements of most of the gripper-operating pistons 272 are limited by the stop members hereinbefore described, there is provided a piston 526 mounted in a cylinder 528 and connected to a rod 530 movable in a bearing in the casting 268. On the upper end of this rod is secured a plate 532 arranged to engage fingers 534 extending laterally from the lower ends of the several links 260 connected to the grippers. In response to downward movement of the piston 526, therefore, this plate serves to move the grippers farther downwardly, their downward movements being limited by the engagement of flanges on the upper ends of the small pistons 518 with the casting 521 in which the cylinders 520 are formed. Fluid is admitted at the proper time to the cylinder 528 through a pipe 536. Means whereby the fluid effective on the pistons 518 and 526 is controlled will be hereinafter more particularly described.

Figure 45:
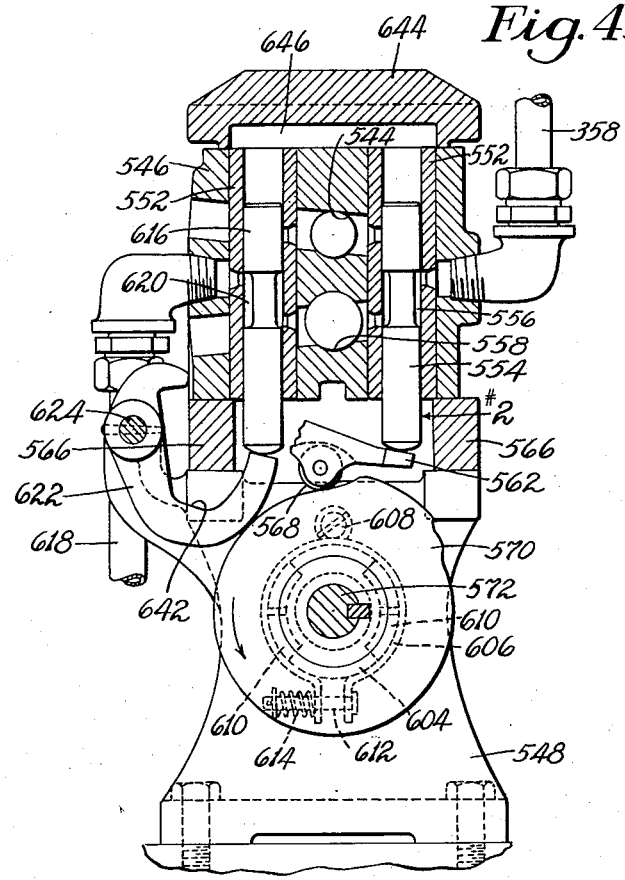
Fig. 45 is a section on the line XLV—XLV of Fig. 42.

For generating fluid pressure to operate different portions of the machine there is provided a rotary pump 538 (Figs. 1, 40 and 53) driven continuously by an electric motor 539. The pump receives fluid, preferably light oil, through a pipe 540 from a sump in the base of the machine and delivers the fluid through a pipe 542 to a manifold 544 (Figs. 43 and 45) formed in a casting 546 supported by brackets 548 (Fig. 42) on the base of the machine. The normal maximum pressure of the fluid delivered by the pump is adjustably determined by relief valve mechanism 550 (Fig. 10) hereinafter described. Mounted in the casting 546 are eight sleeves 552 in seven of which are mounted vertically movable cam-operated piston valves 554 with annular recesses 556 therein for controlling flow of operating fluid from the manifold 544 through ports in the sleeves to different cylinders and, in most instances, return flow of the fluid to an exhaust manifold 558 formed in the casting 546, the fluid being conducted from this manifold back to the sump through a pipe 560. Each of these cam-operated valves, which are all essentially alike, rests at its lower end on one end of a lever 562 which is pivotally mounted at its other end on a member 564 secured to one of two bars 566 interposed between the casting 546 and the brackets 548. Each lever 562 is provided with a roll 568 engaged by the appropriate one of seven cams 570 fast on a cam shaft 572 mounted in bearings in the brackets 548 and in another bracket 574 on the base of the machine. For convenience hereinafter in describing in detail the operation of the machine the seven valves 554 are identified, especially on the diagram (Fig. 53), by the numbers 1 to 7 inclusive, and the cams 570 which respectively operate these different valves are correspondingly identified, especially in Fig. 42, by the same numbers.

Figure 46:
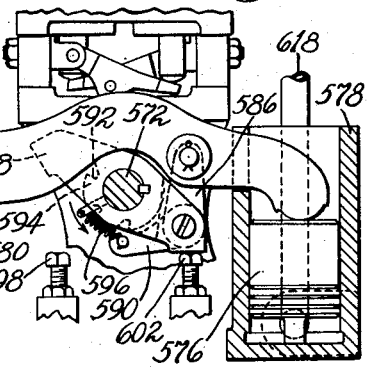
Fig. 46 is a section on the line XLVI—XLVI of Fig. 42.

The operations which have been thus far described as effected by fluid-pressure means result from a half-revolution of the cam shaft 572 in three successive stages, the shaft being turned in each stage through sixty degrees. For thus turning the shaft there is provided a fluid-operated piston 576 (Figs. 41 and 46) mounted in a cylinder 578 on the base of the machine, this piston engaging one end of a lever 580 which is pivotally mounted at its other end on a shaft 582 supported by brackets 584 on the base. The lever 580 is connected by a link 586 to one arm of a pawl carrier 588 which is mounted to turn about the cam shaft 572 and has another similar arm extending from the opposite side of the cam shaft. Pivotally mounted on the pawl carrier is a pawl 590 arranged to enter at different times three notches 592 (Fig. 47) formed in a cylindrical member 594 which is fast on the cam shaft. A spring 596 connected to the pawl and to a pin in the member 594 tends to hold the pawl in the different notches, the pawl and the notches, however, being so formed that upon rotation of the pawl carrier 588 in a clockwise direction with reference to Fig. 46 about the cam shaft the pawl will leave one notch and be carried to a position where it enters the next notch. It will be evident that upward movement of the piston 576 by fluid admitted to the lower end of the cylinder 578 will swing the lever 580 upwardly and thereby turn the pawl carrier 588 in a counterclockwise direction. The pawl 590 being located, as shown, in the first of the three notches 592, the cam shaft 572 and the cams thereon will be turned in the same direction by this movement of the pawl carrier. To cause the cam shaft to be turned only through an arc of sixty degrees one arm of the pawl carrier 588 engages the head of a screw 598 mounted in the bracket 574 to limit the movement of the carrier and accordingly the movements of the lever 580 and the piston 576. Upon release of the fluid from the cylinder 578 the lever 580 and the piston 576 are moved downwardly by a spring 600 connected to the lever, and by this movement of the lever the pawl carrier is turned in a clockwise direction about the cam shaft, thus causing the pawl 590 to leave the notch 592 in which it was located and to enter the next notch in the member 594. These movements of the lever and the pawl carrier are limited by engagement of the other arm of the pawl carrier with the head of a screw 602 also mounted in the bracket 574. The next upward movement of the piston 576 will similarly cause the cam shaft to be turned through a second arc of sixty degrees, and similarly a third upward movement of the piston, following a second return movement thereof, will cause the cam shaft to be turned through a third arc of sixty degrees, thus completing the half-revolution of the shaft. To insure that the cam shaft will not be turned too far at any time or be turned reversely it has fast on one end thereof a grooved brake pulley 604 (Figs. 42 and 45) cooperating with which is a resilient brake band 606 supported above the pulley by a screw 608 in the bracket 548. The band is provided with brake shoes 610 in frictional engagement with the pulley in the groove formed therein, and the ends of the band are connected together by a bolt 612 and a spring 614 in the manner illustrated in Fig. 45 to hold the brake shoes yieldingly in engagement with the pulley.

Figure 40:
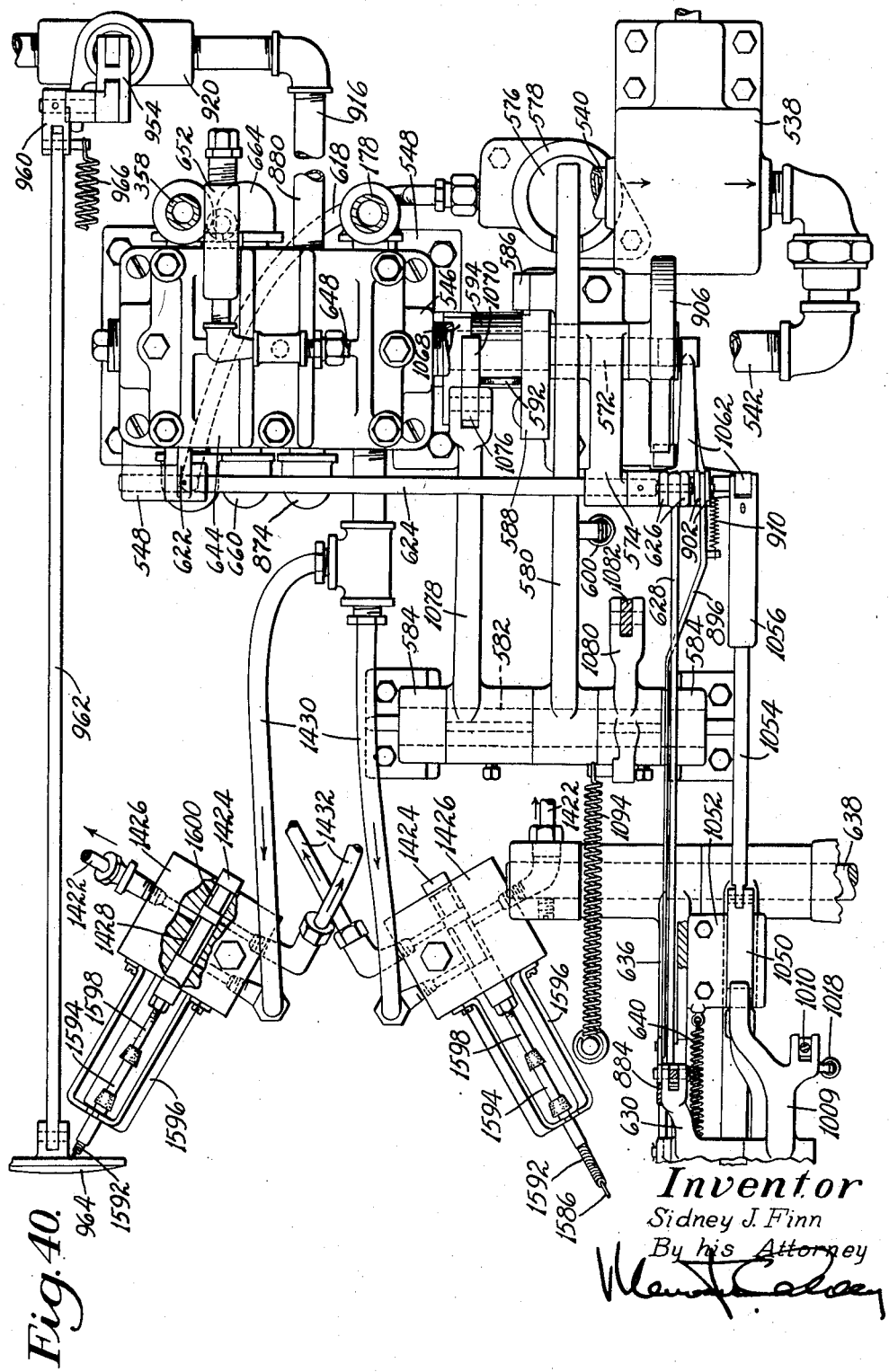
Fig. 40 is mainly a plan view showing means at the base of the machine for generating fluid pressure and for controlling the use of such pressure to operate portions of the machine.

Admission of fluid to the lower end of the cylinder 578 and exhaust of the fluid therefrom are controlled by a treadle-operated piston valve 616 (Fig. 45) which is mounted in the eighth sleeve 552 in the casting 546. Leading from the cylinder to this valve is a pipe 618, and it will be seen that, with the parts in their initial positions, the cylinder is in communication, through an annular recess 620 in the valve, with the exhaust manifold 558. To interrupt communication with this exhaust manifold and to open communication between the cylinder and the pressure manifold 544 it is necessary to move the valve upwardly, and for this purpose there is provided a curved valve-operating member 622 one end of which is arranged to engage the lower end of the valve and the other end of which is initially in engagement, as shown, with the casting 546. The member 622 is fast on a rockshaft 624 which, as shown in Fig. 40, is mounted in a bearing in the bracket 574 and in another bearing in one of the brackets 548. Fast on one end of the rockshaft is an arm 626 connected by a link 628 with one arm of a bell-crank lever 630 (Fig. 41) mounted to swing about a rod 632 near the front of the machine. The other arm of this bell-crank lever is connected by a link 634 to a treadle 636 mounted to swing about a rod 638 supported on the base of the machine. A spring 640 connected to the bell-crank lever 630 tends to swing it in the direction to raise the treadle and holds it initially in the position determined by engagement of the valve-operating member 622 with the casting 546. Movement of the member 622 in the direction to raise the valve 616 is limited by engagement of a face 642 thereon with one of the bars 566. It will be seen that by depression of the treadle 636 the valve 616 is thus raised to admit fluid to the cylinder 578 and thereby to cause the sixty degree rotation of the cam shaft 572 as hereinabove described, and that to cause the cam shaft to complete a half-revolution three successive depressions of the treadle are necessary. As hereinafter explained in greater detail, the first depression of the treadle causes the toe grippers, except the central toe gripper 92, and also the forepart side grippers 204 if they are used, to be swung inwardly against the lateral periphery of the last and also causes the heel rest holder 110 to be moved rearwardly into position to hold the heel rest firmly against the shoe and to lock it in the heightwise position determined by the last. This depression of the treadle further causes the member 350 (Figs. 13 and 25) to be moved upwardly to raise the locking members 342 to idle positions. The second depression of the treadle causes the member 350 to move downwardly and thus to release the locking members which therefore assume their locking positions, and also causes the closing of the grippers on the margin of the upper. The third depression of the treadle causes the grippers to be moved downwardly to apply their pull to the upper.

To hold the several piston valves 554 at all times in engagement with the levers 562 and to move them downwardly whenever permitted by their operating cams, and likewise to hold the treadle-operated valve 616 always in engagement with the member 622 and to move it downwardly, a head 644 secured in fluid-tight relation to the casting 546 has therein a chamber 646 in open communication with the spaces in the upper ends of the sleeves 552 above the several valves, and sufficient fluid pressure is maintained in this chamber to apply the required downward force to the valves. For thus maintaining the pressure in the chamber 646 the pump 538 (Fig. 53) is in communication with a pipe 648 (Fig. 42) leading into the chamber through the head 644. In this pipe there is a manually operated valve 650 by which the flow of the fluid into the chamber may be restricted as much as desired, and in communication with the same pipe is a member 652 having therein a relief valve 654 (Fig. 43) controlled by a spring 656 against the resistance of which the valve may open to permit fluid to escape into a pipe 658 leading to the sump. It will be understood that movements of the piston valves 554 will tend to vary the pressure of the fluid in the chamber 646, and the spring-controlled relief valve 654 affords provision for such release of fluid from the chamber as to prevent the pressure from at any time becoming excessive while insuring at all times sufficient pressure to hold or move the valves down as required.

The fluid for imparting the upper-pulling movements to the central toe gripper and the gripper next thereto at each of the opposite sides thereof is conducted from valve #4 in the casting 546 through a pipe 660 (Figs. 17 and 53) to a passageway 662 in the casting 268. This passageway leads into the lower end of one of the three cylinders 274 (Fig. 13) associated with the above-mentioned grippers, this cylinder being in open communication through passageways in the casting 268 with the other two cylinders. The fluid for operating the other toe grippers 202 and the forepart side grippers 204 is conducted from valve #5 through a pipe 664 to a cross pipe 666 the opposite ends of which are in communication respectively with passageways 668 in the casting 268. Each of the passageways 668 is in communication with the lower end of one of the four cylinders 274 associated with the above-mentioned grippers at one side of the shoe, and through passageways in the casting 268 this cylinder is in open communication with the other three cylinders. It may be stated at this point that valve #4 is operated slightly before valve #5, so that the central toe gripper and the gripper next thereto at each of the opposite sides thereof begin to pull the upper slightly earlier than the other above-mentioned grippers.

As previously stated, the cylinders 520 in which are located the pistons 518 (Figs. 13 and 17) for retarding the upper-pulling movements of the several forepart grippers all receive fluid from a pipe 524 which is initially in open communication with the source of fluid under pressure. It is desirable that in the upper-pulling operation the pressure of the fluid in these cylinders be somewhat relieved, so that by the end of the operation the upper will have been subjected to the full force required. For this purpose there is provided valve means shown in Fig. 48. The pipe 524 is in communication with an annular recess 670 formed in a spool valve 672 movable in a cylinder 674, this valve being held initially in an upraised position determined by its engagement with a plate 676 on the cylinder by means of a spring 678 seated on a cap 679 on the cylinder. When the valve is in this position its annular recess 670 is in communication through a pipe 680 with an annular recess 682 formed in another spool valve 684 mounted in a cylinder 686, this annular recess being initially in communication, through a pipe 688, with a fluid line leading from the pump (Fig. 53). With the parts, therefore, in the positions shown, the fluid in the cylinders 520 is under the same pressure as the fluid in the manifold 544. Communicating with the interior of the upper end of the cylinder 674 above the valve 672 is a pipe 690 which is also in communication (Fig. 53) with the three upper-pulling cylinders 274 associated with the central toe gripper and the two grippers at the opposite sides thereof. When the pressure is applied in these cylinders, therefore, this pressure is effective to impart downward movement to the valve 672 and thus to interrupt communication between the cylinders 520 and the pipe 680. Continued movement of the valve, limited by engagement of a flange 691 thereon with the cap 679, opens communication between these cylinders and an exhaust pipe 692 through which fluid may escape slowly from the cylinders to the sump. The retarding action of the pistons 518 is thus sufficiently reduced to permit the upper to be pulled with the full force required. It will be understood that when the fluid is later released from the cylinders 274 the valve 672 is returned to its uppermost position by the spring 676 to admit the fluid under pressure again to the cylinders 520, so that the pistons 518 will assist in the return of the grippers. An additional function of the valve 684 will be hereinafter described.

After the several toe grippers and the forepart side grippers have pulled to upper and while they are still holding it, it may be desirable to shift the upper, or portions thereof, relatively to the last lengthwise of the edge of the insole. The several gripper casings 206 are, therefore, connected loosely enough, by the means hereinbefore described, to the rods 254 to permit the grippers to be swung relatively to these rods lengthwise of the edge of the insole far enough for the purpose in view. The seven toe grippers are controlled with respect to such swinging movements by a member 694 (Figs. 13 and 14) which is mounted to turn about an axis extending heightwise of and intersecting the shoe on a bushing 696 surrounding a pin 698 which is fixed in the block 28. The member 694 is provided with a plurality of fingers 700 extending somewhat loosely within the casings 206 of the several grippers, so that by the turning of the member in one direction or the other the several grippers will all be shifted in the same peripheral direction lengthwise of the edge of the insole around the toe. For turning the member thus to shift the grippers, there are pivotally connected to it at the opposite sides of the pin 698 forwardly extending links 702 which are pivotally connected at their front ends to other forwardly extending links 704 (Figs. 4, 28 and 30). The links 704 are pivotally connected respectively at their front ends to arms 706 extending downwardly from sleeves 708 (Fig. 3) which are mounted for turning movements in blocks 710 secured to the front of the previously mentioned casting 144. Each of the sleeves 708 has fast on its outer end an upwardly extending hand lever 712 whereby the sleeve maybe turned. It will be understood that by swinging one of these hand levers in one direction and the other simultaneously in the opposite direction the member 694 is turned to shift or adjust the several toe grippers as described. Pivotally connected to each hand lever 712 below the sleeve 708 is the front end of a rod 714 extending rearwardly through an opening in a bracket 716 on the casting 144. Surrounding this rod are two springs 718 and 720 each abutting against the bracket 716 at one end, the other end of the spring 718 engaging a washer seated on an enlarged front end of the rod and the other end of the spring 720 engaging a washer confined by a nut 722 on the rod. The springs, therefore, normally centralize the member 694 with respect to turning movement. They do not, however, prevent the toe grippers from remaining substantially in the positions to which the operator may shift them, by reason of the friction of the upper on the last under the force of the pull applied by the grippers.

For similarly shifting the forepart side grippers 204 lengthwise of the edge of the insole, there are provided above the links 702 slides 724 (Figs. 28 and 30) guided for movements lengthwise of the shoe in the member 34 and each provided with a pair of fingers 726 (Fig. 14) extending within the casings of the two forepart side grippers at the same side of the shoe when these grippers are used. The slides 724 are connected at their front ends to forwardly extending links 728 the front ends of which are pivotally connected to short arms 730 (Fig. 4) extending downwardly from shafts 732 (Fig. 3) rotatably mounted within the sleeves 708. The outer end of each shaft 732 has fast thereon an upwardly extending hand lever 734. It will thus be seen that by the hand levers 734 the operator may shift the forepart side grippers lengthwise of the last, the pair of grippers at either side of the last being thus shiftable independently of the other pair. Connected to each hand lever 734 is a rod 736 surrounding which are springs 738 and 740 performing the same functions with respect to the forepart side grippers that the springs 718 and 720 perform with respect to the several toe grippers.

To facilitate shifting of the grippers as above described, the machine is provided with means for relieving the force of their pull on the upper. As shown in Fig. 17, there is associated with the three cylinders 274 in which are the pistons 272 for imparting the upper-pulling movements to the central toe gripper and the two grippers located respectively at the opposite sides thereof a valve unit 742 the construction of which is shown in greater detail in Figs. 19 and 20. This valve unit includes a spool valve 744 mounted in a bore in the casting 268, this bore intersecting the passageway 662 which leads from the pipe 660 to the cylinders. The valve is provided with an annular recess 746 to permit normally flow of the fluid through the passageway 662. The valve is connected by a link 748 to a bell-crank 750 mounted on a pin 752 supported by a bracket 754 fast on the casting 268, and connected to the bell-crank is a spring 756 which tends to move the valve downwardly, the normal position of the valve being determined by engagement of a pin 758 carried by the bell-crank with the top of a block 760 secured to the casting 268. Mounted in a cylinder 762 formed in the block 760 is a piston 764 arranged to engage the pin 758 and to raise the valve as far as permitted by engagement of the pin with a projection 766 on the block 760. By such upward movement the valve interrupts communication between the pipe 660 and the cylinders 274 and carries a port 768 of very small diameter formed in the valve into communication with the portion of the passageway 662 which is still in communication with the cylinders. This port communicates with a vertical bore 770 formed in the valve, from which bore a tube 772 extends downwardly to discharge fluid into the sump.

The raising of the valve, therefore, relieves the pressure in the three above-mentioned cylinders 274 to cause the corresponding grippers to relax the force of their pull on the upper and thus to permit these grippers to be more readily shifted about the toe in the manner hereinbefore described. For similarly controlling the two other toe grippers and the two forepart side grippers at each side of the shoe there is associated with each of these sets of grippers another valve unit 774 which is substantially identical with the valve unit 742 and operates in the same manner with respect to the passageway 668 to relieve the pressure of the fluid in the four corresponding cylinders 274.

The piston 764 of the valve unit 742 and the corresponding pistons of the two other valve units 774 are all operated simultaneously by fluid admitted to the cylinders 762 of the units. The cylinder 762 of the unit 742 is in communication with the corresponding cylinder of one of the units 774 through a pipe 776 and with the corresponding cylinder of the other unit 774 through a pipe 778. In communication with the pipe 778 is a pipe 780 which, as shown in Figs. 48 and 53, leads to a spool valve 782 movable in a valve casing 784 fast on the frame of the machine. An annular recess 786 in this valve initially affords communication between the pipe 780 and an exhaust pipe 788 leading to the sump. In response to forward movement of the valve 782 communication between the pipe 780 and the exhaust pipe 788 is interrupted and communication is establisehed between the pipe 780 and a pipe 790 leading from the pump, thus causing the pistons 764 of the valve units 742 and 774 to rise and relieve the pressure in the several gripper-operating cylinders 274. For thus moving the valve 782 it is connected by a link 792 to a bell-crank lever 794 pivotally mounted on one of the previously mentioned pins 480, and this bell-crank lever is connected by another link 796 to a hand lever 798 pivotally mounted on the left-hand one of the two rods 426 (Fig. 24). By rearward swinging movement of the hand lever 798, therefore, the valve 782 is moved forwardly as described. To retain the valve in the position to which it is moved there is mounted on the pin 480 a spring 800 (Fig. 51) in frictional engagement with the bell-crank lever 794 and with a portion of the bracket 432 in which the pin 480 is supported. It is by means of the hand lever 798 that the operator may also relieve the force of the pull of the grippers on the upper preparatory to the shifting of the stop members 400 and 446 which limit movements of the grippers as hereinbefore described.

After having shifted the grippers, or some of them, to adjust the upper as desired, the operator returns the valve 782 to its initial position to restore the full pressure in the cylinders 274. To insure that the upper in its adjusted position will be satisfactorily conformed to the contour of the last, it is desirable at this time to increase the upper-pulling forces applied to the grippers, and for this purpose the machine is provided with means for increasing momentarily the pressure of the fluid effective in the cylinders 274. This is done by control of the previously mentioned relief valve mechanism 550 shown in Fig. 10. This mechanism comprises a casing 802 in which is threaded a sleeve 804, and slidingly mounted in this sleeve is a relief valve 806 extending through the lower end portion of which are a plurality of ports 808. When there is no pressure in the fluid system these ports are closed, as shown in Fig. 10, by the surrounding sleeve 804, the lower end of the valve engaging a shoulder on the casing 802. The valve is held in this position by a spring 810 which surrounds a rod 812 and bears at one end against an enlarged conical end of the rod which engages the valve 806. The other end of the spring bears against a collar 814 slidingly mounted on a diametrically reduced portion of the rod 812 and shown as seated against a sleeve 816 which is threaded in a cap 818 on the sleeve 804. The lower end of the casing 802 is in communication with a pipe 820 leading from the pump. The pressure of the fluid delivered by the pump, therefore, moves the valve 806 upwardly against the resistance of the spring 810 to permit escape of fluid through the ports 808 into an annular recess 822 in the sleeve 804 and thence through ports 824 in the sleeve into a recess 826 in the casing 802, this recess being in communication with a pipe 828 through which the fluid returns to the sump. It will thus be seen that the maximum pressure of the fluid delivered by the pump is determined by the spring 810 which may be preliminarily adjusted to vary the pressure by turning the sleeve 816. The normal maximum pressure will preferably be about 100 pounds.

Slidingly mounted in the sleeve 816 is a member 830 in engagement with the collar 814 and provided with a bore 832 into which the reduced portion of the rod 812 extends. Seated in a curved recess in the outer end of this member is a rounded end of a rod 834 the other end of which extends into a bore formed in a block 836, this block having threaded therein a spindle 838 in engagement with the end of the rod. From the block 836 a pin 840 (Fig. 3) extends through a bore in one end of a lever 842 secured between its ends on a rockshaft 844, this rockshaft being supported in a bearing in a bracket 846 on the casting 146 and in a bearing in the head of the cylinder 176. Threaded in the other end of the lever 842 is a screw 848 arranged to engage the bracket 846 to limit movement of the rockshaft 844 in one direction. Also fast on the rockshaft is an arm 850 connected by a link 852 to a bar 854 which is fast on a lever 856 pivotally mounted at 858 (Fig. 1) on a bracket 860 secured to the front of the frame of the machine. On its upper end the lever 856 carries a pad 862 arranged to be engaged by one of the operator's knees. In response, therefore, to rearward movement of the pad 862 the lever 856 acts, through the bar 854, to pull the link 852 in a downward direction and thereby to impart downward swinging movement to the arm 850 on the rockshaft 844. In this manner the rockshaft is turned in the direction to cause the spindle 838 to impart downward movement to the rod 834 and thereby, through the member 830, to increase the compression of the spring 810. This results in an increase in the pressure of the fluid delivered by the pump, since more pressure is required to hold the relief valve 806 in the position to permit escape of the fluid. The grippers, therefore, are subjected momentarily to the greater upper-pulling force desired. To prevent the development of excessive pressure at this time there is provided in the fluid line between the pump and the relief valve 806 another relief valve 864 (Fig. 53) which, as shown, closes this line when there is no pressure in the system, but upon the starting of the pump is moved by the pressure of the fluid against the resistance of a spring 866 to permit passage of the fluid to the manifold 544 and to the relief valve 806. The increased pressure resulting from control of the valve 806 in the manner above described moves the valve 864 still farther against the resistance of the spring 866 and before the pressure becomes excessive opens an exhaust passage 868 through which fluid escapes to the sump. When the operator releases the knee pad 862 the spring 810 serves to return the pad and the parts operated thereby to their initial positions, the pressure returning to normal because of the expansion of the spring. The spindle 838 may be conveniently turned by the operator at any time to vary the compression of the spring 810 and thereby to vary the normal maximum pressure of the fluid delivered by the pump, the spindle acting through the rod 834 on the member 830 which moves relatively to the sleeve 816. It will be understood that by reason of this control the collar 814 may be spaced more or less from the end of the sleeve 816, in which case the spring 810 will position the parts initially as determined by engagement of the screw 848 with the bracket 846.

As illustrated diagrammatically in Fig. 53, the gripper-closing cylinders 230 associated respectively with the central toe gripper and the two grippers next thereto at the opposite sides thereof are in communication with a chamber 870, and two groups of four other gripper-closing cylinders 230 located respectively at the opposite sides of the shoe are in communication respectively with chambers 872 which are in open communication with the chamber 870. For swinging all the corresponding grippers, except the central toe gripper, inwardly against the last in response to the first depression of the treadle 636, as hereinbefore described, a fluid line 874 leads from one of the chambers 872 to valve #1 which is operated by the appropriate one of the group of cams 570. Since the pressure applied in the cylinders 230 at this time must not be great enough to straighten the toggles 220 and thereby to close the grippers, a spring-controlled pressure-reducing valve 876 of well-known construction is located in the fluid line 874 to limit adjustably the pressure in this line, which will preferably be about 25 pounds. This valve, constructed and arranged as shown, will prevent any reverse flow of the fluid to valve #1. Greater pressure is thereafter applied in the chambers 870 and 872 for closing the grippers in response to the second depression of the treadle. Fluid for thus closing the grippers by the straightening of the toggles 220 flows to one of the chambers 872 through a fluid line 880 leading from valve #3. Located in this fluid line, not far from valve #3, is a spring-controlled pressure-reducing valve 882, the spring being preferably adjusted to reduce the pressure to about fifty pounds. This pressure is sufficient to hold the grippers closed on the upper, while not being great enough to cause excessive friction as the grippers are moved downward relatively to the closing means and the abutment 340 in the upper-pulling operation.

To insure that all the forepart grippers will, in the first instance, be closed firmly on the upper by the straightening of the toggles 220 when valve #3 is operated by its cam to admit fluid to the line 880, provision is afforded for momentarily increasing at this time the pressure in line 880. For this purpose use is made of the previously described means (Fig. 10) for increasing the pressure of the fluid delivered by the pump through control of the relief valve 806. To this end, there is a link connection 884 (Figs. 10 and 41) between the arm 850 on the rockshaft 844 and the bell-crank lever 630 operated by the treadle 636. When the treadle, therefore, is depressed the second time to impart to the cams on the cam shaft 572 their second 60° movement, thus causing valve #3 to admit fluid to the line 880, the mechanism hereinbefore described as operated by the knee pad 862 is operated by the treadle to increase the pressure of the fluid delivered by the pump. In order that this increased pressure will be fully effective in the gripper-closing cylinders 230 regardless of the pressure-reducing valve 882, there is a by-pass line 886 for conducting fluid from the pump to the line 880 nearer the cylinders 230 than the valve 882. In this by-pass line is a spool valve 888 (Figs. 41 and 53) which normally closes the line, this valve being connected by a link 890 to the lower end of the lever 856 previously described as a part of the knee-operated means for controlling the relief valve 806. In response, therefore, to the second depression of the treadle 636 not only is the pressure increased by control of the relief valve 806, but also the valve 888 is moved into position to admit the fluid under the increased pressure to the line 880. In order that the treadle 636 will be effective thus to control the relief valve and the valve 888 only when it is depressed the second time, there is formed in the lower end of the link 884 an L-shaped slot 892 into which a pin 894 connecting the treadle-operated link 634 to the bell-crank lever 630 extends. Normally this pin is positioned at the upper end of an upwardly and downwardly extending portion of the L-shaped slot, as illustrated in Fig. 10, and accordingly no operative movement is imparted to the link 884 by the first depression of the treadle. Pivotally connected at one end to the lower end of the link 884 is a rearwardly extending link 896 provided at its rear end with a slot 898 into which extends a pin 900 mounted on the upper end of a lever 902 (Fig. 41) mounted between its opposite ends to turn about the rockshaft 624. On its lower end this lever carries a roll 904 arranged to engage the periphery of a cam wheel 906 (Fig. 42) carried by the cam shaft 572. This cam wheel has on its periphery a cam 908 which, in response to the first depression of the treadle 636, swings the lever 902 in a clockwise direction with reference to Figs. 10 and 41. In this movement the lever acts through a spring 910, which is connected to the pin 900 and to the link 896, to move this link rearwardly and thus to swing the link 884 in a rearward direction until the pin 894 is in a shorter forwardly and rearwardly extending portion of the L-shaped slot 892. With the parts in this relation the pin 894 is effective, in response to the second depression of the treadle, to increase the pressure in the fluid line 880 in the manner described. Before the completion of the depression of the treadle the cam 908 is carried to a position beyond the roll 904, so that it is no longer effective on the lever 902, although the link 884 is still controlled by the treadle because of the friction between it and the pin 894. When the operator releases the treadle, the parts operated through the link 884 are returned by the spring 810 in the same manner as upon release of the knee pad 862 after their operation by this pad, the valve 888 being returned to a position in which it closes the by-pass line 886 by reason of its connection to the lever 856. Thereafter, since the pin 894 is no longer pressed frictionally against the link 884 in the L-shaped slot 892, this link, by its weight, swings forwardly until the pin 894 is again positioned, as initially, at the upper end of the upwardly and downwardly extending portion of the L-shaped slot.

After the increased pressure has been applied in the gripper-closing cylinders in the manner above described in response to the second depression of the treadle, the pressure in these cylinders drops to that for which the pressure-reducing valve 882 is set, namely, about fifty pounds. Such drop in pressure is due partly to the expansion of the spring 810 (Fig. 10) controlling the relief valve 806 in response to the release of the treadle by the operator, this spring expanding to some extent before the valve 888 returns far enough to close the by-pass line 886. Since the spring 810, however, normally determines a pressure of about one hundred pounds, it is necessary to reduce still further the pressure in the line 880. For this purpose there is located in this line, between the pressure-reducing valve 882 and the cylinders 230, a spring-controlled relief valve 912 which permits escape of fluid to the sump until the pressure is reduced to about 50 pounds. While this relief valve will necessarily also permit some escape of the fluid when the increased pressure is applied in the line 880 through the by-pass line 886, such escape of fluid is so slow that it does not at that time materially affect the pressure applied in the cylinders 230 because of the opportunity for free flow of the fluid under the increased pressure from the pump into the line 880.

After the closing of the grippers on the upper in response to the second depression of the treadle, the operator may desire to relocate the margin of the upper between the jaws of one or more of the grippers. To permit this to be done there is provided relief valve mechanism 914 (Figs. 43, 44 and 53) by the use of which the operator may cause such a reduction of the pressure in the fluid line 880 that the gripper jaws will open, enough pressure remaining, however, to hold the grippers which were swung inwardly against the last in response to the first depression of the treadle still in those positions. This mechanism is located on a by-pass 916 one end of which is connected to the fluid line 880 between valve #3 and the pressure-reducing valve 882 and the other end of which is connected to the line beyond the valve 882. As shown in Fig. 44, the valve mechanism 914 includes a valve member 918 slidingly mounted in a casing 920 secured to a fixed portion of the machine, the valve member having therein a passageway 922 which is normally in communication at its opposite ends with the by-pass 916, the normal position of the member being determined by engagement of a screw 924 carried thereby with the casing 920 at the lower end of a slot 926 in the casing. The lower end portion of the valve member is formed as a sleeve 928 in which is movably mounted a hollow plunger 930 having on its upper end a finger 932 arranged to engage the valve member to limit upward movement of the plunger. With the plunger thus in its uppermost position within the sleeve 928 there is provided around the finger 932 an annular chamber 934 in communication, through a port 936 in the sleeve, with an annular recess 938 in the casing 920, this recess being open to an exhaust pipe 940 leading to the sump. The plunger 930 is held normally in its uppermost position in the sleeve 928 by a spring 942 which is mounted within it and the lower end of which is seated on a member 944. This member is supported on the end of a screw 946 which is threaded in a plug 948 fast in the lower end of the sleeve 928. Also formed in the sleeve are ports 950 which, with the parts positioned as shown in Fig. 44, are closed both by the casing 920 and by the plunger 930.

The upper end of the valve member 918 is connected by a link 952 to one arm of a bell-crank lever 954 pivotally mounted on the casing 920, the other arm of this lever carrying a pin 956 which lies in a slot 958 formed in one arm of another lever 960 pivotally mounted on the casing. The other arm of the lever 960 is pivotally connected to the rear end of a bar 962 suitably guided for forward and rearward movements and having on its front end a knee pad 964 by which the operator may move it in a rearward direction against the resistance of a return spring 966. This spring holds the valve member 918 normally in the position determined by the screw 924 and the lower end of the slot 926, and by moving the bar 962 rearwardly the operator may raise the valve member to the position determined by the screw and the upper end of the slot. When the valve member is in this raised position the passageway 922 therein is out of alinement with the by-pass 916, and accordingly the by-pass is closed. The port 936 in the sleeve 928, moreover, is in communication, through a portion of the by-pass, with that portion of the fluid line 880 which is beyond the pressure-reducing valve 882. At the same time the ports 950 in the sleeve are in communication with the annular recess 938 which is open to the exhaust pipe 940. With the valve, therefore, in its uppermost position the pressure in the line 880 acts on the upper end of the plunger 930 to lower the plunger against the resistance of the spring 942 and thus to open the ports 950 so that fluid may escape from the line 880 to the exhaust pipe 940. The amount of fluid thus escaping will depend upon the strength of the spring 942 the compression of which may be adjusted by the screw 946. The spring will be so adjusted as to cause the pressure in the cylinders 230 to be reduced, for example, to about 25 pounds, thus causing the gripper jaws to open while the grippers are still held against the last as above described. After the operator has relocated the margin of the upper as desired between the gripper jaws, he releases the valve member 918 to cause it to return to its initial position, whereupon the normal gripper-closing pressure of 50 pounds is restored in the line 880 by fluid flowing from valve #3 past the pressure-reducing valve 882. Preferably the operator at this time operates the knee pad 862 to raise the pressure again momentarily in the line 880 in the manner described and thus to insure proper closing of the grippers. Located in the by-pass 916 is a check valve 968 which prevents fluid from flowing in the by-pass in a direction toward the cylinders 230 but permits return flow of the fluid to valve #3 when the latter is moved to exhaust position. It will be evident that the reason for the by-pass and the check valve therein is the fact that the pressure-reducing valve 882 prevents return flow of the fluid in the line 880 to valve #3.

When valve #1 is opened in response to the first depression of the treadle to admit fluid under light pressure to the cylinders 230 for swinging the grippers inwardly against the last, valve #3, which is initially in position to provide for communication between the fluid line 880 and the exhaust manifold 558, as shown in Fig. 43, is moved into position to interrupt such communication, thus preventing exhaust of the fluid admitted to the cylinders 230 by valve #1. When valves #4 and #5 are opened in response to the third depression of the treadle to cause the grippers to pull the upper, valve #3 is moved into position to trap in the line 880 the fluid which is effective to hold the grippers closed.

By reference to the chart (Fig. 53) it will be noted that the flow of fluid in the line 358 toward and from the cylinder 356 in which is the piston 354 for controlling the gripper-locking members 342 (Fig. 25) is controlled by valve #2, and that the flow of fluid in the line 178 toward and from the cylinder 176 in which is the piston 174 for pressing the heel rest firmly against the shoe is controlled by valve #7. After the heel rest has thus been pressed against the shoe, valve #7 is moved into position to trap the fluid in line 178 and thus to prevent any tendency for the fluid to force the heel rest any farther in a direction toward the shoe when the central toe gripper ceases to act as a stop for the last. In the line 178 is a hand valve 970 which the operator may open to release the fluid from the cylinder 176 if it is desired for any reason to release the shoe from the pressure applied thereto by the action of the piston 174 on the heel rest after the pressure has thus been applied.

After the completion of the operations thus far described as performed by fluid-operated means in response to three successive depressions of the treadle 636, the remainder of the power operation of the machine results from a single depression of another treadle 972 (Figs. 1, 41 and 52) mounted on the rod 638. This treadle controls a one-revolution clutch 974 (Fig. 1) mounted on the right-hand end of a second cam shaft 976 supported in bearings in the frame. The clutch 974 is substantially identical with the clutch fully shown and described in United States Letters Patent No. 1,843,232, granted on February 2, 1932 on an application of B. Jorgensen, and accordingly it will not be herein described in detail. It includes a worm gear 978 loosely mounted on the shaft 976 and a member 980 fast on the shaft which may be connected to and disconnected from the worm gear. This gear is engaged and driven by a worm 982 mounted on a shaft 984 connected by pinions 986 and 988 to another shaft 990 which is driven through a belt pulley 992 by the previously mentioned motor 539 (Fig. 53). The worm gear 978 is connected to the clutch member 980 by partial rotation of a pin 994 carried by this member, such rotation of the pin being effected by a spring 996 connected to an arm 998 fast on the pin. Another pin 1000 projecting laterally from the pin 994 is initially engaged by an arm 1002 mounted to swing about a rod 1004 on the frame to disconnect the gear 978 from the clutch member 980, as illustrated in Fig. 1, the arm being held in engagement with the periphery of the member 980 by a torsion spring 1006. To actuate the clutch, therefore, and thus to start the rotation of the cam shaft 976 it is necessary to swing the arm 1002 upwardly to release the pin 1000. For this purpose the treadle 972 is connected by a link 1008 (Fig. 41) to an arm 1009 mounted to swing about the previously mentioned rod 632, and this arm is connected by another link 1010 to one arm of a lever 1012 mounted on the frame of the machine. The other arm of this lever carries a hook 1014 arranged to connect with the arm 1002. In response, therefore, to the depression of the treadle 972 the arm 1002 is swung upwardly to actuate the clutch. Shortly after the starting of the cam shaft 976 a member 1016 fast on the clutch member 980 disengages the hook 1014 from the arm 1002 to permit the arm to be swung downwardly by its spring 1006 into position to disconnect the member 980 from the gear 978 at the end of one revolution of the cam shaft 976. When the operator releases the treadle 972 it is swung upwardly by a spring 1018 (Fig. 41) connected to the arm 1009, the limit of its upward movement being determined by engagement of a screw 1020 carried by the arm with a portion 1022 of the frame. The resulting upward movement of the link 1010 swings the lever 1012 to lower the hook 1014 into position again to connect with the arm 1002.

Figure 34:
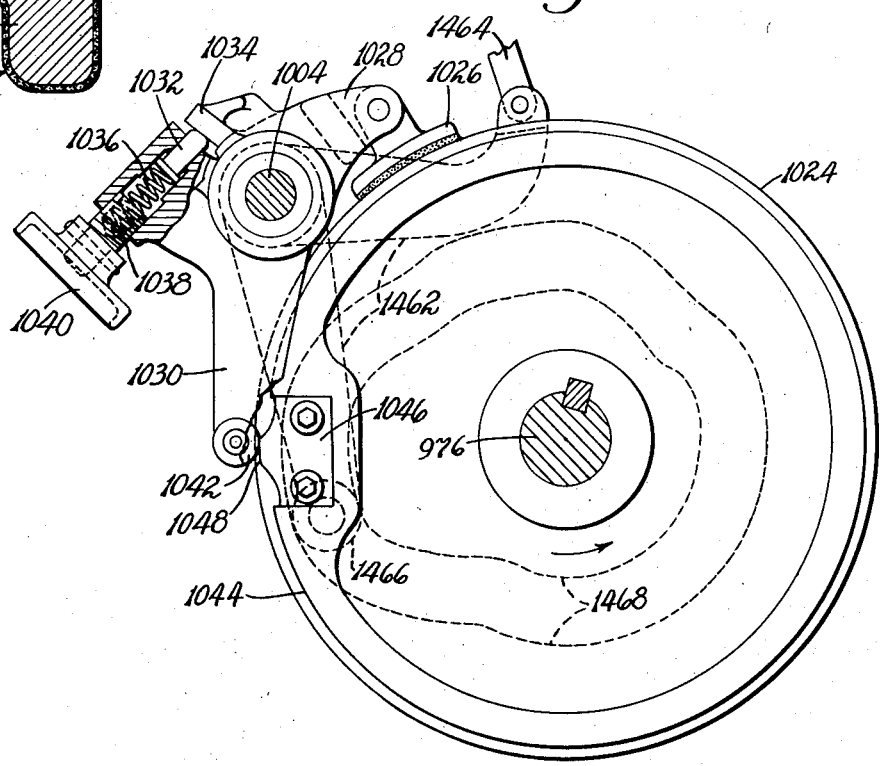
Fig. 34 is a view mainly in right-hand side elevation showing brake-operating mechanism with which the machine is provided.

To insure that the cam shaft 976 will come to a stop immediately upon disconnection of the clutch members 978 and 980 from each other, a cam wheel 1024 (Fig. 34) on the shaft 976 is engaged on its periphery by a brake shoe 1026 which is pivotally supported on an arm 1028 mounted to turn on the previously mentioned rod 1004. Also mounted to turn on this rod is another arm 1030 in which is slidingly mounted a pin 1032 in engagement with a lug 1034 on the arm 1028. This pin is engaged by one end of a spring 1036 mounted in a socket in the arm 1030, the other end of this spring being engaged by a screw 1038 which is threaded in the socket and has secured thereto a hand wheel 1040. Mounted on the arm 1030 is a roll 1042 arranged to engage a nearly complete circular track 1044 on the cam wheel 1024, this track being interrupted by a cam plate 1046 which is fast on the cam wheel and has thereon a projection 1048 located nearer the periphery of the cam wheel than the track 1044. When the roll 1042 is in engagement with this track the spring 1036 holds the brake shoe 1026 only lightly in engagement with the periphery of the cam wheel, and at the time when the arm 1002 (Fig. 1) engages the pin 1000 to disconnect the clutch members from each other, the projection 1048 on the plate 1046 engages the roll 1042 to cause the spring 1036 to press the brake shoe more firmly against the cam wheel. It will be understood that by means of the hand wheel 1040 the spring may be adjusted to vary the pressure applied by the brake shoe.

In order to prevent the treadle 972 from being depressed at the wrong time, there is provided a stop member 1050 (Figs. 40 and 41) slidingly mounted for forward and rearward movements on a bracket 1052 on the frame, this member being arranged initially to underlie the rear end of the arm 1009 and thus to prevent downward movements of the arm and the treadle. Pivotally connected to the rear end of the member 1050 is a rod 1054 the rear end of which is slidingly mounted in a sleeve 1056 and has thereon a head 1058 in engagement with a spring 1060 in the sleeve. The rear end of the sleeve is pivotally connected to an upwardly extending arm of a bell-crank lever 1062 pivotally mounted on the previously mentioned bracket 574, the other arm of this lever having thereon a roll 1064 engaged by a groove cam 1066 formed in one side of the previously mentioned cam wheel 906 on the cam shaft 572. The cam 1066 is so formed that in the third 60° movement of the cam shaft 572 the bell-crank lever 1062 is operated to move the stop member 1050 rearwardly from under the arm 1009 and thus to permit depression of the treadle 972. In the second half revolution of the cam shaft 572, which is effected as will presently be described, the bell-crank lever 1062 is swung reversely to return the stop member 1050 to its position under the arm 1009. If at the time of such return the operator has not released the treadle 972, the spring 1060 yields to prevent breakage in the event of engagement of the stop member with the end face of the arm 1009.

Figure 47:
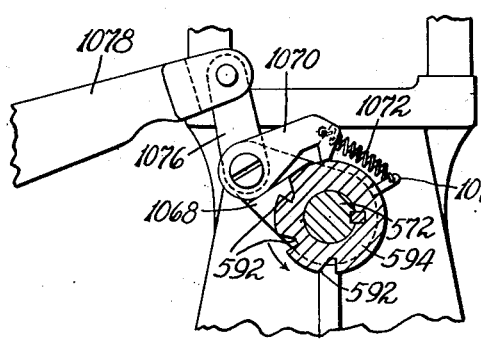
Fig. 47 is a section on the line XLVII—XLVII of Fig. 42.

While some of the further operations hereinafter described are performed by cams on the clutch-driven cam shaft 976, others effected by fluid-pressure means result from a second half-revolution of the cam shaft 572, the second half-revolution of that cam shaft, moreover, being necessary to cause parts operated in response to the first half-revolution thereof to return to their starting positions. This second half-revolution of the cam shaft 572 is effected in three successive stages by the complete revolution of the clutch-driven cam shaft 976. For this purpose an arm 1068 (Figs. 42 and 47) is loosely mounted on the cam shaft 572 and has pivotally mounted thereon a pawl 1070 arranged to engage the periphery of the previously mentioned cylindrical member 594 which is fast on the shaft, the pawl being held in engagement with this member by a spring 1072 connected to a pin 1074 on the arm 1068. The pawl 1070 is thus arranged to enter at the proper times the three previously mentioned notches 592 in the member 594 and by engagement with the member in these notches to impart the required additional turning movements to the cam shaft 572. By reference to Figs. 46 and 47 it will be understood that the third 60° movement imparted to the cam shaft by the previously mentioned pawl 590 brings one of the notches 592 into position where the pawl 1070 enters it. Thereafter this pawl completes in three stages the full revolution of the cam shaft 572 and is finally moved to the position in which it is shown in Fig. 47. For thus operating the pawl 1070 the arm 1068 is connected by a link 1076 to an arm 1078 (Fig. 40) which is fast on the previously mentioned shaft 582, and also fast on this shaft is a bell-crank lever 1080 (Fig. 41). One arm of this lever is connected by a link 1082 to an arm 1084 which is mounted to swing about a red 1086 supported on the frame of the machine. Mounted on the arm 1084 is a roll 1088 engaged by a groove cam 1090 formed in one side of a cam wheel 1092 fast on the cam shaft 976. This cam is so formed as to impart to the pawl-carrying arm 1068 three reciprocatory movements, first downward and then upward, in the course of the revolution of the cam shaft 976, thus completing the revolution of the cam shaft 572 in the manner described. As shown in Fig. 41, that portion of the groove cam 1090 in which the roll 1088 lies at the completion of the movement of the cam shaft 976 is widened to permit at that point a quick upward swinging movement of the arm 1084, in which movement the pawl 1070 (Fig. 47) is caried out of the last notch 592 in the member 594 to the final position in which it is shown in engagement with the periphery of this member. For thus moving the arm 1084 and the parts connected thereto a spring 1094 is connected to one arm of the bell-crank lever 1080 and to a pin on the frame.

Figure 32:
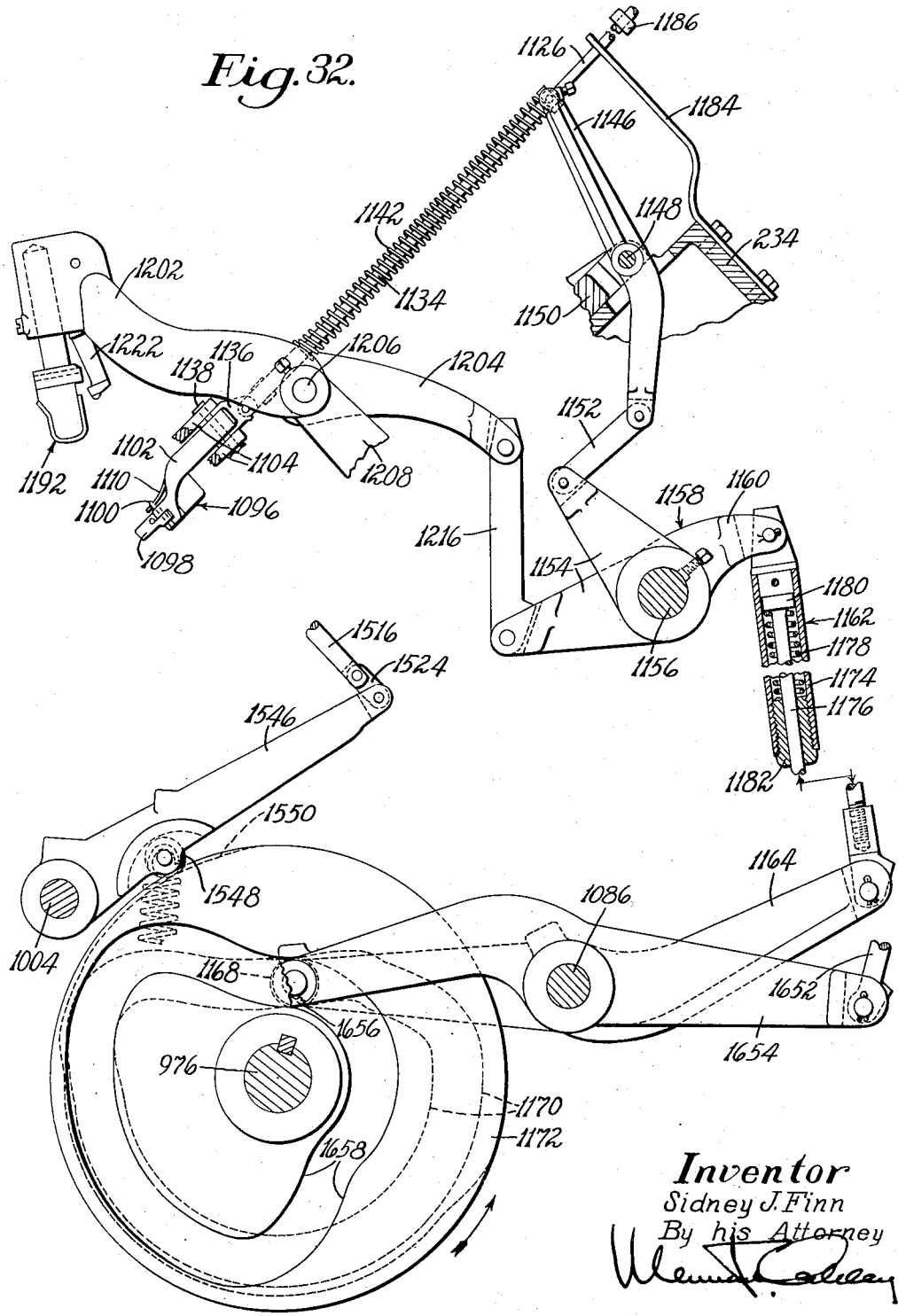
Fig. 32 is a view partly in right-hand side elevation and partly in section, showing the toe rest and the upper-clamping band and the mechanisms for operating them.
Figure 38:
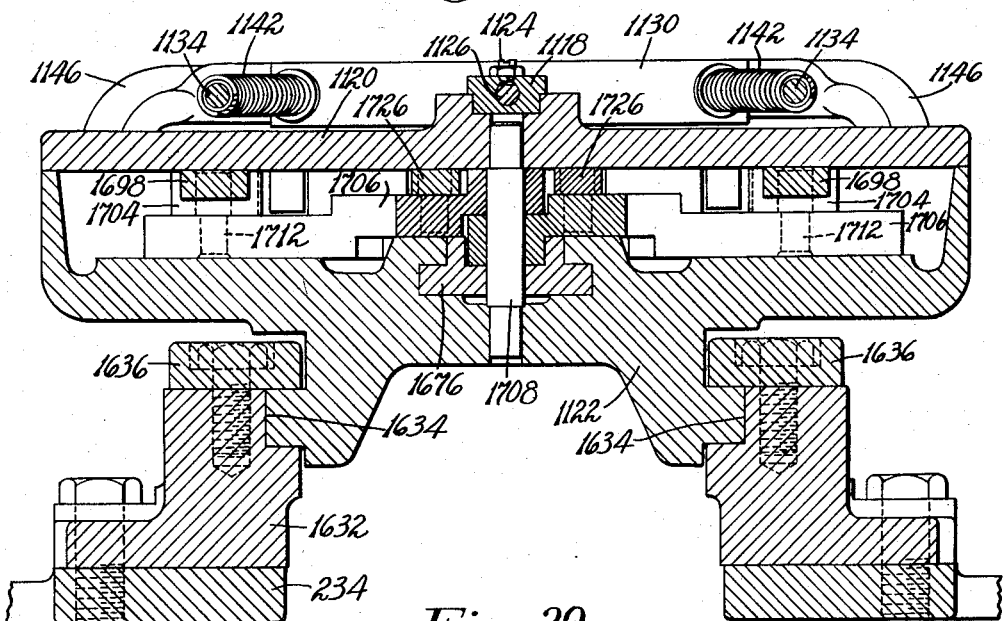
Fig. 38 is a section on the line XXXVIII—XXXVIII of Fig. 35.

Substantially at the beginning of the continued operation of the machine after the depression of the clutch-actuating treadle 972 a flexible band 1096 (Figs. 2 and 32) is applied around the toe end and along the sides of the forepart beyond the toe to conform the upper to the last and to hold it when the forepart grippers release it, this band consisting of a flexible metal strip with a strip of rubber 1097 (Fig. 58) secured thereto for engagement with the upper. Secured to the opposite end portions of the band are members 1098 pivotally connected by readily detachable pins 1100 to links 1102 which are pivotally connected to arms 1104 each provided with a downwardly extending stem 1106 mounted to turn about an axis extending heightwise of the shoe in a bracket 1108 fast on the top frame casting 234. Each pin 1100 is held normally in place by a resilient wire 1110 which extends through a hole in one end of the pin and is housed within a slot in the link 1102. Connected to each link 1102 and to the corresponding arm 1104 is a spring 1112 which tends to swing the link outwardly widthwise of the machine, the two springs assisting in holding the end portions of the band 1096 spread apart before the band is applied to the shoe. The intermediate portion of the band is secured to a holder 1114 which is pivotally connected by a pin 1115 (Fig. 58) extending widthwise of the machine to the front end of a rearwardly extending link 1116 the rear end of which is similarly connected to a slide 1118 (Figs. 2 and 38) mounted for movements in directions lengthwise of the shoe in a guideway formed in a plate 1120 secured on the top of a wiper carrier 1122 hereinafter described. Secured by a setscrew 1124 to the slide 1118 is the front end of a rod 1126 extending rearwardly through a collar 1128 and a crossbar 1130 both slidingly movable on the rod. Between the slide 1118 and the collar 1128 is a spring 1132. Extending through the opposite ends of the crossbar 1130 are forwardly extending rods 1134 on which the crossbar is also slidingly movable, the front end portions of these rods being supported on lateral extensions of the slide 1118 and being pivotally connected by pins extending widthwise of the machine to members 1136 which are pivotally mounted on pins 1138 by which the links 1102 are pivotally connected to the arms 1104 as above described. Leaf springs 1140 secured to the slide 1118 bear on the upper faces of the front end portions of the rods 1134 to hold the rods yieldingly down on the lateral extensions of the slide. Surrounding each rod 1134 between the crossabr 1130 and a shoulder on the front end portion of the rod is a spring 1142. Threaded on the rear ends of these rods are nuts 1144 through which the rods are initially positioned lengthwise by the crossbar 1130.

The crossbar 1130 is carried by the upper ends of a pair of levers 1146 which are pivotally mounted between their upper and lower ends on pins 1148 supported in brackets 1150 on the top frame casting 234. The lower end of the right-hand lever 1146 (Fig. 32) is connected by a link 1152 to one arm of a two-armed lever 1154 fast on a shaft 1156 mounted in bearings in the frame, the lower end of the left-hand lever 1146 is similarly connected to one arm of a three-armed lever 1158 also fast on the rockshaft 1156, two of the arms of this three-armed lever being counterparts of the arms of the two-armed lever 1154. A rearwardly extending arm 1160 of the three-armed lever is connected by a link 1162 to the rear end of a lever 1164 which is pivotally mounted between its ends on the rod 1086, the front end of this lever being provided with a roll 1168 engaged by a groove cam 1170 formed in one side of a cam wheel 1172 fast on the cam shaft 976. The link 1162 consists of a sleeve 1174 pivotally connected to the arm 1160 and of a rod 1176 extending into the sleeve and connected to the lever 1164, the sleeve having therein a spring 1178 which is interposed between a head 1180 on the rod and a plug 1182 fast in the lower end of the sleeve. It will be evident that as the lever 1164 is swung clockwise, with reference to Fig. 32, by its cam 1170, the two levers 1146 are swung counterclockwise and through the crossbar 1130 and the springs 1132 and 1142 impart forward movements toward the shoe to the rods 1126 and 1134 and the slide 1118. The band 1096, therefore, is carried bodily forward into engagement with the upper at the end of the toe, after which the spring 1132 yields during continued forward movements of the rods 1134. The forward movements of these rods 1134 serve to swing the arms 1104 in forward directions and through the links 1102 to move the portions of the band extending along the sides of the shoe inwardly until they press the upper against the last, the arms and the links acting as toggles. Thereafter the springs 1142 as well as the spring 1132 will yield in response to further movements of the levers 1146. In order to avoid possible danger of breakage if the machine is operated in the absence of a shoe, there is secured to the top frame casting 234 an upwardly extending bar 1184 through which the rear end portion of the rod 1126 extends, this bar being arranged to engage a collar 1186 fast on the rod to limit forward movement of the rod. To limit also, under the same conditions, the forward movements of the rods 1134, each of the arms 1104 (Fig. 2) has on its hub portion a lug 1188 arranged to engage a lug 1190 on the bracket 1108.

Figure 33:
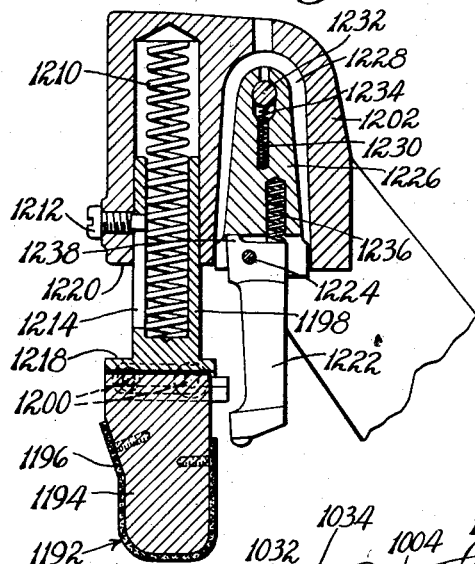
Fig. 33 is mainly a section through the toe rest.

Simultaneously with the movement of the band 1096 into engagement with the shoe in the manner above described a toe rest 1192 (Figs. 32 and 33) is moved downwardly into engagement with the shoe on the top of the forepart to support the shoe against pressure thereafter applied on the bottom thereof in the wiping of the margin of the upper inwardly over the insole. This toe rest comprises a metal block 1194 having thereon an upper-engaging leather facing 1196, the block being mounted for adjustment in directions lengthwise of the shoe in a guideway formed in the lower end of a holder 1198 and being held in adjusted position by setscrews 1200 in the holder. An upwardly extending hollow portion of the holder 1198 is slidingly mounted in a bore formed in a yoke member 1202, this member having two downwardly and rearwardly extending arms 1204 which are pivotally mounted on pins 1206 supported in brackets 1208 (Fig. 2) on the top frame casting 234. A light spring 1210 in the yoke member 1202 tends to move the holder downwardly, its downward movement being limited by a screw 1212 extending into a slot 1214 in the holder. The rear ends of the arms 1204 are connected respectively by links 1216 to one arm of the two-armed lever 1154 and to the corresponding arm of the three-armed lever 1158. It will thus be seen that the cam 1170 acts through the lever 1164 to impart downward movement to the toe rest 1192 simultaneously with the forward movement of the toe band 1096. After engagement of the toe rest with the shoe the spring 1210 yields, and eventually, as hereinafter explained, a shoulder 1218 on the holder 1198 engages a shoulder 1220 on the yoke member 1202. Thereafter the heavier spring 1178 in the link 1162 yields in response to further movement of the lever 1164 to force the toe rest more firmly against the shoe.

In order to counteract any tendency which the toe ends of shoes of some shapes may have to deflect the intermediate portion of the band 1096 in an upward direction as the band is applied to the shoe, the yoke 1202 carries a finger 1222 arranged to engage the band holder 1114 (Fig. 58) to press it downwardly, any downward movement thereof being limited by engagement of the link 1116 with the slide 1118. This finger is pivotally mounted on a pin 1224 supported in a block 1226 which extends upwardly into a recess 1228 in the yoke member 1202, this block having therein an upwardly and downwardly extending slot 1230 through which extends a pin 1232 in the yoke member. Mounted in this slot below the pin is a spring 1234 which is yieldable in response to further movement of the yoke member after the finger 1222 has engaged the band holder 1114. To minimize any frictional action of the finger 1222 on the holder 1114 by reason of the movement of the yoke member in an arc-shaped path, provision is afforded for swinging movement of the finger about the pin 1224 against the resistance of a light spring 1236 in the block 1226. This spring normally holds the finger in a relation to the block determined by engagement of a projection 1238 on the finger with a face on the block.

The movement of the rockshaft 1156 to apply the band 1096 and the toe rest 1192 to the shoe, as above described, is further utilized to cause the admission of fluid under pressure to the cylinder 528 (Figs. 13 and 53) in which, as hereinbefore explained, is mounted the piston 526 for moving the forepart grippers farther downwardly away from the shoe after they release the upper. Such admission of fluid to the cylinder 528 is effected by upward movement of the previously mentioned valve 684 (Figs. 48 and 53). With this valve in its initial position, as shown, the pipe 536 which is in communication at one end with the cylinder 528 communicates at its other end with an annular recess 1240 in the valve, and this recess is in communication through a passage 1242 in the wall of the cylinder 686 with a pipe 1244 which is open to the sump. Accordingly, there is initially no pressure in the cylinder 528. To admit fluid under pressure to this cylinder the valve 684 is moved upwardly to close the entrance to the exhaust passage 1242 and to open communication between the pipe 536 and the pipe 688 previously referred to as in communication with the pump. Such upward movement of the valve does not affect conditions in the cylinders 520, since the valve 672 is at this time held depressed by fluid admitted, as hereinbefore described, to the upper end of the cylinder 674 and closes the entrance to the pipe 680. For moving the valve 684 upwardly as described and for later returning it there are loosely mounted on the rockshaft 1156, between the hub of the two-armed lever 1154 and a collar 1246 (Fig. 50) fast on the rockshaft, two arms 1248. A spring 1250 connected to these arms tends to swing them toward each other about the rockshaft, their movements toward each other being limited by stops 1252 which are secured to the hub of the lever 1154 and engage the arms. Located in the space between the two arms 1248 is a pin 1254 mounted on one end of a lever 1256 which is pivotally mounted between its ends on a bracket 1258 on the frame, the other end of this lever being connected to a rod 1260 extending upwardly from the valve 684. From Fig. 48 it will be evident that near the end of the movement of the rockshaft 1156 to apply the band and the toe rest to the shoe the upper one of the two arms 1248 engages the pin 1254 and swings the lever 1256 to impart the required upward movement to the valve 684 and that near the end of the return movement of the rockshaft the lower one of the two arms acts to return the valve to its initial position, thus releasing the fluid from the cylinder 528. The upward movement of the valve is limited by engagement of a stop block 1262 on the bracket 1258 with the lever 1256 and its return movement is limited by engagement of a pin 1264 on the bracket with the lever. After the engagement of the block or the pin with the lever the spring 1250 yields in response to any further movement of the rockshaft 1156. Substantially at the time when the fluid under pressure is thus admitted to the cylinder 528 the forepart grippers are caused to release the upper by the movement of valve #3 to exhaust position.

The machine is further provided with a pair of what may be termed ball-lasting units 1266 (Figs. 2 and 3) arranged to act on the upper mainly in locations where the edge of the shoe bottom curves inwardly toward the shank beyond the ball line. Each of these units includes a gripper 1268 (Figs. 5 and 7) for gripping and pulling the upper and a pair of wipers, hereinafter described, for wiping the margin of the upper inwardly over the insole. It will be evident that these units must be positioned at different distances from the toe ends of shoes of different sizes, and that they should also be differently positioned relatively to each other lengthwise of the shoe in operating respectively on right and left shoes. That is, the unit which operates at the inner side of a right or a left shoe should be positioned nearer the toe end of the shoe than the unit which operates at the outer side of the shoe. The two units, therefore, include castings 1270 mounted for movements in directions lengthwise of the shoe respectively along rods 1272 which are secured at their opposite ends to upward extensions of the top frame casting 234, these rods being arranged to converge somewhat toward each other in directions toward the toe end of the shoe. Further to guide each casting 1270 and to prevent it from turning about the rod 1272, a downwardly extending portion of the casting has thereon a roll 1274 (Figs. 5 and 7) movable along a slot 1276 formed in the top frame casting 234 in parallel relation to the rod 1272. Mounted on a screw 1278 which secures the front end of each rod 1272 to the frame casting 234 is one end portion of a casting 1280 (Figs. 3 and 8) the other end of which, for a purpose hereinafter explained, is pivotally connected to the front end of a rearwardly extending link 1282, the rear end of this link being mounted on a screw 1284 which is one of three screws connecting the block 164 to the heel-rest-controlling slide 156 (see Fig. 4). Supported on each casting 1280 is a member 1286 on which is secured a cover plate 1288, this member having therein a guideway 1290 for the front end portion of a rearwardly extending link 1292 pivotally connected at its rear end to an arm 1294 extending laterally from the casting 1270. Extending downwardly through holes in the member 1286 and its cover plate 1288, and also through a slot 1296 in the link 1292, is a bolt 1298 the lower end portion of which is reduced in diameter and extends farther downwardly through a slide 1300. A portion of this slide underlies the casting 1280 and another portion thereof lies in a slot 1302 formed in the casting 1280 and extending in oblique relation to the rod 1272. A nut 1304 on the lower end of the bolt supports the slide 1300. The bolt and nut thus hold the member 1286 and the slide 1300 in assembled relation to each other and to the casting 1280 while permitting the member 1286 and the slide to turn relatively to each other about the bolt. Formed on the link 1292 are rack teeth 1306 engaged by a pinion 1308 which is mounted to turn in the member 1286, a stem 1310 on this pinion extending upwardly through the cover plate 1288 and having fast thereon an arm 1312 by which the operator can turn the pinion to adjust the ball-lasting unit 1266 along the rod 1272. A spring-pressed pin 1314 carried by the arm 1312 is arranged to enter one or another of a series of holes 1316 in the cover plate 1288 to hold the unit in adjusted position, this pin being movable upwardly to release the arm by means of a knob 1318 on its upper end.

A more precise adjustment of each unit 1266 than that determined by the spacing of the holes 1316 may be obtained by the turning of a rod 1320 which is threaded in a lug 1322 on the casting 1280 and has fast thereon (Fig. 8) a collar 1324 confined in a recess in the slide 1300. The rod is turned by means of a knob 1326 on its outer end, and it will be evident that the turning thereof results in movement of the slide 1300 along the slot 1302, such movement of the slide being accompanied by movement of the member 1286 in the same direction. Since the pinion 1308 is at this time held from turning by the pin 1314, and since the slot 1302 extends in oblique relation to the rod 1272, the effect of the turning of the rod 1320 is to move the link 1292 lengthwise and thus to adjust the unit 1266 more precisely as described. Confined on the rod 1320 by the knob 1326 is a pointer 1328 between which and the lug 1322 is a spring 1330, this pointer straddling an edge portion of the casting 1280 to prevent it from turning on the rod. This portion of the casting has thereon a scale arranged to cooperate with the pointer to afford the operator an indication of the adjusted position of the slide 1300 and the parts connected thereto. The spring 1330 is provided for holding the pointer 1328 frictionally against the knob 1326 in such manner as to prevent the rod 1320 from turning too freely.

By reason of the link connections 1282 between the inner ends of the castings 1280 and the slide 156 (Fig. 4) both castings 1280 are swung about the screws 1278 to move the ball-lasting units 1266 along the rods 1272 in directions toward the toe end of the shoe by the action of the piston 174 in moving the heel-rest holder 110 into position to engage the heel rest extensions 180. It will accordingly be evident that, the units having been preliminarily adjusted as hereinabove described, each unit will be positioned at the same distance from the heel end of every shoe as determined by the engagement of the heel rest with the shoe. The operator may conveniently position the units in proper relation to a right or a left shoe of a given size and style, after presenting such a shoe to the machine, by causing the heel-rest holder 110 to move into position to control the heel rest in response to the first depression of the treadle 636 and by thereafter adjusting the units by means of the arms 1312 and, if necessary, the rods 1320, as determined by sight with reference to the shoe. In changing thereafter from a right or a left shoe to the other shoe of the pair it is only necessary to reverse the positions of the arms 1312 relatively to the series of holes 1316 in the cover plates 1288.

Each of the ball grippers 1268 (Figs. 5 and 7) includes a gripper casing 1332 to which is secured an upper-gripping jaw 1334, and pivotally mounted on a pin 1336 in the casing is a jaw 1338 arranged to cooperate with the jaw 1334 to grip the margin of the upper. A lower tail portion of the jaw 1338 is connected by a link 1340 to the upper end of a bar 1342 slidingly mounted in the gripper casing, the lower end of this bar being pivotally connected by a pin 1344 to one arm of a gripper-operating lever 1346 pivotally mounted between its opposite ends on a rod 1348 on the casting 1270. The gripper casing 1332 is loosely guided between a projection 1350 (Fig. 5) on the casting 1270, located at one side of the casing, and a leaf spring 1352 (Figs. 3 and 7) at the other side of the casing, this spring being secured to a stop member 1354 which is secured to the casting 1270 and limits swinging movement of the gripper about the pin 1344 in a direction away from the shoe. For this purpose the stop member has thereon a projection 1356 arranged to engage a plate 1358 secured to the gripper casing. Connected to the gripper casing and to a lever 1360 (Fig. 5), hereinafter described, is a spring 1362 which tends to swing the gripper about the pin 1344 in an outward direction away from the shoe and holds the plate 1358 against the projection 1356. This projection extends initially into a curved recess 1364 in the plate 1358 and accordingly serves near the beginning of the upper-pulling movement of the gripper to swing it a short distance inwardly toward the inwardly receding curved surface of the last beyond the ball line.

By the movement of the lever 1346 the bar 1342 is first moved downward relatively to the gripper casing to impart to the pivoted jaw 1338 its upper-gripping movement, after which further movement of the lever moves the gripper as a whole downwardly to pull the upper. To cause the gripper thus to grip the upper prior to the beginning of its downward movement the above-mentioned lever 1360 engages the lower end face of the gripper casing 1332 to hold the casing initially against downward movement. This lever is made of two relatively adjustable parts secured together by a clamp screw 1366, and it is mounted between its opposite ends on the same rod 1348 as the lever 1346. Pivotally mounted on one end thereof is the enlarged head of a rod 1368 extending downwardly through an opening in a pin 1370 which is swiveled in the lever 1346. Between this pin and the enlarged head of the rod is a spring 1372 which is compressed by the gripper-closing movement of the lever 1346, the lever 1360 being held initially against movement by a stop member 1374 in engagement with a hardened block 1376 on the lever. After the closing of the gripper the stop member 1374, controlled as hereinafter described, releases the lever 1360, whereupon the spring 1372 expands to move the end of this lever which is under the gripper casing downward and the lever 1346 is further operated to impart the upper-pulling movement to the gripper.

For operating the lever 1346 as above described an upwardly and downwardly extending trough-shaped member 1378 is pivotally connected by pins 1380 on its opposite sides to a forked end portion of the lever and by other similar pins 1382 to the forked end of a link 1384 pivotally mounted on a pin 1386 on the casting 1270, this link and the portion of the lever 1346 below it being in parallel relation. Enclosed on three sides by the trough-shaped member 1378 is a bar 1388 adjustable in upward and downward directions relatively to the member 1378. Normally this bar is held in fixed relation to the member 1378 by a latch 1390 pivotally mounted on a pin 1392 on this member and held by a spring 1394 in engagement with teeth 1396 on the bar. The lower end of the bar 1388 is engaged by a crossbar 1398 formed on the upper end of a piston 1400 which is movably mounted in a larger piston 1402 in a cylinder 1404 fast on the top frame casting 234. Downward movement of the piston 1402 is limited by engagement of a pin 1406 on its lower end with a plug 1408 which closes the lower end of the cylinder, and downward movement of the piston 1400 is limited by engagement with a shoulder 1410 on the casting 234. By fluid under pressure admitted to the lower end of the cylinder both concentric pistons are moved upwardly to close the gripper on the upper, the piston 1402 engaging the crossbar 1398, after which further movement of the piston 1402 is stopped by a member 1412 which is fast on the casting 234 and extends into a slot 1414 in the piston. Thereafter the gripper is operated to pull the upper by further movement of the smaller piston 1400 alone. It will thus be seen that greater force is applied to the lever 1346 to close the gripper on the upper than is applied thereafter to effect the upper-pulling movement of the gripper, thus insuring that the gripper will be firmly closed prior to its upper-pulling movement. Another purpose served in such use of different forces in the gripping and the pulling of the upper respectively will be hereinafter explained.

To maintain the crossbar 1398 at all times in parallel relation to the rod 1272 along which the casting 1270 is adjustably movable, so that the bar 1388 will always be in proper relation to the crossbar, a pin 1416 (Fig. 3) extends upwardly from the top frame casting 234 through a hole in a plate 1418 secured to the crossbar. For a reason hereinafter explained it may be desired at times to adjust the bar 1388 in an upward or a downward direction relatively to the member 1378 in which it is mounted, and to permit this readily to be done a flexible wire 1420 (Fig. 5) is connected to the latch 1390 and extends forwardly to a position where it may be readily engaged by the operator to withdraw the latch from the teeth 1396.

Figure 52:
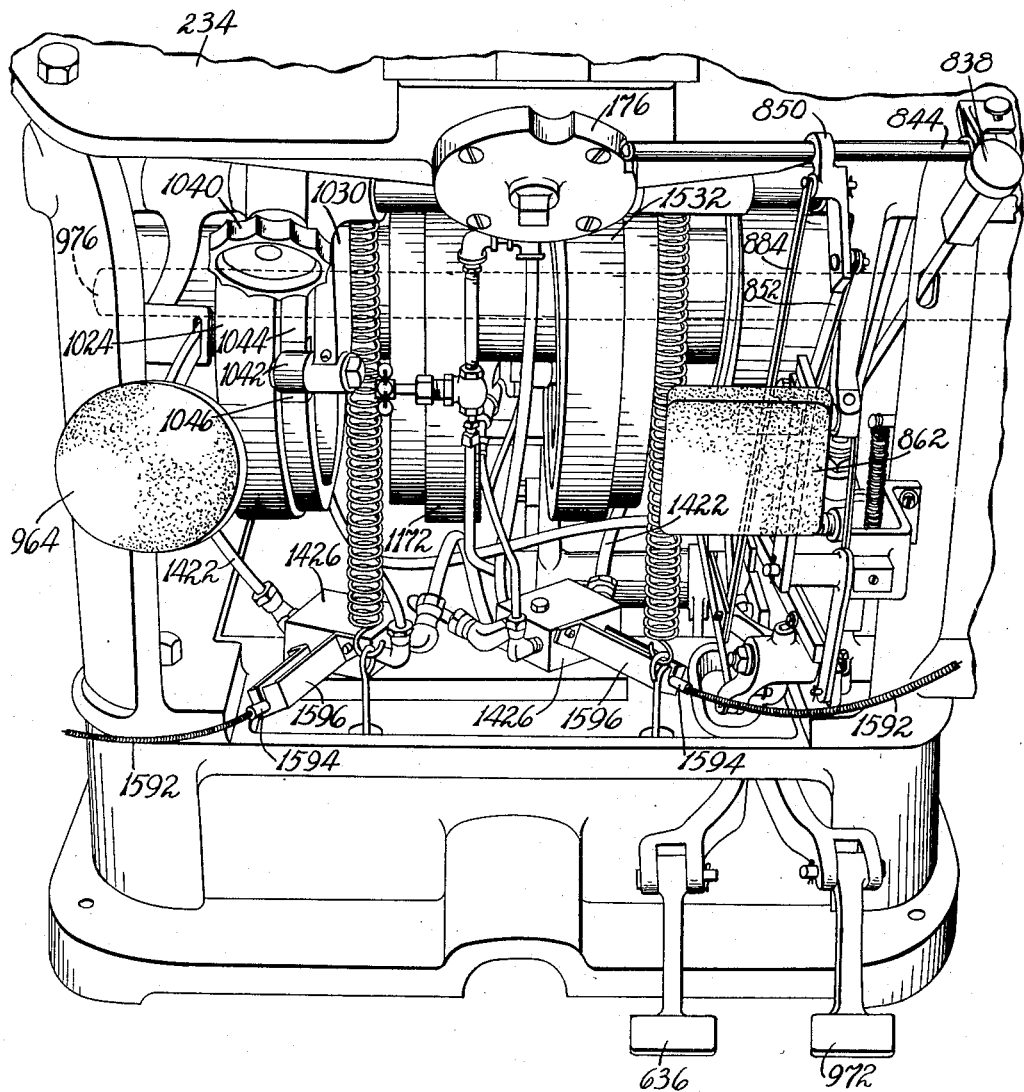
Fig. 52 is a view in front elevation of the lower portion of the machine.

For admitting operating fluid under pressure to the two cylinders 1404 associated respectively with the two ball-lasting units, pipes 1422 (Fig. 53) lead from these cylinders to spool valves 1424 (see also Fig. 40) mounted in valve casings 1426 (Fig. 52). Through annular recesses 1428 in these valves the pipes 1422 are initially in communication with a fluid line 1430 leading to valve #6 in the casting 546. It will be understood that this valve is operated at the proper time by cam #6 on the cam shaft 572 to admit fluid under pressure from the manifold 544 to the fluid line 1430 and accordingly to the cylinders 1404 to cause the ball grippers to grip and pull the upper. The valves 1424 are provided for timing independently of valve #6 the release of the fluid from the cylinders 1404 to cause the ball grippers to release the upper. That is, these valves are moved in directions to interrupt communication with the manifold and to open communication between the pipes 1422 and exhaust pipes 1432 through which the fluid is discharged to the sump. The means provided for operating the valves 1424 in proper time relation to other parts will be hereinafter described.

The previously mentioned brackets 78 on which are mounted the fingers 76 for engaging the margin of the insole at the sides of the forepart to assist in positioning and supporting the shoe are adjustably secured to the projections 1350 on the castings 1270. The fingers 76, therefore, are adjusted with the ball-lasting units 1266 for shoes of different sizes and for right and left shoes.

Figure 3:
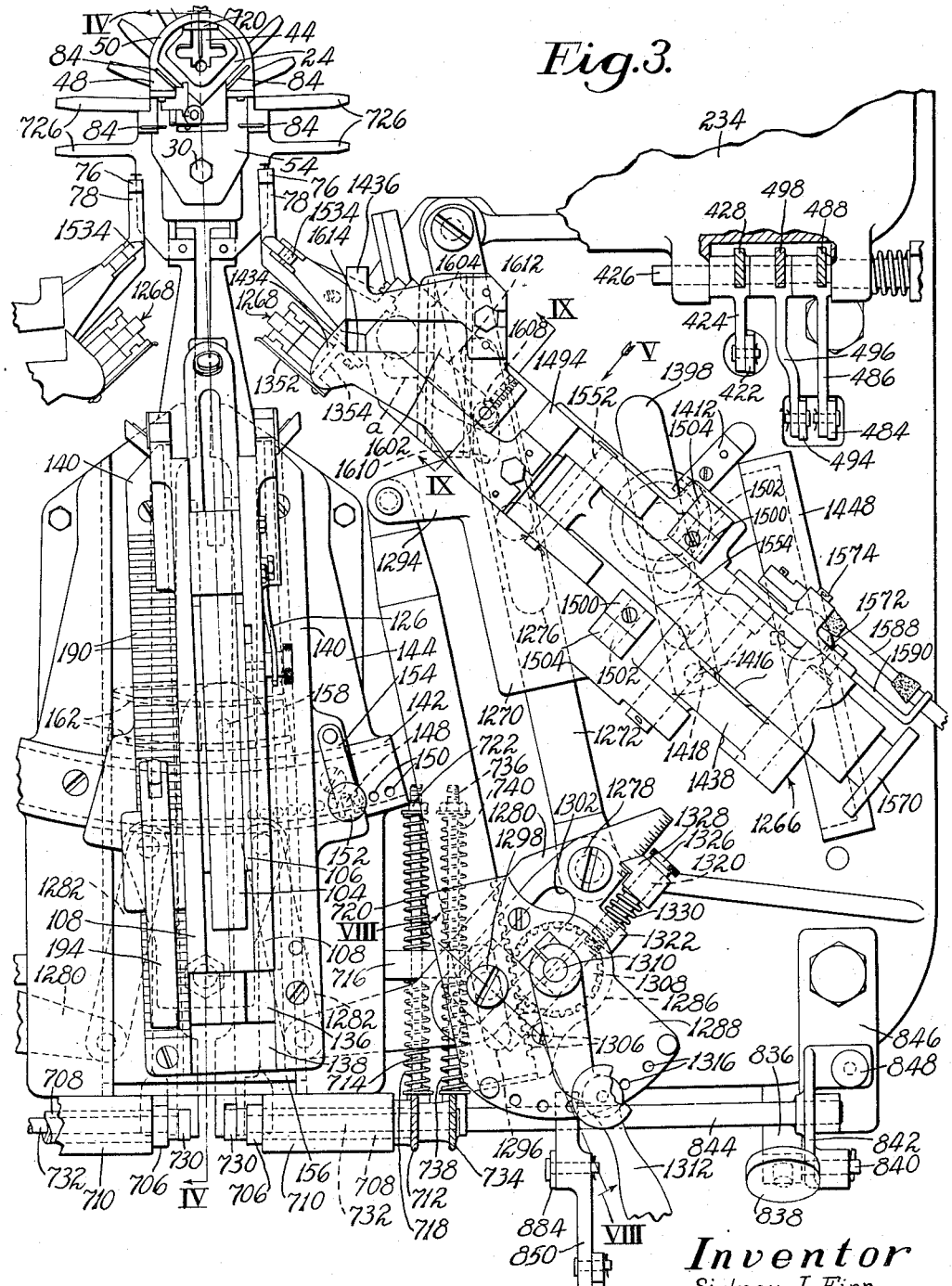
Fig. 3 is a view in the same direction, on a larger scale, of a portion of the structure shown in Fig. 2, with parts broken away.
Figure 5:
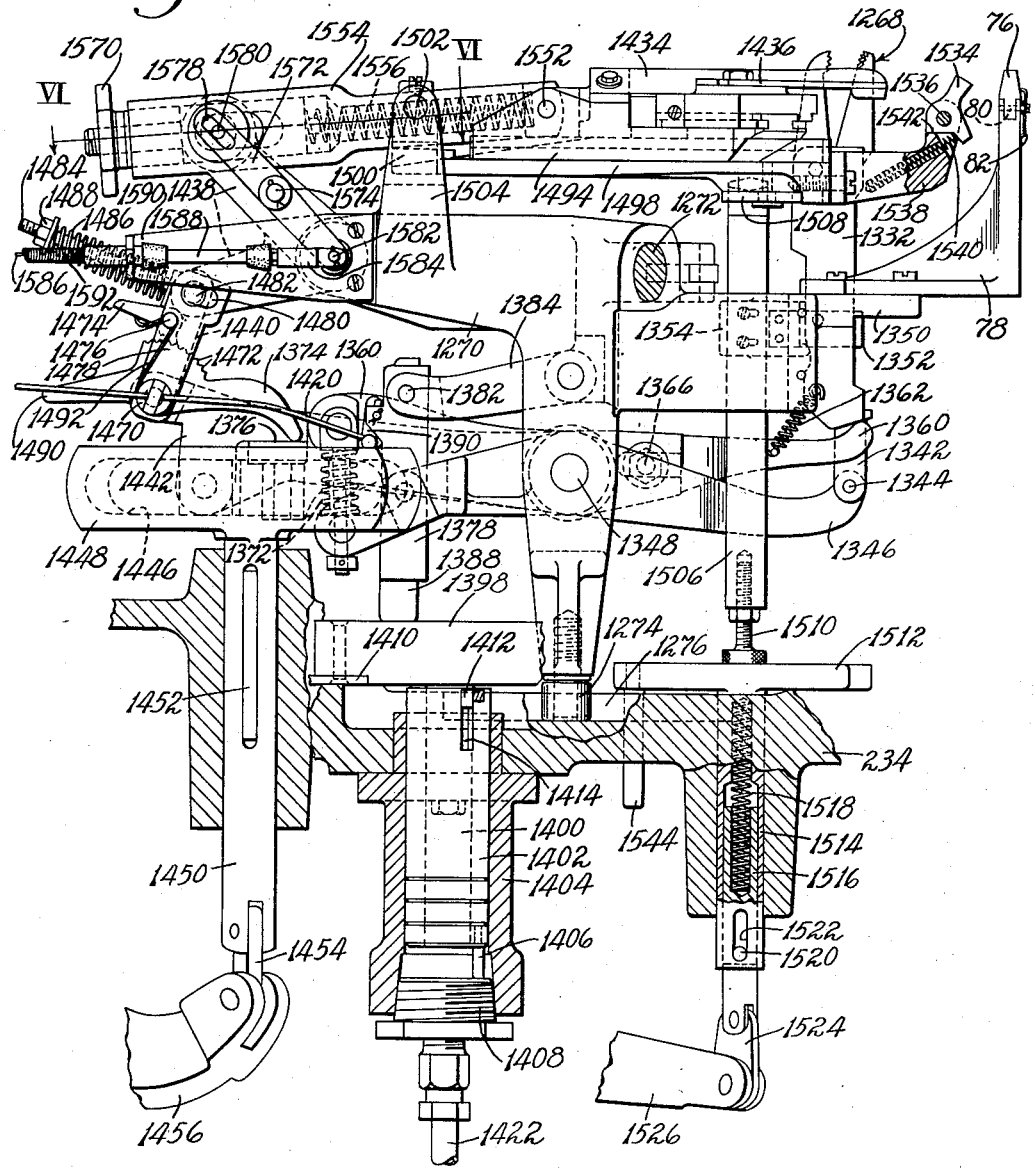
Fig. 5 is a view in the direction of the arrow V in Fig. 3 of a portion of the structure, with parts broken away.

The wipers included in the ball-lasting units for wiping the marginal portion of the upper inwardly over the insole comprise, for each unit, a pair of cooperating wiper plates 1434 and 1436 (Figs. 2 and 3). The means whereby these wipers are supported and operated will be hereinafter described in detail. At this point it is sufficient to state that the wipers of each unit are moved inwardly toward the shoe by a bell-crank lever 1438 (Fig. 5) pivotally mounted on the casting 1270. The lower arm of this bell-crank lever is connected by a link 1440 (Fig. 7) to one end of an arm 1442 the other end of which is pivotally mounted on the rod 1348. Pivotally mounted on this arm is a square block 1444 which lies in a slot 1446 formed in one side of a crossbar 1448 fast on the upper end of a rod 1450 guided for upward and downward movements in the top frame casting 234, the rod being prevented from turning by a key 1452. This crossbar, like the crossbar 1398 on the upper end of the piston 1400, extends in parallel relation to the guide rod 1272. At its lower end the rod 1450 associated with the right-hand ball-lasting unit shown in Fig. 5 is connected by a link 1454 to one arm of a bell-crank lever 1456 (Fig. 41) mounted on the previously mentioned rod 1004, the other arm of this bell-crank lever being provided with a roll 1458 engaged by a groove cam 1460 formed in one side of the previously mentioned cam wheel 1092 on the clutch-operated cam shaft 976. The cam 1460 is so formed and arranged that shortly after the beginning of the rotation of the cam shaft 976 the rod 1450 and its crossbar 1448 begin to move upwardly to operate the bell-crank lever 1438. For similarly operating the bell-crank lever 1438 of the left-hand unit there is provided a bell-crank lever 1462 (Fig. 34) one arm of which is connected by a link 1464 to the corresponding rod 1450 and the other arm of which is provided with a roll 1466 engaged by a groove cam 1468 formed in one side of the previously mentioned cam wheel 1024.

The previously mentioned stop member 1374 of each ball-lasting unit is pivotally mounted between its opposite ends on a pin 1470 which connects the lower end of the link 1440 to the arm 1442. Formed on a segmental portion of this stop member are a plurality of teeth 1472 engaged by a pawl 1474 which is pivotally mounted on a pin 1476, this pin being supported on a double link 1478 between the two arms of which the stop member and the pawl are located. The double link is pivotally mounted at its lower end on the pin 1470, and at its upper end its two arms are provided with slots 1480 through which a pin 1482 connecting the upper end of the link 1440 to the bell-crank lever 1438 extends. Extending laterally from this pin is a rod 1484 surrounded by a spring 1486 which bears at one end on a washer engaging the double link 1478 and at its other end on a washer engaging a nut 1488 on the rod. The teeth 1472 and the pawl 1474 are so arranged that the pawl prevents any swinging of the stop member 1374 relatively to the link 1478 about the pin 1470 by upward pressure against the stop member of the block 1376 on the lever 1360. Accordingly, as the lever 1346 is operated in the manner hereinbefore described to close the ball gripper on the upper the stop member is effective on the lever 1360 to prevent downward movement of the gripper until it has gripped the upper. By the movement of the lever 1346, however, the spring 1372 is compressed until its force becomes great enough to overcome the force of the spring 1486, whereupon the stop member is swung with the link 1478 a short distance about the pin 1470 against the resistance of the spring 1486 as permitted by the slots 1480 in the link. This permits the lever 1360 to begin to swing in the same direction as the lever 1346 and thereby to cause the gripper to begin to pull the upper, the beginning of the upper-pulling movement thus taking place prior to the swinging of the bell-crank lever 1438 and therefore prior to the beginning of the inward movements of the ball wipers. Immediately after the gripper thus begins to pull the upper the cam-operated crossbar 1448 begins to move upwardly to operate the bell-crank lever 1438 and thus to begin the inward movements of the wipers, and by this upward movement of the crossbar the stop member 1374 is moved bodily upward to permit further movement of the lever 1360 and thus to permit further upper-pulling movement of the gripper until the resistance of the upper balances the force of the fluid acting on the piston 1400. It will be understood that prior to the completion of the operation of the machine return movement of the crossbar 1448 causes the stop member 1374 to impart return movement to the lever 1360 and, through the spring 1372, to the lever 1346, thus returning the gripper to its initial upraised and open position.

The stop member 1374, by means of an arm 1490 thereon, may be adjusted about the pin 1470 after the pawl 1474 has been disengaged from the teeth 1472 against the resistance of a spring 1492 which holds it against the teeth. In response to such adjustment of the stop member the lever 1360 and the lever 1346 swing about the rod 1348 to vary the initial position of the gripper heightwise of the shoe. It is because of such adjustment of the gripper that the bar 1388, as hereinbefore described, is adjustably movable upwardly or downwardly in the member 1378 after disconnection of the latch 1390 from the teeth 1396. That is, any substantial adjustment of the gripper by the stop member requires a compensating adjustment of the bar.

The two wipers 1434 and 1436 of each ball-lasting unit are carried toward and from the shoe by a slide 1494 (Figs. 5 and 9) mounted to move along guideways 1496 on a wiper support 1498. This wiper support is provided, on an end thereof remote from the shoe, with upwardly extending lugs 1500 (Fig. 3) in which are secured pins 1502 mounted to turn in upwardly extending arms 1504 on the casting 1270. The wiper support 1498, with the parts thereon, may therefore swing upwardly and downwardly about the axis of the pins 1502. Guided for upward and downward movements in the casting 1270 is a rod 1506 by which the wiper support 1498 is itself supported in a location nearer the shoe than the pins 1502, the upper end portion of this rod having an interlocking connection with a plate 1508 secured to the lower face of the wiper support. On its lower end the rod 1506 is provided with a screw 1510 the head of which rests on a crossbar 1512 formed on the upper end of a tubular member 1514 guided for upward and downward movements in the top frame casting 234. Slidingly movable in this tubular member is another tubular member 1516, and pressing oppositely on the two members is a spring 1518 compressible by upward movement of the member 1516 relatively to the member 1514. A pin 1520 extending from the member 1516 through slots 1522 in opposite sides of the member 1514 limits relative movement of the members under the influence of the spring. The member 1516 associated with the right-hand ball-lasting unit shown in Fig. 5 is connected by a link 1524 to one end of a lever 1526 (Fig. 13) mounted at its other end on the rod 1004 and provided between its ends with a roll 1528 engaged by a cam 1530 formed on the periphery of a cam wheel 1532 on the cam shaft 976. Initially this cam supports the wipers in positions slightly lower than they should occupy in wiping the margin of the upper inwardly over the insole, and substantially at the beginning of the movement of the cam shaft 976 the cam swings the wiper support 1498 upwardly about the axis of the pins 1502 until a finger 1534 carried by the support and located in the path of inward movement of the wipers engages the margin of the insole and presses it against the bottom of the last. This finger, therefore, acts as an insole edge holddown while also determining the positions of the wipers heightwise of the shoe. It is pivotally mounted on a pin 1536 on a bracket 1538 secured to the wiper support 1498 and it is held initially by a spring 1540 in a position determined by engagement with a shoulder 1542 on the bracket. When the wipers wipe the upper inwardly over the insole they displace the finger 1534 by swinging it inwardly and downwardly away from the insole to permit them to wipe the margin of the upper fully inward over the insole and to cause the spring 1518 to force the wipers more firmly against the margin of the upper. The crossbar 1512 and the tubular member 1514 are prevented at all times from turning by means of a pin 1544 extending downwardly from the crossbar through a hole in the casting 234. The tubular member 1516 associated with the left-hand ball-lasting unit is connected by another link 1524 to a lever 1546 (Fig. 32) mounted on the rod 1094 and provided with a roll 1548 engaged by a cam 1550 on the periphery of the previously mentioned cam wheel 1172. It will be understood that this cam acts simultaneously with the cam 1530 to impart upward swinging movement to the wiper support 1498 of the left-hand unit.

For moving the wipers of each ball-lasting unit inwardly toward the shoe by the movement of the corresponding bell-crank lever 1438, there is pivotally connected by means of a pin 1552 to the wiper-carrying slide 1494 the inner end of a tubular casing 1554 in which is a spring 1556, the inner end of the spring bearing on the casing. The outer end of the spring (Fig. 6) is seated against a hollow plunger 1558 slidingly movable in the casing. In the upwardly extending arm of the bell-crank lever 1438 there is a pin 1560 which extends through slots 1562 in the opposite sides of the casing 1554 and also through slots 1564 in the opposite sides of the plunger 1558. This pin also extends through a bore in a block 1566 mounted within the hollow plunger 1558 and provided with a stem 1568 on which is threaded a hand nut 1570 slidingly movable in the outer end of the casing 1554 and abutting against the outer end of the hollow plunger 1558. It will thus be seen that when the bell-crank lever 1438 is swung in a clockwise direction with reference to Fig. 5 it acts through the pin 1560, the block 1566, the nut 1570 and the plunger 1558 against the outer end of the spring 1556 to move the casing 1554 and the wiper-carrying slide 1494 inwardly toward the shoe. Upon engagement of the wipers with the upper held under tension by the gripper 1268, the resistance of the upper causes the pin 1560 to move along the slots 1562 and thereby to compress the spring 1556. When the gripper releases the upper the spring is permitted to expand, and by this action of the spring and further movement of the bell-crank lever the wipers are moved inwardly to wipe the margin of the upper as far as required over the insole. It will be evident that by turning the nut 1570 the amount of initial compression of the spring may be varied, the slots 1564 in the plunger 1558 being provided to permit the plunger to move for this purpose relatively to the pin 1560.

The resistance of the upper held under tension by each gripper 1268 to the inward movements of the corresponding wipers 1434 and 1436 is utilized to cause the gripper to release the upper. Since the gripper is operated with only moderate force by the comparatively small piston 1400, when the upper is thus released the wipers will have moved far enough to press it against the edge of the insole and will accordingly wipe it immediately inward over the insole upon its release without any loss of the tension applied thereto by the gripper. For the purpose in view a lever 1572 (Figs. 5 and 6) is pivotally mounted between its opposite ends on a pin 1574 carried by a boss 1576 formed on the bell-crank lever 1438, the lever 1572 having in its upper end a slot 1578 into which extends a pin 1580 fast in the casing 1554. The lower end of the lever 1572 is pivotally connected by a pin 1582 to a member 1584 to which is secured one end of a flexible wire cable 1586. This cable extends through a tubular guide 1588 attached to a bracket 1590 fast on the casting 1270 and further extends through a flexible guide 1592 (Figs. 40 and 52) to another tubular guide 1594 attached to a bracket 1596 which is secured to one of the valve casings 1426. The other end of the flexible cable is secured to a pin 1598 which is fastened to the valve 1424 and which is arranged in telescopic relation to the guide 1594. As hereinbefore explained, this valve is initially so positioned as to afford communication between the fluid line 1430 leading from valve #6 and the pipe 1422 leading to the corresponding cylinder 1404 in which are the pistons that operate the gripper. When the ball wipers meet the resistance of the upper and the movement of the tubular casing 1554 is thereby retarded, the continued movement of the bell-crank lever 1438 against the resistance of the spring 1556 causes the lever 1572 to swing about the pin 1580 as a fulcrum, the lower end of the lever applying a pull to the flexible cable 1586 to which it is attached. The resulting movement of the valve 1424 interrupts communication between the fluid line 1430 and the pipe 1422, and through an annular recess 1600 in the valve communication is established between the pipe 1422 and the exhaust pipe 1432, thus opening the cylinder 1404 to exhaust and causing the gripper to release the upper.

As previously stated, the two wipers 1434 and 1436 (Figs. 3 and 9) of each ball-lasting unit are carried toward and from the shoe by the slide 1494 movable along the guideways 1496 on the underlying wiper support 1498. The wipers are thus moved obliquely widthwise of the shoe and lengthwise thereof toward its toe end into positions to act on the margin of the upper at the ball portion of the shoe, the wiper 1436 extending farther toward the toe end of the shoe than the wiper 1434 and the latter being arranged to act on the upper in a location where the edge of the shoe bottom curves inwardly toward the shank portion of the shoe beyond the ball line. The wiper 1434 is secured to the slide 1494 and therefore always moves in the same direction as this slide. The wiper 1436, however, is secured to another small slide 1602 which is carried by the slide 1494 but is movably mounted on guideways 1604 provided by an upraised T-shaped portion of the slide 1494, these guideways extending in oblique relation to the guideways 1496 along which the slide 1494 is movable. Mounted on a pin 1606 secured to the slide 1602 is a roll 1608 which lies in a slot 1610 (Fig. 3) formed in the slide 1494 and in another slot 1612 in the wiper support 1498. The main portion of the slot 1612 is parallel to the direction of the movement of the slide 1494, and accordingly as the wipers are moved by this slide toward the shoe they maintain the same relation to each other in which they are shown in Fig. 3 substantially until they arrive in positions to act on the upper. At this time the roll 1608 arrives in position to enter another portion $a$ of the slot 1612 which extends in oblique relation to the main portion of the slot and in substantially perpendicular relation to the guideways 1604 for the small slide 1602. During further movements of the wipers the roll moves along this portion of the slot, as permitted by the slot 1610 in the slide 1494, the wiper 1436 being thus guided or deflected to move in a path extending directly, or nearly so, widthwise of the shoe in response to the continued movement of the slide 1494 while the wiper 1434 continues to move in the same oblique direction. By reason of such control of the wiper 1436 there results a relative movement of the two wipers in such manner that the wiper 1436 enters a right angular notch or recess 1614 in the wiper 1434, the two wipers thus assuming finally the relation illustrated in Fig. 60. The effect of such control of the wiper 1436 is to avoid undue deflection of portions of the margin of the upper near the ball line toward the toe end of the shoe, such as might result if this wiper continued to have the same component of movement toward the toe end of the shoe as the wiper 1434.

Figure 61:
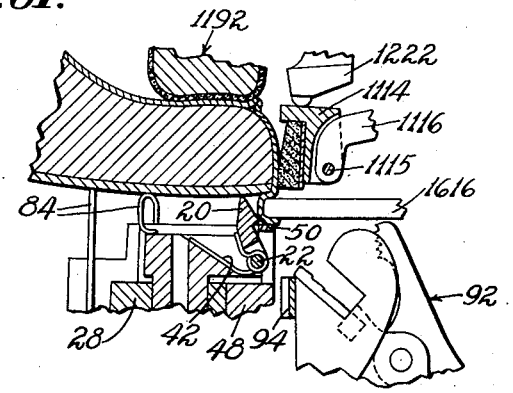
Figure 62:
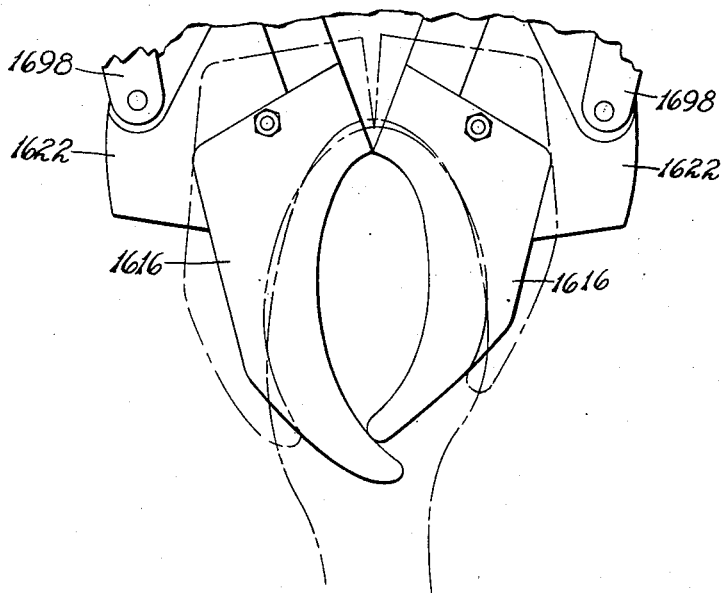

For wiping the marginal portion of the upper inwardly over the insole around the toe end of the shoe and along the opposite sides of the forepart beyond the toe portion the machine is provided with a pair of toe-embracing wipers 1616 (Fig. 35) one of which is longer than the other to operate on the upper along the outer side of a right or a left shoe, the wipers being arranged to be inverted in changing from right shoes to left shoes or vice versa. These wipers are secured by bolts 1618 and nuts 1620 in recesses formed in wiper holders 1622 which are guided for swinging or closing movements about an axis located where the wiping edges of the wipers meet at the end of the toe by means of an arcuate rib 1624 which extends into corresponding recesses in the wiper holders from an underlying plate, this plate being supported on the previously mentioned wiper carrier 1122. The wiper holders have arcuate outer edge faces 1628 engaged by blocks 1630 which are secured to the carrier 1122 to assist further in supporting the holders against the outward pressure of the shoe on the wipers. The plate 1626 has an edge contour corresponding for the most part to the edge contour of the combined wiper holders 1622, and it is arranged to be moved rectilinearly toward the shoe relatively to the carrier 1122 and thus to impart to the wipers bodily movements lengthwise of the shoe in wiping engagement with the upper. Prior to such movement of the plate, however, and prior to closing movements of the wipers the wiper carrier 1122 is moved lengthwise of the shoe with the parts supported thereon to carry the wipers to positions where they have started to wipe the upper inwardly at the end of the toe, as illustrated in Fig. 61. For this purpose the wiper carrier is supported on a casting 1632 (Fig. 38) which is secured on the top frame casting 234 and is movable along guideways 1634 in the casting 1632, portions of the carrier being confined in these guideways by gibs 1636. Downwardly extending portions 1638 on the rear end of the wiper carrier have mounted therein a rod 1640 connected by a link 1642 to one arm of a bell-crank lever 1644 (Fig. 1) loosely mounted on the shaft 1156, the other arm of this bell-crank lever being connected by a link 1646 to one arm of a lever 1648 mounted between its opposite ends on a rod 1650 on the frame. The other arm of the lever 1648 is connected by a link 1652 to one arm of a lever 1654 (Fig. 32) mounted between its opposite ends on the rod 1086. The other arm of this lever is provided with a roll 1656 engaged by a groove cam 1658 formed in one side of the previously mentioned cam wheel 1172. It will thus be seen that by the action of this cam on the connections described the forward movement is imparted at the proper time to the wiper carrier 1122 to carry the wipers to the positions shown in Fig. 61.

Figure 39:
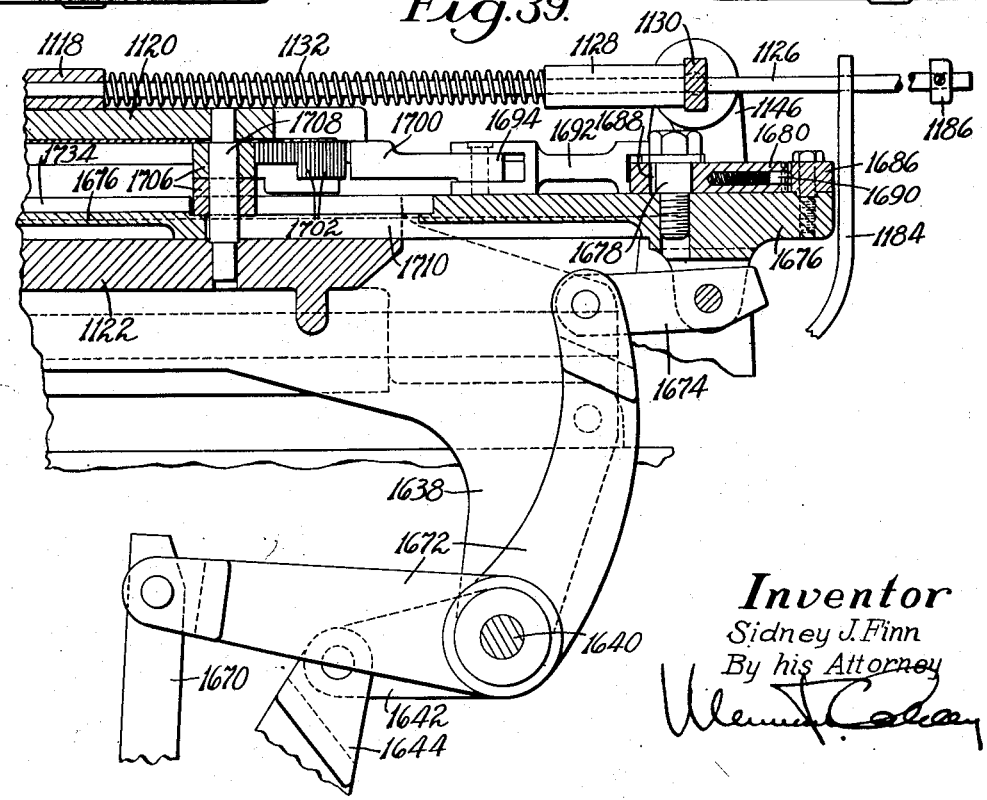
Fig. 39 is a section on the line XXXIX—XXXIX of Fig. 35.

The movement of the plate 1626 thereafter to advance the wipers lengthwise of the shoe relatively to the wiper carrier 1122, and also the swinging or closing movements of the wipers in the paths determined by the guide rib 1624, are effected by another groove cam 1660 (Fig. 13) formed in one side of the previously mentioned cam wheel 1532, this cam acting on a roll 1662 which is mounted on one end of a lever 1664 pivotally mounted between its opposite ends on the rod 1086. The other end of this lever is connected by a link 1666 to one arm of a bell-crank lever 1668 mounted to swing about the rod 1650, the other arm of this bell-crank lever being connected by a link 1670 (Fig. 39) to one arm of a bell-crank lever 1672 mounted on the rod 1640. The other arm of the bell-crank lever 1672 is connected by a link 1674 to the rear end of a slide 1676 mounted to move in directions lengthwise of the shoe along guideways on the wiper carrier 1122. Mounted midway between its opposite ends for swinging movements about a stud 1678 on the rear end portion of the slide 1676 is a crossbar 1680. On an intermediate rearward extension of the crossbar are formed a series of teeth 1682 in opposed relation to a similar series of teeth 1684 formed on a block 1686 fast on the rear end of the slide 1676. The stud 1678 extends through a short slot 1688 extending lengthwise of the shoe in the crossbar, and by means of a spring-pressed pin 1690 mounted in the crossbar and bearing against the extremities of the teeth 1684 the crossbar is normally held as shown in Figs. 35 and 39 in a position in which the two series of teeth are out of engagement with one another. Extending forwardly from each end of the crossbar 1680 is a link 1692 the front end of which is pivotally connected to an angular lever 1694 pivotally mounted on a pin 1696 in the rear end portion of a forwardly extending link 1698, this link being pivotally connected at its front end to one of the wiper holders 1622. One arm 1700 of each angular lever 1694 is formed to serve as a pawl for engagement with teeth 1702 formed on one side of a block 1704 through a forwardly and rearwardly extending slot in which the adjacent link 1698 extends. Each block 1704 is supported on the outer end portion of a lever 1706, these two levers being pivotally mounted at their inner ends, midway between the opposite sides of the wiper carrier 1122, on a pin 1708 in fixed relation to the wiper carrier and its cover plate 1120. The pin 1708 extends through a slot 1710 in the slide 1676. Each block 1704 is pivotally connected to the underlying lever 1706 by a pin 1712 which extends upwardly from the lever and the upper end of which is mounted in a slot 1714 in the link 1698. Initially, as shown, the two pawls 1700 are in retracted positions widthwise of the machine, and at the beginning of the forward movement of the slide 1676 they are still maintained in those positions by friction means shown in Fig. 36. Extending through a hole in the rear end of each angular lever 1694 and through a slot 1716 extending widthwise of the link 1698 is a bolt 1718 on the upper end of which is threaded a nut 1720, and mounted between a head on the lower end of the bolt and a washer 1722 engaging the link 1698 is a spring 1724 which is under compression. By reason, therefore, of the friction between each lever 1694 and the adjacent link 1698 this lever is prevented from turning about the pin 1696 as the slide 1676 begins its forward movement. Accordingly, in response to such movement of the slide the crossbar 1680 acts through the links 1692 and the levers 1694 to impart forward movements to the links 1698 and thereby to swing the wiper holders 1622 and the wipers inwardly until inwardly curved ends of the wipers engage the upper in locations where the bottom of the shoe is inclined toward the shank beyond the ball line, as illustrated by dot-and-dash lines in Fig. 62, the margin of the upper having already been wiper inwardly over the insole in these locations by the ball wipers. By reason of the provision for swinging movement of the crossbar about the stud 1678 the wipers thus adjust themselves to the shoe in response to resistance of the shoe to closing movement of one or the other of them before they begin to wipe the upper inwardly along the sides of the shoe nearer the toe portion. It will be understood that in this operation the links 1698 are moved forward relatively to the pins 1712 and the pawls 1700 are moved forward to positions opposite the teeth 1702 on the blocks 1704. The resistance of the shoe to further closing movements of the wipers after they have thus adjusted themselves to the shoe causes the angular levers 1694 to be swung about the pins 1696 by further movement of the slide 1676 until the pawls 1700 engage the teeth 1702. Thereafter, since the levers 1694 can swing no farther, continued movement of the slide 1676 carries the block 1686 forwardly to cause its teeth 1684 to engage the teeth 1682 on the crossbar and thus to lock the crossbar against any further swinging movement. The continued movement of the slide then causes the crossbar to act positively through the links 1692 on the links 1698 to close the wipers equal distances from the positions which they assumed in adjusting themselves to the shoe. Simultaneously forward movement of substantially the same extent is imparted to the plate 1626 further to advance the wipers bodily lengthwise of the shoe, the plate being for this purpose connected to the pair of levers 1706 by links 1726 which are pivotally mounted at their front ends on a pin 1728 carried by the plate and at their rear ends on pins 1730 mounted respectively on the different levers at opposite sides of the pin 1708. The two levers are swung forwardly about the pin 1708 thus to act on the plate 1626 by the action of the pawls 1700 on the blocks 1704 which are connected to the levers by the pins 1712. It will be evident that in response to the swinging movements of the levers the links 1698 are swung somewhat in outward directions, as permitted by the pivotal connections between the links 1692 and the crossbar 1680. To assist in controlling the plate 1626 there is mounted on the pin 1728 a block 1732 which is movable in a guideway 1734 in the slide 1676. It will be understood that in response to reverse rearward movement of this slide the parts are returned to the positions in which they are shown in Fig. 35.

While the bottoms of the foreparts of most shoes have at least some convex lengthwise curvature, the wipers 1616 herein shown are provided with plane wiping faces. It is to render these wipers effective to wipe the margin of the upper inwardly all along the sides of the foreparts of such shoes that they are provided, as hereinbefore described, with inwardly curved ends arranged to engage the upper of each shoe in locations where the bottom of the shoe is inclined toward the shank beyond the ball line before other portions thereof at the sides of the shoe arrive in positions to act on the upper. As the wipers thereafter continue their closing movements they act on such inclined portions of the bottom of the shoe to force or deflect the forepart of the shoe slightly upward away from the shoe rest members 20 and 76 against the resistance of the comparatively light spring 1210 which controls the toe rest 1192, so that by the time the portions of the wipers which act on the margin of the upper at the sides of the forepart of the shoe nearer the toe portion are in positions to wipe the upper inwardly the shoe will be in such relation to the wipers as to permit them to act on those portions of the upper without displacement of the edge of the insole. As hereinbefore explained, the wipers have already wiped the upper partially inward over the insole at the end of the toe (Fig. 61) prior to their closing movements, and such upward movement of the forepart of the shoe has also the effect of preventing excessive pressure of the wipers on the margin of the upper at the end of the toe during their further wiping movements lengthwise of the shoe.

Figure 54:
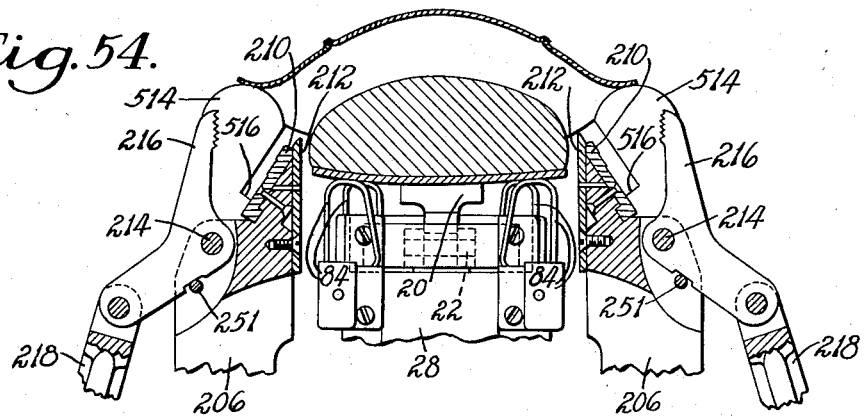

The manner of operation of the machine will now be briefly summarized. The operator takes a last having an insole tacked on its bottom face and an upper loosely assembled thereon and presents it with the marginal portion of the bottom of the forepart of the insole in engagement with the three shoe-positioning fingers 20 and 76 and with the toe-end face of the last in engagement with the plate 94 on the toe-end gripper 92, this gripper being held by the arms 312 (Figs. 4 and 14) against movement in a rearward direction to serve as an end gage for positioning the last lengthwise. The plate 94, by reason of its shape, also positions the toe end of the last laterally. In thus presenting the last and shoe the operator positions the upper on the heel end of the last against the pads 98 of the V-shaped portion of the heel rest 96 and the top of the heel end of the last against the plate 100 on the heel rest and by such engagement moves the heel rest in directions lengthwise and heightwise of the shoe to a position determined by the last and shoe positioned as above described. At this time all the forepart grippers 202 and 204, if the grippers 204 are in positions for use, are spaced short distances outwardly from the lateral periphery of the last so as not to interfere with the presentation of the last, and the forepart of the upper is held upwardly away from the last so that its marginal portion will not extend downwardly between the last and the grippers, as illustrated in Fig. 54.

Having presented the work as above described and while holding it in the position in which it is thus presented, the operator depresses the treadle 636. By the depression of this treadle the valve 616 (Fig. 45) is moved into position to admit fluid under pressure from the manifold 544 to the cylinder 578 (Fig. 46), thus causing the piston 576 to act through the pawl 590 to turn the cam shaft 572 and the group of cams 570 thereon through an arc of 60°. This causes valve #1 (Fig. 53) to be moved by cam #1 of the group of cams into position to admit fluid to the chambers 870 and 872 in communication with the cylinders 230 to operate the pistons 228, these pistons acting on the toggles 220 of the forepart grippers, other than the central toe gripper, to swing the corresponding grippers inwardly into engagement with the lateral periphery of the last. The pressure-reducing valve 876 in the fluid line leading to the above-mentioned chambers reduces the pressure of the fluid effective on the pistons to such a degree that the toggles 220 are not operated to close the grippers, the pressure being only sufficient to swing the grippers inwardly as described. As the grippers are thus swung inwardly the rolls 338 (Fig. 25) on the arms 334 engage the abutment 340 and position these arms relatively to the grippers as determined by the positions of the grippers in engagement with the last, the locking members 342 being raised to release the arms 334 in time to permit the arms to be thus positioned relatively to the grippers. The raising of the locking members is effected by the piston 354 and the member 350 thereon in response to the admission of fluid to the cylinder 356, such admission of the fluid resulting from movement of valve #2 under control of the appropriate cam on the cam shaft 572. It will be understood that this also results from the first depression of the treadle. Still another result of this depression of the treadle is the movement of the heel rest holder 110 by the piston 174 (Fig. 4) into position to prevent displacement of the heel rest in a forward direction toward the front of the machine by engagement of the plates 108 of the holder with the extensions 180 of the heel rest, as illustrated in Fig. 55, the detents 184 engaging the teeth 182 to lock the heel rest also against any upward displacement. The movement of the piston 174 is effected by fluid admitted to the cylinder 176 by movement of valve #7 under control of the appropriate cam, the fluid being trapped in the fluid line leading to this cylinder. The heel rest holder is locked positively against reverse movement by one or the other of the two pawls 186 (Fig. 12) in cooperation with the teeth 190.

Figure 56:
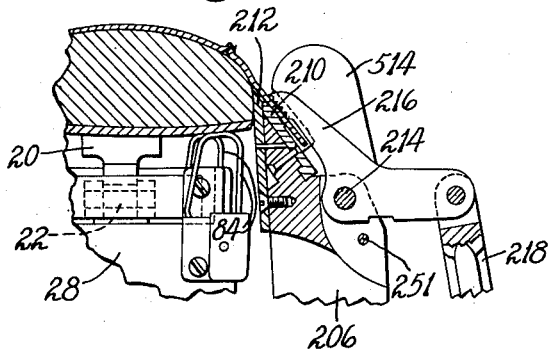
Figure 57:
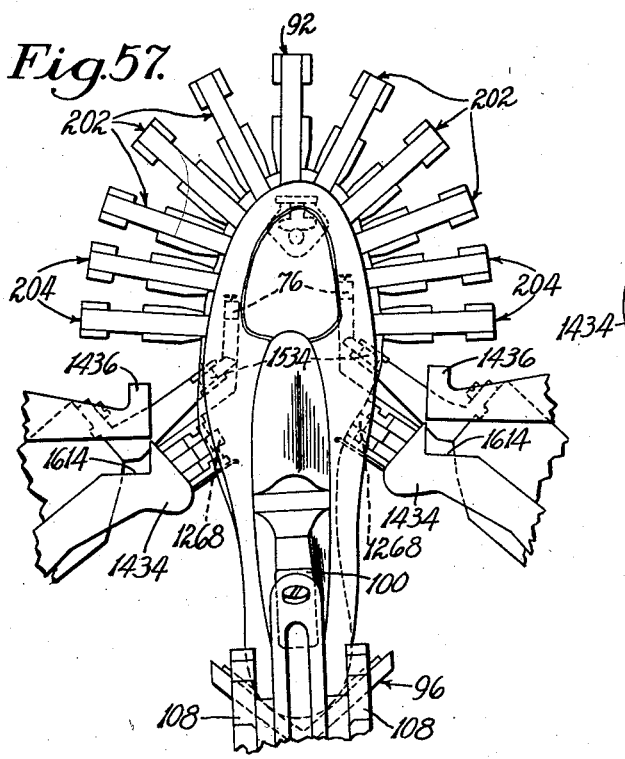

After the above-described operations the operator inserts the margin of the upper between the jaws of the forepart grippers, as illustrated in Fig. 55 with reference to the central toe gripper, the distance the upper extends between the gripper jaws being determined by the plates 514 as to those grippers which are provided with such plates. Thereafter the operator again depresses the treadle 636 to cause the group of cams on the cam shaft 572 to be turned as before through a second arc of 60°. As a result of this movement of the group of cams the locking members 342 are released by the piston 354 to cause them to be moved downwardly by their springs 344 and thus to lock the arms 334 in the positions which they previously assumed relatively to the grippers. At approximately the same time valve #3 is moved by the appropriate cam to admit fluid under greater pressure from the manifold to the chambers 870 and 872 for operating the toggles 220 to effect relative closing movements of the gripper jaws (Fig. 56). The increased forces thus applied to the grippers to close the jaws do not force the grippers which were swung inwardly any harder against the last because of the engagement of the rolls 338 on the arms 334 with the abutment 340, the arms being held by the locking members 342 against any swinging movements about the pins 336 in response to pressure of the abutment against the rolls. The pressure of the fluid admitted to the cylinders 230 by valve #3 is still below the pressure in the manifold by reason of the presence of the pressure-reducing valve 882 in the fluid line between valve #3 and the cylinders, so that when the grippers are operated to pull the upper the forces applied to the jaw-closing toggles to hold the jaws closed will not be so great as to cause undue friction. In order to insure, however, that the grippers will be firmly closed on the upper through the toggles, so that they will not slip on the upper, the pressure utilized to effect the actual closing of the jaws is increased substantially above that determined by the pressure-reducing valve 882 and, in fact, above the normal maximum pressure in the manifold. This increase of pressure results from compression of the spring 810 (Fig. 10) controlling the relief valve 806 which determines the maximum pressure in the manifold, such compression of the spring being effected by the second depression only of the treadle 636. At the same time the valve 888 is operated by the treadle to open the by-pass line 886 (Fig. 53) to the cylinders 230, so that the increase of pressure will be effective regardless of the pressure-reducing valve 882. This increase of pressure in the cylinders 230 is terminated upon release of the treadle, the pressure then falling to that determined by the pressure-reducing valve 882 by reason of escape of fluid under the increased pressure past the relief valve 912 (Fig. 53).

If it appears, after the closing of the grippers, that the upper should be readjusted between the gripper jaws, the operator presses on the knee pad 964 (Figs. 43 and 52) and thereby moves the valve member 918 (Fig. 44) into position to reduce the pressure of the fluid in the gripper-closing cylinders to cause the grippers to open, sufficient pressure remaining in the cylinders to prevent outward movements of any of the grippers away from the last. Upon release and return of this valve member, after readjustment of the upper, the pressure determined by the reducing valve 882 is restored, thus causing the grippers again to close. To insure that they will again be firmly closed, the operator may press on the knee pad 862 to compress the spring 810 controlling the relief valve 806 and also to operate the valve 888 to open the by-pass 886 for the fluid, thus increasing the fluid pressure in the cylinders 230 as was previously done in response to the second depression of the treadle. Upon release of this knee pad, after such momentary increase of the pressure, the pressure in the cylinders 230 again drops to that determined by the reducing valve 882.

In response to a third depression of the treadle 636 thereafter the cam shaft 572 and the cams thereon are turned through a third arc of 60°. This results in the movements of valve #4 and valve #5 to admit fluid from the manifold to the different groups of gripper-operating cylinders 274 to cause the pistons 272 in these cylinders to operate the levers 262 (Fig. 13) and thereby to impart to the grippers their upper-pulling movements heightwise of the last, the grippers being so guided as to move somewhat outwardly away from the last. These movements of the grippers are retarded by the comparatively small pistons 518 acting on the levers 262, their retarding action being reduced by the fluid-operated valve 672 which is moved into position to open a restricted outlet for the fluid from the cylinders 520 in which the small pistons are mounted simultaneously with the admission of fluid to the cylinders 274. The upper-pulling movements of three of the grippers located about the end of the toe are positively limited by the stop members 400 (Figs. 17 and 24) and the movements of three of the grippers at each side of the forepart are similarly limited by the stop members 446 (Figs. 22 and 23). After the pull the stop members may be rotated to vary the positions of the grippers heightwise of the last and thus to cause an increase or a decrease in the force of the pull on the upper or to adjust the upper relatively to the last. That is, by movement of the lever arm 428 the stop members 400 controlling the three grippers located about the end of the toe may be rotated to increase or decrease the force of the pull, by movements of the two lever arms 488 the stop members controlling the pairs of grippers located farthest from the end of the toe at the opposite sides of the last may be rotated similarly to control these pairs of grippers, each pair independently of the other pair, and by the two lever arms 498 the grippers located next to these pairs of grippers may be similarly controlled singly, each independently of the other. In response to such movements of the stop members controlling the grippers at the opposite sides of the last the grippers may be caused to shift the upper widthwise of the last. It may, moreover, be desired, after the pull, to shift the grippers lengthwise of the edge of the shoe bottom to adjust the upper. For this purpose the pair of hand levers 712 (Figs. 1 and 4) may be operated to shift the seven toe grippers all in the same peripheral direction around the toe. By other hand levers 734 the two pairs of grippers at the sides of the forepart beyond the toe grippers may be moved, each pair independently of the other pair, lengthwise of the last. To facilitate the movements of the stop members, especially in directions against the forces of the pistons, and also such movements of the grippers lengthwise of the edge of the shoe bottom as may be necessary, the operator, by movement of the hand lever 798, may reduce the force of the pull of all the grippers on the upper by reducing the pressure of the fluid acting on the pistons 272. By the hand lever the valve 782 (Fig. 53) is moved into position to admit fluid from the manifold to the three valve units 742 and 774 (Figs. 17 and 20) to cause the pistons 764 to move the valves 744 (Fig. 19) into positions to open restricted outlets for the fluid from the different groups of cylinders 274. After such adjustments of the stop members or the grippers as may be necessary the operator returns the valve 782 to cause restoration of the former pressure in the cylinders 274. Thereafter the operator may, if desired, increase momentarily the pressure of the fluid in these cylinders by pressing on the knee pad 862 controlling the relief valve spring. Incidentally the valve 888 is at this time moved as before by the knee pad to open the by-pass 886 and thus to cause the increased pressure to be effective also in the gripper-closing cylinders 230, but such increase of pressure in these cylinders at this time is of no significance.

Figure 59:
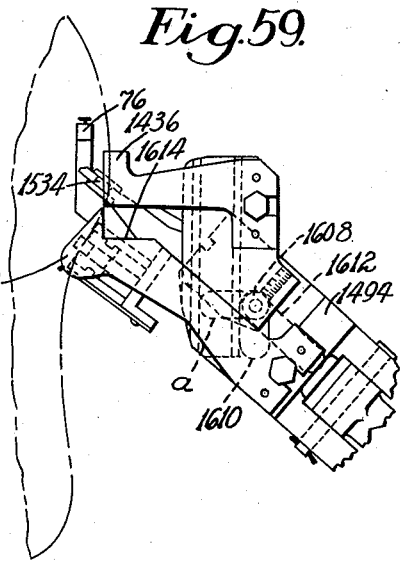
Figure 58:
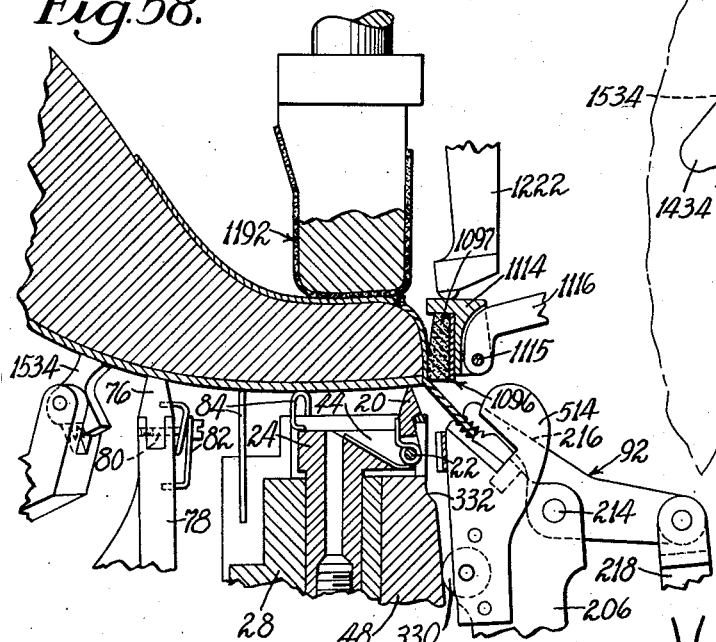
Figure 60:
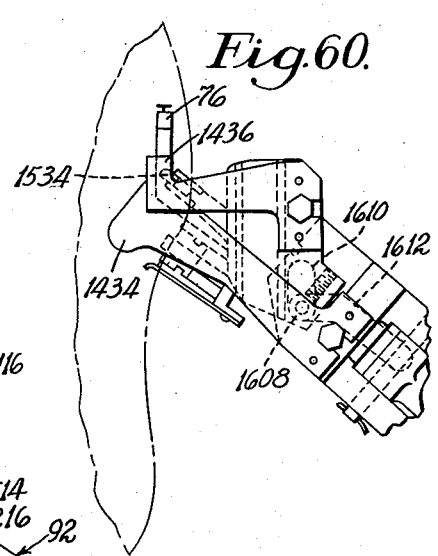

After ascertaining that the forepart of the upper has been properly pulled and is in proper relation to the last and that the margin of the upper is in proper relation to the grippers 1268 of the ball-lasting units 1266, the operator depresses the clutch-actuating treadle 972 to start the movement of the cam shaft 976. As hereinbefore explained, in the course of the single complete revolution of this cam shaft one of the cams thereon serves to complete in three stages the revolution of the group of valve-operating cams on the cam shaft 572. Substantially at the beginning of the movement of the cam shaft 976 the cam 1170 thereon acts through the mechanism shown in Fig. 32 to move the toe rest 1192 into position to engage the top of the toe end of the shoe (Fig. 58) and thus to clamp the shoe yieldingly through the spring 1210 against the shoe rest members 20 and 76. By the same mechanism the flexible band 1096, as illustrated in Fig. 58, is applied around the toe and along the sides of the forepart to clamp the upper, still held by the forepart grippers, against the lateral periphery of the last. The band having thus been applied, the forepart grippers are caused to open by release of the fluid from the cylinders 230 and these grippers are moved farther downwardly by the piston 526. Also substantially at the beginning of the movement of the cam shaft 976 the wiper supports 1498 (Fig. 5) of the two ball-lasting units are swung upwardly about the pins 1502 by the cams 1530 and 1550 (Figs. 13 and 32) on the cam shaft 976 to positions determined by engagement of the fingers 1534 on these supports with the marginal portion of the insole in the locations illustrated in Fig. 57, the two ball-lasting units having been advanced lengthwise of the shoe to positions determined by the position of the heel rest in engagement with the shoe in the movement of the heel-rest holder 110 to operative position in response to the first depression of the first-mentioned treadle 636. The pairs of wipers 1434 and 1436 of the ball-lasting units having thus been properly positioned heightwise of the shoe relatively to the portions of the shoe on which they are to operate, the grippers 1268 of the two units grip the margin of the upper and pull it heightwise of the last in response to the admission of fluid to the cylinders 1404 by valve #6 controlled by the appropriate cam on the cam shaft 572. Each gripper is thus firmly closed on the upper by the action of both pistons 1400 and 1402 in the corresponding cylinder 1404, after which the smaller piston 1400 alone operates the gripper with less force to pull the upper. At substantially the same time the cams 1468 and 1460 (Figs. 34 and 41) on the cam shaft 976 begin to swing the bell-crank levers 1438 and thus to operate the wiper-carrying slides 1494 to move the pairs of ball wipers from the positions shown in Fig. 57 toward the shoe in oblique directions widthwise of the shoe and lengthwise thereof toward its toe end. In response to resistance of the upper, still held under tension by the grippers 1268, to the inward wiping movements of these wipers the bell-crank levers move the plungers 1558 (Fig. 6) relatively to the casings 1554 against the resistance of the springs 1556, thus causing the levers 1572, acting through the flexible cables 1586, to move the valves 1424 (Figs. 40 and 53) into positions to release the fluid from the cylinders 1404 when the wipers have arrived substantially in positions to press the upper against the edge of the insole. This causes the grippers 1268 to release the upper, whereupon expansion of the springs 1556 and continued movements of the bell-crank levers 1438 force the wipers inwardly to wipe the margin of the upper over the insole, the wipers 1436 being deflected to move more directly widthwise of the shoe while the wipers 1434 continue to move in the same oblique directions. By the inward movements of the wipers the fingers 1534 are swung yieldingly inward and away from the insole out of the paths of the wipers and the latter are pressed more firmly up against the upper. Fig. 59 shows substantially the positions of the wipers when the grippers release the upper and Fig. 60 their positions at the end of the wiping operation.

In time relation to the above-described movements of the wipers of the ball-lasting units the wiper carrier 1122 (Figs. 35, 38 and 39) is operated by the cam 1658 (Fig. 32) to move the forepart wipers 1616 bodily forward to positions where they have begun to wipe the upper inwardly at the end of the toe, as shown in Fig. 61. Thereafter the slide 1676 on the wiper carrier is operated by the cam 1660 (Fig. 13), first to close the wipers until they have adjusted themselves to the shoe and then to move them lengthwise of the shoe relatively to the wiper carrier while further closing them. The first effect of the movement of the slide 1676 is to advance the pivotally mounted crossbar 1680 to cause the crossbar, acting through the links 1692, the angular levers 1694 and the links 1698, to swing the wipers inwardly until they adjust themselves to the shoe through engagement of their inwardly curved ends with portions of the margin of the upper previously wiped over the insole by the ball wipers in locations where the bottom of the shoe is inclined toward the shank beyond the ball line. In response to resistance of the shoe to further closing movements of the wipers the pawls 1700 formed on the angular levers 1694 are swung by the links 1692 into engagement with the teeth 1702 on the blocks 1704 and the crossbar is locked against any further swinging movement by the teeth formed thereon and on the block 1686. Thereafter the wipers are further closed equal distances through the links 1692 and 1698 and are advanced substantially the same distance lengthwise of the shoe through the action of the pawls 1700 on the blocks 1704 and the levers 1706 connected by the links 1726 to the wiper-advancing plate 1626 (Fig. 37). In this operation the inwardly curved ends of the wipers, acting on the above-mentioned inclined portions of the shoe bottom, force the forepart of the shoe slightly upward against the resistance of the light spring 1210 which controls the toe rest, so that the wipers will act properly on the upper at the sides of the forepart of the shoe nearer the toe portion, as hereinbefore fully explained. By the inward movements of the wipers the shoe-supporting fingers 20 and 76 are swung inwardly and downwardly away from the insole and the edge holddowns 84 also are displaced. The retarder 48, moreover, by wedging action of the wipers and the upper thereon, may be depressed against the resistance of its controlling spring 54. Before the completion of the inward movements of the wipers the force with which the toe rest is pressed against the shoe is increased through the heavier spring 1178 (Fig. 32) to increase the pressure of the wipers on the margin of the upper. Since the forepart wipers are moved to positions where they extend over portions of the upper previously acted upon the wipers of the ball-lasting units, the supports 1498 for the ball-lasting wipers are so controlled by the cams 1530 and 1550 that they are swung downwardly far enough to carry these wipers away from the paths of movement of the forepart wipers before the latter are in positions to interfere with them. After the completion of the movements of the forepart wipers the parts of the machine are returned to starting positions and the shoe is released, the cam shaft 976 coming to a stop at the end of a single revolution. To permit the heel rest holder 110 to be returned by gravity to its starting position the operator raises the pawls 186 (Fig. 12) above the teeth 190 by means of the hand lever 194. When the heel rest holder is thus returned the ball-lasting units 1266 return with it to their initial positions.

Having described my invention, what I claim as new and desire to secure by Letters Patent of the United States is:

1. In a machine for shaping uppers over lasts, means for positioning a last for the shaping of an upper thereover, a plurality of grippers having upper-gripping jaws and mounted for movements heightwise of the last to pull the upper in different locations respectively, and cylinder-and-piston devices associated respectively with said different grippers for moving them inwardly by fluid pressure in directions transverse to the directions of their pull on the upper to positions determined by their engagement with the lateral periphery of the last prior to the insertion of the upper between their jaws.

2. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws in response to forces applied to said mechanisms in directions transverse to the directions of the pull of the grippers on the upper, the grippers being further mounted for positioning movements relatively to the last in response to forces thus applied to said jaw-closing mechanisms prior to the relative closing movements of the jaws preparatory to insertion of the upper between the jaws.

3. In a machine for shaping uppers over lasts, means for positioning a last for the shaping of an upper thereover, a plurality of grippers having upper-gripping jaws and mounted for movements heightwise of the last to pull the upper in different locations respectively about the forepart of the last, said grippers including jaw-closing toggles for effecting relative closing movements of their jaws in response to forces applied to the toggles in directions transverse to the directions of the pull of the grippers on the upper, the grippers being further mounted for inward movements into engagement with the lateral periphery of the last by forces thus applied to said toggles prior to the relative closing movements of the jaws preparatory to the insertion of the upper between the jaws.

4. In a machine for shaping uppers over lasts, means for positioning a last for the shaping of an upper thereover, a plurality of grippers having upper-gripping jaws and mounted for movements heightwise of the last to pull the upper in different locations respectively about the forepart of the last, said grippers including jaw-closing mechanisms for effecting relative closing movements of their jaws, and power-operated means for moving said grippers inwardly in directions transverse to the directions of their pull on the upper to positions determined by their engagement with the lateral periphery of the last by forces applied to said jaw-closing mechanisms prior to the relative closing movements of the jaws and for holding them in those positions while the operator inserts the upper between the jaws.

5. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, and power-operated means for first imparting to said grippers positioning movements relatively to the last in directions transverse to the directions of their pull on the upper by forces applied to said jaw-closing mechanisms prior to the insertion of the upper between the jaws and for thereafter effecting relative closing movements of the jaws by greater forces thus applied to said mechanisms.

6. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, fluid-pressure means for imparting to said grippers positioning movements relatively to the last in directions transverse to the directions of their pull on the upper by forces applied to said jaw-closing mechanisms prior to the insertion of the upper between the jaws, and means for thereafter increasing the pressure of the fluid thus effective on said jaw-closing mechanisms to cause said mechanisms to effect the relative closing movements of the jaws.

7. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, power-operated means for moving said grippers inwardly toward the last in directions transverse to the directions of their pull on the upper to position them relatively to the last by forces applied to said jaw-closing mechanisms prior to the relative closing movements of the jaws and for holding them so positioned while the operator inserts the upper between the jaws, and means for thereafter increasing the forces thus applied to said jaw-closing mechanisms to effect the relative closing movements of the jaws.

8. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, fluid-pressure means for moving said grippers inwardly in directions transverse to the directions of their pull on the upper to positions determined by their engagement with the lateral periphery of the last by forces applied to said jaw-closing mechanisms prior to the relative closing movements of the jaws and for holding them in those positions while the operator inserts the upper between the jaws, and means for thereafter increasing the pressure of the fluid thus effective on said jaw-closing mechanisms to cause said mechanisms to effect the relative closing movements of the jaws.

9. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing toggles for effecting relative closing movements of their jaws in response to forces applied to said toggles in directions transverse to the directions of the pull of the grippers on the upper, fluid-pressure means for moving said grippers inwardly to positions determined by their engagement with the lateral periphery of the last by forces thus applied to said toggles prior to the relative closing movements of the jaws and for holding them in those positions while the operator inserts the upper between the jaws, and means for thereafter increasing the pressure of the fluid thus effective on said toggles to cause them to effect the relative closing movements of the jaws.

10. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing toggles for effecting relative closing movements of their jaws in response to forces applied to said toggles in directions transverse to the directions of the pull of the grippers on the upper, power-operated means for moving said grippers inwardly to positions determined by their engagement with the lateral periphery of the last by forces first applied to said toggles, springs for preventing the toggles from effecting relative closing movements of the jaws by the forces thus first applied thereto, and means for thereafter applying greater forces to said toggles against the resistance of said springs to effect the relative closing movements of the jaws.

11. In a machine for shaping uppers over lasts, means for positioning a last for the shaping of an upper thereover, a plurality of grippers having upper-gripping jaws and mounted for movements heightwise of the last to pull the upper in different locations respectively about the forepart of the last, said grippers including jaw-closing mechanisms for effecting relative closing movements of their jaws, fluid-pressure means for moving said grippers inwardly in directions transverse to the directions of their pull on the upper to positions determined by their engagement with the lateral periphery of the last by forces applied to said jaw-closing mechanisms prior to the relative closing movements of the jaws and for holding them in those positions while the operator inserts the upper between the jaws, a controlling member movable by the operator to cause said fluid-pressure means thus to position the grippers, and means responsive thereafter to another movement of said controlling member for increasing the pressure of the fluid thus effective on said jaw-closing mechanisms and for thereby causing said mechanisms to effect the relative closing movements of the jaws.

12. In a machine for shaping uppers over lasts, means for positioning a last for the shaping of an upper thereover, a plurality of grippers having upper-gripping jaws and mounted for movements heightwise of the last to pull the upper in different locations respectively about the forepart of the last, said grippers including jaw-closing mechanisms for effecting relative closing movements of their jaws, fluid-pressure means for moving said grippers inwardly in directions transverse to the directions of their pull on the upper to positions determined by their engagement with the lateral periphery of the last by forces applied to said jaw-closing mechanisms prior to the relative closing movements of the jaws and for holding them in those positions while the operator inserts the upper between the jaws, a valve for admitting fluid under pressure to said fluid-pressure means thus to position the grippers, and another valve for thereafter admitting fluid under greater pressure to said fluid-pressure means to effect the relative closing movements of the jaws.

13. In a machine for shaping uppers over lasts, means for positioning a last for the shaping of an upper thereover, a plurality of grippers having upper-gripping jaws and mounted for movements heightwise of the last to pull the upper in different locations respectively about the forepart of the last, said grippers including jaw-closing mechanisms for effecting relative closing movements of their jaws, fluid-pressure means for moving said grippers inwardly in directions transverse to the directions of their pull on the upper to positions determined by their engagement with the lateral periphery of the last by forces applied to said jaw-closing mechanisms prior to the relative closing movements of the jaws and for holding them in those positions while the operator inserts the upper between the jaws, a valve for admitting fluid under pressure to said fluid-pressure means thus to position the grippers, another valve for thereafter admitting fluid under greater pressure to said fluid-pressure means to effect the relative closing movements of the jaws, a controlling member movable by the operator, and means for operating said valves in succession in response to successive movements of said controlling member.

14. In a machine for shaping uppers over lasts, means for positioning a last for the shaping of an upper thereover, a plurality of grippers having upper-gripping jaws and mounted for movements heightwise of the last to pull the upper in different locations respectively about the forepart of the last, said grippers including jaw-closing mechanisms for effecting relative closing movements of their jaws, fluid-pressure means for moving said grippers inwardly in directions transverse to the directions of their pull on the upper to positions determined by their engagement with the lateral periphery of the last by forces applied to said jaw-closing mechanisms prior to the relative closing movements of the jaws and for holding them in those positions while the operator inserts the upper between the jaws, a valve for admitting fluid under pressure to said fluid-pressure means thus to position the grippers, another valve for thereafter admitting fluid under greater pressure to said fluid-pressure means to effect the relative closing movements of the jaws, cams rotatable in unison to operate said valves in succession, a controlling member movable by the operator, and fluid-operated means for rotating said cams to operate first one of said valves and thereafter the other in response to successive movements of said controlling member.

15. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, fluid-pressure means for moving said grippers inwardly toward the last in directions transverse to the directions of their pull on the upper to position them relatively to the last by forces applied to said jaw-closing mechanisms prior to the relative closing movements of the jaws and for holding them so positioned while the operator inserts the upper between the jaws, a source of fluid under pressure, means for admitting fluid under reduced pressure from said source to said fluid-pressure means thus to position the grippers, and additional means for thereafter admitting fluid under greater pressure from said source to said fluid-pressure means to effect the relative closing movements of the jaws.

16. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, fluid-pressure means for moving said grippers inwardly toward the last in directions transverse to the directions of their pull on the upper to position them relatively to the last by forces applied to said jaw-closing mechanisms prior to the relative closing movements of the jaws and for holding them so positioned while the operator inserts the upper between the jaws, a source of fluid under pressure, a valve for admitting fluid from said source to said fluid-pressure means thus to position the grippers, a pressure-reducing valve arranged to reduce the pressure of the fluid thus admitted below the pressure at said source, and another valve for thereafter admitting from said source to said fluid-pressure means fluid under greater pressure than that determined by said pressure-reducing valve to effect the relative closing movements of the jaws.

17. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, fluid-pressure means for moving said grippers inwardly toward the last in directions transverse to the directions of their pull on the upper to position them relatively to the last by forces applied to said jaw-closing mechanisms prior to the relative closing movements of the jaws and for holding them so positioned while the operator inserts the upper between the jaws, a source of fluid under pressure, a valve for admitting fluid from said source to said fluid-pressure means thus to position the grippers, another valve for thereafter admitting fluid from said source to said fluid-pressure means to effect the relative closing movements of the jaws, and means for momentarily increasing the pressure of the fluid at said source when said other valve is operated.

18. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, fluid-pressure means for moving said grippers inwardly toward the last in directions transverse to the directions of their pull on the upper to position them relatively to the last by forces applied to said jaw-closing mechanisms prior to the relative closing movements of the jaws and for holding them so positioned while the operator inserts the upper between the jaws, a source of fluid under pressure, a valve for admitting fluid from said source to said fluid-pressure means thus to position the grippers, another valve for thereafter admitting fluid from said source to said fluid-pressure means to effect the relative closing movements of the jaws, a controlling member movable by the operator first to cause the operation of said first-named valve and thereafter to cause the operation of said other valve, and means responsive to the movement of said controlling member for increasing momentarily the pressure of the fluid at said source only when said other valve is operated.

19. In a machine for shaping uppers over lasts, means for positioning a last for the shaping of an upper thereover, a plurality of grippers having upper-gripping jaws and mounted for movements heightwise of the last to pull the upper in different locations respectively about the forepart of the last, said grippers including jaw-closing mechanisms for effecting relative closing movements of their jaws, fluid-pressure means for moving said grippers inwardly in directions transverse to the directions of their pull on the upper to positions determined by their engagement with the lateral periphery of the last by forces applied to said jaw-closing mechanisms prior to the relative closing movements of the jaws and for holding them in those positions while the operator inserts the upper between the jaws, a source of supply of fluid under pressure, a valve for admitting fluid from said source to said fluid-pressure means thus to position the grippers, a pressure-reducing valve for reducing the pressure of the fluid thus admitted below the pressure at said source, another valve for thereafter admitting from said source to said fluid-pressure means fluid uncontrolled by said pressure-reducing valve to effect the relative closing movements of the jaws, and means for momentarily increasing the pressure of the fluid at said source when said other valve is operated.

20. In a machine for shaping uppers over lasts, a plurality of grippers arranged to grip the marginal portion of an upper on a last and mounted for movements to pull the upper, fluid-pressure means for closing said grippers on the upper, other fluid-pressure means for moving the grippers to pull the upper, a source of supply of fluid under pressure for operating both said fluid-pressure means, means for admitting fluid from said source to said first-named fluid-pressure means to close the grippers, and means for momentarily increasing the pressure of the fluid at said source when the fluid is thus admitted to said first-named fluid-pressure means.

21. In a machine for shaping uppers over lasts, a plurality of grippers arranged to grip the marginal portion of an upper on a last and mounted for movements to pull the upper, fluid-pressure means for closing said grippers on the upper, other fluid-pressure means for moving the grippers to pull the upper, a source of supply of fluid under pressure for operating both said fluid-pressure means, a controlling member movable by the operator to cause the admission of fluid from said source to said first-named fluid-pressure means thus to close the grippers, and means responsive to the movement of said controlling member for momentarily increasing the pressure of the fluid at said source.

22. In a machine for shaping uppers over lasts, a plurality of grippers arranged to grip the marginal portion of an upper on a last and mounted for movements to pull the upper, fluid-pressure means for closing said grippers on the upper, other fluid-pressure means for moving the grippers to pull the upper, a source of supply of fluid under pressure for operating both said fluid-pressure means, a pump for maintaining pressure at said source, a relief valve for limiting such pressure, a spring for controlling said relief valve, means for admitting fluid from said source to said first-named fluid-pressure means to close the grippers, and means for momentarily increasing the pressure of the fluid at said source by control of said spring when the fluid is thus admitted.

23. In a machine for shaping uppers over lasts, a plurality of grippers arranged to grip the marginal portion of an upper on a last and mounted for movements to pull the upper, fluid-pressure means for closing said grippers on the upper, other fluid-pressure means for moving the grippers to pull the upper, a source of supply of fluid under pressure for operating both said fluid-pressure means, a pump for maintaining pressure at said source, a relief valve for limiting such pressure, a spring for controlling said relief valve, a controlling member movable by the operator to cause the admission of fluid from said source to said first-named fluid-pressure means to close the grippers, and means responsive to the movement of said member for increasing the stress of said spring and for thereby momentarily increasing the pressure of the fluid at said source.

24. In a machine for shaping uppers over lasts, a plurality of grippers arranged to grip the marginal portion of an upper on a last and to pull the upper, fluid-pressure means for closing said grippers on the upper, a source of supply of fluid under pressure, means for admitting fluid from said source to said fluid-pressure means to close the grippers, a pressure-reducing valve past which the fluid flows to said fluid-pressure means, a normally closed by-pass arranged to permit the flow of fluid from said source to said fluid-pressure means independently of said pressure-reducing valve, and means for momentarily opening said by-pass when the fluid is thus admitted to said fluid-pressure means.

25. In a machine for shaping uppers over lasts, a plurality of grippers arranged to grip the marginal portion of an upper on a last and to pull the upper, fluid-pressure means for closing said grippers on the upper, a source of supply of fluid under pressure, a controlling member movable by the operator to cause the admission of fluid from said source to said fluid-pressure means to close the grippers, a pressure-reducing valve past which the fluid flows to said fluid-pressure means, a normally closed by-pass arranged to permit the flow of fluid from said source to said fluid-pressure means independently of said pressure-reducing valve, and means responsive to the movement of said controlling member for momentarily opening said by-pass when the fluid is thus admitted to said fluid-pressure means.

26. In a machine for shaping uppers over lasts, a plurality of grippers arranged to grip the marginal portion of an upper on a last and to pull the upper, fluid-pressure means for closing said grippers on the upper, a source of supply of fluid under pressure, means for admitting fluid from said source to said fluid-pressure means to close the grippers, a pressure-reducing valve past which the fluid flows to said fluid-pressure means, a normally closed by-pass arranged to permit the flow of fluid from said source to said fluid-pressure means independently of said pressure-reducing valve, means for momentarily opening said by-pass when the fluid is thus admitted to said fluid-pressure means, and additional means for also momentarily increasing the pressure of the fluid at said source when the fluid is thus admitted.

27. In a machine for shaping uppers over lasts, a plurality of grippers arranged to grip the marginal portion of an upper on a last and to pull the upper, fluid-pressure means for closing said grippers on the upper, a source of supply of fluid under pressure, a pump for maintaining pressure at said source, a relief valve for limiting such pressure, a spring for controlling said relief valve, a controlling member movable by the operator to cause the admission of fluid from said source to said fluid-pressure means to close the grippers, a pressure-reducing valve past which the fluid flows to said fluid-pressure means, a normally closed by-pass arranged to permit the flow of fluid from said source to said fluid-pressure means independently of said pressure-reducing valve, means responsive to the movement of said controlling member for momentarily opening said by-pass, and means also responsive to the movement of said member for increasing the stress of said spring and for thereby momentarily increasing the pressure of the fluid at said source.

28. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, fluid-pressure means arranged to apply force to said jaw-closing mechanisms in directions transverse to the directions of the pull of the grippers on the upper to close the jaws, said grippers being mounted for positioning movements relatively to the last by the action of said fluid-pressure means on the jaw-closing mechanisms prior to the closing of the jaws, and means optionally movable by the operator after the closing of the jaws to reduce the pressure of the fluid acting on said fluid-pressure means sufficiently to cause the jaws to open while maintaining sufficient pressure still to hold the grippers thus positioned relatively to the last.

29. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, fluid-pressure means arranged to apply force to said jaw-closing mechanisms in directions transverse to the directions of the pull of the grippers on the upper to close the jaws, said grippers being mounted for movements inwardly toward the last to positions determined by their engagement with the lateral periphery of the last by the action of said fluid-pressure means on the jaw-closing mechanisms prior to the closing of the jaws, and means optionally movable by the operator after the closing of the jaws to reduce the pressure of the fluid acting on said fluid-pressure means sufficiently to cause the jaws to open while maintaining sufficient pressure still to hold the grippers against the last.

30. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, fluid-pressure means arranged to apply force to said jaw-closing mechanisms in directions transverse to the directions of the pull of the grippers on the upper to close the jaws, said grippers being mounted for movements inwardly toward the last to positions determined by their engagement with the lateral periphery of the last by the action of said fluid-pressure means on the jaw-closing mechanisms prior to the closing of the jaws, and a pressure-reducing valve optionally movable after the closing of the jaws to reduce the pressure of the fluid acting on said fluid-pressure means sufficiently to cause the jaws to open, said valve including a spring-controlled member movable by pressure of the fluid to release fluid from said fluid-pressure means thus to reduce the pressure but arranged to retain sufficient pressure still to hold the grippers against the last.

31. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing toggles for effecting relative closing movements of their jaws in response to force applied to said toggles in directions transverse to the directions of the pull of the grippers on the upper, fluid-pressure means arranged thus to act on said toggles, said grippers being mounted for movements inwardly toward the last to positions determined by their engagement with the lateral periphery of the last by the action of said fluid-pressure means on the toggles prior to the closing of the jaws, and valve means controlled by the operator for optionally reducing the pressure of the fluid acting on said fluid-pressure means after the closing of the jaws sufficiently to cause the jaws to open while maintaining sufficient pressure still to hold the grippers against the last.

32. In a machine for shaping uppers over lasts, upper-gripping means arranged to grip the margin of an upper on a last and to pull the upper, fluid-pressure means for closing said upper-gripping means on the upper, a source of fluid under pressure, a valve for admitting fluid from said source to said fluid-pressure means, and another valve optionally movable to reduce the pressure of the fluid effective on said fluid-pressure means sufficiently to cause the upper-gripping means to release the upper before applying a pull thereto, said other valve being movable thereafter to restore the pressure of the fluid effective on said fluid-pressure means and thus to cause the upper-gripping means again to grip the upper.

33. In a machine for shaping uppers over lasts, upper-gripping means arranged to grip the margin of an upper on a last and to pull the upper, fluid-pressure means for closing said upper-gripping means on the upper, a source of fluid under pressure, a valve for admitting fluid from said source to said fluid-pressure means, another valve optionally movable by the operator to reduce the pressure of the fluid effective on said fluid-pressure means sufficiently to cause the upper-gripping means to release the upper before applying a pull thereto, and a spring for returning said other valve upon its release by the operator to restore the pressure of the fluid effective on said fluid-pressure means and thus to cause the upper-gripping means again to grip the upper.

34. In a machine for shaping uppers over lasts, upper-gripping means arranged to grip the margin of an upper on a last and to pull the upper, fluid-pressure means for closing said upper-gripping means on the upper, a source of fluid under pressure, a valve for admitting fluid from said source to said fluid-pressure means, another valve optionally movable to reduce the pressure of the fluid effective on said fluid-pressure means sufficiently to cause the upper-gripping means to release the upper before applying a pull thereto, said other valve being movable thereafter to restore the pressure of the fluid effective on said fluid-pressure means and thus to cause the upper-gripping means again to grip the upper, and means for momentarily increasing the pressure of the fluid effective on said fluid-pressure means when the upper is thus gripped the second time.

35. In a machine for shaping uppers over lasts, upper-gripping means arranged to grip the margin of an upper on a last and to pull the upper, fluid-pressure means for closing said upper-gripping means on the upper, a source of fluid under pressure, a valve for admitting fluid from said source to said fluid-pressure means, another valve optionally movable to reduce the pressure of the fluid effective on said fluid-pressure means sufficiently to cause the upper-gripping means to release the upper before applying a pull thereto, said other valve being movable thereafter to restore the pressure of the fluid effective on said fluid-pressure means and thus to cause the upper-gripping means again to grip the upper, a pump for maintaining pressure at said source, a relief valve for limiting said pressure, a spring for controlling said relief valve, and means movable by the operator to increase momentarily the pressure of the fluid at said source by increasing the stress of said spring and thereby to increase the pressure effective on said fluid-pressure means when the upper is thus gripped the second time.

36. In a machine for shaping uppers over lasts, a plurality of grippers having upper-gripping jaws for gripping the margin of an upper on a last and for pulling the upper, fluid-operated devices associated respectively with the different grippers for effecting relative closing movements of their jaws by fluid pressure, a source of fluid under pressure, valve means for admitting fluid from said source to said devices, and additional valve means optionally movable to reduce the pressure of the fluid effective on said devices sufficiently to cause the gripper jaws to release the upper before applying a pull thereto, said additional valve means being movable thereafter to restore the pressure of the fluid effective on said devices and thus to cause the jaws again to grip the upper.

37. In a machine for shaping uppers over lasts, a plurality of grippers having upper-gripping jaws for gripping the margin of an upper on a last and for pulling the upper, fluid-operated devices associated respectively with the different grippers for effecting relative closing movements of their jaws by fluid pressure, a source of fluid under pressure, a valve for admitting fluid from said source to said devices, another valve optionally movable to reduce the pressure of the fluid effective on said devices sufficiently to cause the grippers to release the upper before applying a pull thereto, said other valve being movable thereafter to restore the pressure of the fluid effective on said devices and thus to cause the jaws again to grip the upper, and means for increasing momentarily the pressure of the fluid effective on said devices when the upper is thus gripped the second time.

38. In a machine for shaping uppers over lasts, a plurality of grippers having upper-gripping jaws for gripping the margin of an upper on a last and for pulling the upper, fluid-operated devices associated respectively with the different grippers for effecting relative closing movements of their jaws by fluid pressure, a source of fluid under pressure, a valve for admitting fluid from said source to said devices, another valve optionally movable to reduce the pressure of the fluid effective on said devices sufficiently to cause the grippers to release the upper before applying a pull thereto, said other valve being movable thereafter to restore the pressure of the fluid effective on said devices and thus to cause the jaws again to grip the upper, a pump for maintaining pressure at said source, a relief valve for limiting said pressure, a spring for controlling said relief valve, and means for momentarily increasing the pressure of the fluid at said source by increasing the stress of said spring and for thereby increasing the pressure effective on said devices when the upper is thus gripped the second time.

39. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, means arranged to act by forces applied to said jaw-closing mechanisms to move the grippers inwardly to positions determined by their engagement with the lateral periphery of the last prior to the relative closing movements of the jaws and thereafter to effect such closing movements by an increase in the forces thus applied to said mechanisms, and means arranged to act independently of the last to hold said grippers positively against the increased forces applied to said mechanisms and thereby to prevent any increase in the pressure of the grippers against the last by such increased forces.

40. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, means arranged to act by forces applied to said jaw-closing mechanisms to move the grippers inwardly to positions determined by their engagement with the lateral periphery of the last prior to the relative closing movements of the jaws and thereafter to effect such closing movements by an increase in the forces thus applied to said mechanisms, and means including members arranged automatically to assume positions relatively to the grippers determined by the positions of the grippers when they engage the last for holding the grippers positively against the increased forces applied to said mechanisms and for thereby preventing any increase in the pressure of the grippers against the last by such increased forces.

41. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing toggles arranged to be operated by forces applied thereto in directions transverse to the directions of the pull of the grippers on the upper to effect relative closing movements of their jaws, power-operated means for moving said grippers inwardly to positions determined by their engagement with the lateral periphery of the last by forces thus applied to said toggles prior to the relative closing movements of the jaws and for thereafter effecting such closing movements by an increase in the forces thus applied to the toggles, and means including members arranged automatically to assume positions relatively to the grippers determined by the positions of the grippers when they engage the last for holding the grippers positively against the increased forces thus applied to the toggles and for thereby preventing any increase in the pressure of the grippers against the last by such increased forces.

42. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, means arranged to act by forces applied to said jaw-closing mechanisms to move the grippers inwardly to positions determined by their engagement with the lateral periphery of the last prior to the relative closing movements of the jaws and thereafter to effect such closing movements by an increase in the forces thus applied to said mechanisms, members movably mounted on said grippers, abutment means arranged to position said members relatively to the grippers as determined by the positions of the grippers when they engage the last and thereafter to hold the grippers positively through said members against the increased forces applied to said jaw-closing mechanisms, and devices arranged to lock said members to the grippers against forces applied to the members by the abutment means after they have thus been positioned relatively to the grippers to render said abutment means effective thus to hold the grippers.

43. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing mechanisms for effecting relative closing movements of their jaws, means arranged to act by forces applied to said jaw-closing mechanisms to move the grippers inwardly to positions determined by their engagement with the lateral periphery of the last prior to the relative closing movements of the jaws and thereafter to effect such closing movements by an increase in the forces thus applied to said mechanisms, arms pivotally mounted on the grippers, abutment means arranged to position said arms relatively to the grippers as determined by the positions of the grippers when they engage the last and thereafter to hold the grippers positively through said arms against the increased forces applied to said jaw-closing mechanisms, and wedge members carried by the grippers for locking said arms to the grippers against forces applied to the arms by the abutment means after the arms have thus been positioned relatively to the grippers and for thereby rendering said abutment means effective thus to hold the grippers.

44. In a machine for shaping uppers over lasts, means for positioning a last for the shaping of an upper thereover, a plurality of grippers mounted for movements heightwise of the last to pull the upper in different locations respectively, means for moving said grippers inwardly in directions transverse to the directions of their pull on the upper into engagement with the lateral periphery of the last prior to the insertion of the upper between their jaws, and means for moving said grippers reversely outward away from the lateral periphery of the last as they pull the upper heightwise of the last.

45. In a machine for shaping uppers over lasts, means for positioning a last for the shaping of an upper thereover, a plurality of grippers mounted for movements heightwise of the last to pull the upper in different locations respectively, means for moving said grippers inwardly in directions transverse to the directions of their pull on the upper into engagement with the lateral periphery of the last prior to the insertion of the upper between their jaws, means for moving the grippers heightwise of the last to pull the upper, and guiding means for the grippers arranged to impart thereto outward movements away from the lateral periphery of the last in response to their movements heightwise of the last.

46. In a machine for shaping uppers over lasts, means for positioning a last for the shaping of an upper thereover, a plurality of grippers mounted for movements heightwise of the last to pull the upper in different locations respectively, means for moving said grippers inwardly in directions transverse to the directions of their pull on the upper into engagement with the lateral periphery of the last prior to the insertion of the upper between their jaws, means for moving the grippers heightwise of the last to pull the upper, guiding means for the grippers arranged to impart thereto outward movements away from the lateral periphery of the last in response to their movements heightwise of the last, and members carried by the grippers for engaging said guiding means to render the guiding means thus effective on the grippers, said members being arranged to adjust themselves relatively to the grippers as determined by the positions of the grippers in engagement with the last.

47. In a machine for shaping uppers over lasts, means for positioning a last for the shaping of an upper thereover, a plurality of grippers mounted for movements heightwise of the last to pull the upper in different locations respectively, means for moving said grippers inwardly in directions transverse to the directions of their pull on the upper into engagement with the lateral periphery of the last prior to the insertion of the upper between their jaws, means for moving the grippers heightwise of the last to pull the upper, guiding means for the grippers arranged to impart thereto outward movements away from the lateral periphery of the last in response to their movements heightwise of the last, members carried by the grippers for engaging said guiding means to render the guiding means thus effective on the grippers, said members being arranged to assume relatively to the grippers positions determined by the positions of the grippers in engagement with the last, and means for locking said members in that relation to the grippers.

48. In a machine for shaping uppers over lasts, means for positioning a last for the shaping of an upper thereover, a plurality of grippers mounted for movements heightwise of the last to pull the upper in different locations respectively, means for moving said grippers inwardly in directions transverse to the directions of their pull on the upper into engagement with the lateral periphery of the last prior to the insertion of the upper between their jaws, means for moving the grippers heightwise of the last to pull the upper, guiding means for the grippers arranged to impart thereto outward movements away from the lateral periphery of the last in response to their movements heightwise of the last, arms carried by the grippers, rolls mounted on said arms and arranged to engage said guiding means to render the guiding means thus effective on the grippers, the arms being pivotally mounted to permit them to assume relatively to the grippers positions determined by the positions of the grippers in engagement with the last, and members for locking said arms in that relation to the grippers.

49. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing toggles for effecting relative closing movements of their jaws in response to forces applied to said toggles in directions transverse to the directions of the pull of the grippers on the upper, and members associated respectively with the different grippers for thus operating said toggles, said members being arranged to maintain control of the toggles during the upper-pulling movements of the grippers heightwise of the last and having guiding means along which the toggles are movable in the upper-pulling operation.

50. In a machine for shaping uppers over lasts, means for positioning a last for the shaping of an upper thereover, a plurality of grippers having upper-gripping jaws and mounted for movements heightwise of the last to pull the upper in different locations respectively, said grippers including jaw-closing toggles for effecting relative closing movements of the jaws in response to forces applied to said toggles in directions transverse to the directions of the pull of the grippers on the upper, said toggles having rolls thereon, and pistons associated respectively with the different grippers for operating the toggles by fluid pressure through engagement with said rolls, said pistons being arranged to maintain control of the toggles as the grippers are moved heightwise of the last to pull the upper and having guideways along which said rolls are movable in the upper-pulling operation.

51. In a machine for shaping uppers over lasts, a toe-end gripper having jaws for gripping and pulling an upper heightwise of a last at the end of the toe, said gripper being arranged to serve as an end gage for positioning the last lengthwise by engagement with its toe end when the operator presents it to the machine, a plurality of other grippers having jaws for gripping and pulling the upper heightwise of the last in other locations about the forepart of the last, said other grippers being positioned intially with their jaws farther outward than the lateral periphery of the last, and means for moving said other grippers inwardly into engagement with the lateral periphery of the last prior to the insertion of the upper between their jaws.

52. In a machine for shaping uppers over lasts, a toe-end gripper having jaws for gripping and pulling an upper heightwise of a last at the end of the toe, said gripper being arranged to serve as an end gage for positioning the last lengthwise by engagement with its toe end when the operator presents it to the machine, a plurality of other grippers having jaws for gripping and pulling the upper heightwise of the last in other locations about the forepart of the last, said other grippers being positioned initially with their jaws farther outward than the lateral periphery of the last and being mounted for inward movements into engagement with said periphery prior to the insertion of the upper between their jaws, a controlling member movable by the operator, and power-operated means for thus moving said other grippers inwardly in response to the movement of said controlling member.

53. In a machine for shaping uppers over lasts, a toe-end gripper having jaws for gripping and pulling an upper heightwise of a last at the end of the toe, said gripper being arranged to serve as an end gage for positioning the last lengthwise by engagement with its toe end when the operator presents it to the machine, a plurality of other grippers haivng jaws for gripping and pulling the upper heightwise of the last in other locations about the forepart of the last, said other grippers being positioned initially with their jaws farther outward than the lateral periphery of the last and being mounted for inward movements into engagement with said periphery prior to the insertion of the upper between their jaws, cylinder-and-piston devices associated respectively with said other grippers for thus moving them inwardly by fluid pressure, a controlling member movable by the operator, and means responsive to the movement of said controlling member for admitting operating fluid to said devices thus to move said other grippers.

54. In a machine for shaping uppers over lasts, a toe-end gripper having jaws for gripping and pulling an upper over a last at the end of the toe, said gripper being arranged to serve as an end gage for positioning the last lengthwise by engagement with its toe end when the operator presents it to the machine, a heel rest arranged to engage the upper on the heel end of the last and to press the last lengthwise against said toe-end gripper when the operator thus presents the last, and a heel-rest holder arranged to be moved thereafter relatively to the heel rest into position to hold the heel rest against movement in a direction away from said toe-end gripper.

55. In a machine for shaping uppers over lasts, a toe-end gripper having jaws for gripping and pulling an upper over a last at the end of the toe, said gripper being arranged to serve as an end gage for positioning the last lengthwise by engagement with its toe end when the operator presents it to the machine, a heel rest arranged to engage the upper on the heel end of the last and to be moved yieldingly by the last in a direction away from said toe-end gripper to permit the toe end of the last thus to engage said gripper, and means for locking said heel rest against further movement in that direction after the last has thus been positioned by said gripper.

56. In a machine for shaping uppers over lasts, a toe-end gripper haivng jaws for gripping and pulling an upper over a last at the end of the toe, said gripper being arranged to serve as an end gage for positioning the last lengthwise by engagement with its toe end when the operator presents it to the machine, a heel rest arranged to engage the upper on the heel end of the last and to be moved yieldingly by the last in a direction away from said toe-end gripper to permit the toe end of the last thus to engage said gripper, a heel-rest holder, and means for moving said holder relatively to the heel rest lengthwise of the last into position to hold the heel rest against movement thereafter in a direction away from said toe-end gripper.

57. In a machine for shaping uppers over lasts, a toe-end gripper having jaws for gripping and pulling an upper over a last at the end of the toe, said gripper being arranged to serve as an end gage for positioning the last lengthwise by engagement with its toe end when the operator presents it to the machine, a heel rest arranged to engage the upper on the heel end of the last and to press the last lengthwise against said toe-end gripper when the operator thus presents the last, a heel-rest holder mounted to move relatively to the heel rest into position to hold the heel rest against movement in a direction away from said toe-end gripper, fluid-operated means for thus moving said holder, and additional means for locking the holder against reverse movement.

58. In a machine for shaping uppers over lasts, a toe-end gripper having jaws for gripping and pulling an upper over a last at the end of the toe, said gripper being arranged to serve as an end gage for positioning the last lengthwise by engagement with its toe end when the operator presents it to the machine, a heel rest constructed and arranged to engage the upper on the heel end of the last and also to engage the top of the heel end of the last when the operator thus presents the last, said heel rest being mounted for movements in directions both lengthwise and heightwise of the last to permit it to assume with respect to such movements a position determined by the position of the last, and means for locking the heel rest after it has thus been positioned against movement in a direction away from the toe-end gripper or movement in response to pressure of the top of the heel end of the last thereon.

59. In a machine for shaping uppers over lasts, a toe-end gripper having jaws for gripping and pulling an upper over a last at the end of the toe, said gripper being arranged to serve as an end gage for positioning the last lengthwise by engagement with its toe end when the operator presents it to the machine, a heel rest constructed and arranged to engage the upper on the heel end of the last and also to engage the top of the heel end of the last, said heel rest being mounted for movement yieldingly in a direction away from the toe-end gripper and also for movement in directions heightwise of the last to permit it to assume with respect to such movements a position determined by the position of the last, a heel-rest holder, means for moving said holder relatively to the heel rest lengthwise of the last into position to hold the heel rest thereafter against movement in a direction away from the toe-end gripper, and means arranged to cooperate with said holder to lock the heel rest against movement in a direction heightwise of the last in response to pressure of the top of the heel end of the last thereon.

60. In a machine for shaping uppers over lasts, the combination with upper-shaping means, of means for positioning a last with an upper thereon relatively to said upper-shaping means, a heel rest arranged to engage the upper on the heel end of the last and mounted for movement yieldingly in a direction lengthwise of the last by pressure of the last thereon when the operator presents it to the machine, a heel-rest holder mounted to move relatively to the heel rest lengthwise of the last, and means for thus moving said holder into position to hold the heel rest against any further movement in response to pressure of the last thereon after it has thus been positioned by the last.

61. In a machine for shaping uppers over lasts, the combination with upper-shaping means, of means for positioning a last with an upper thereon both lengthwise and heightwise relatively to said upper-shaping means, a heel rest constructed and arranged to engage the upper on the heel end of the last and also to engage the top of the heel end of the last, said heel rest being mounted for movements in directions both lengthwise and heightwise of the last to permit it to assume with respect to such movements a position determined by the position of the last, and means for locking said heel rest after it has thus been positioned against movement in a direction lengthwise of the last in response to pressure of the last thereon and also against movement in a direction heightwise of the last in response to pressure of the top of the heel end of the last thereon.

62. In a machine for shaping uppers over lasts, the combination with upper-shaping means, of means for positioning a last with an upper thereon both lengthwise and heightwise relatively to said upper-shaping means, a heel rest constructed and arranged to engage the upper on the heel end of the last and also to engage the top of the heel end of the last, said heel rest being mounted for movements in directions both lengthwise and heightwise of the last to permit it to assume with respect to such movements a position determined by the position of the last, a heel-rest holder mounted to move relatively to the heel rest lengthwise of the last into position to hold the heel rest against movement lengthwise of the last in response to pressure of the last thereon, means for thus moving said holder, and means arranged to cooperate with said holder to lock the heel rest against movement in a direction heightwise of the last in response to pressure of the top of the heel end of the last thereon.

63. In a machine for shaping uppers over lasts, a plurality of grippers arranged to grip the margin of an upper on a last and to pull the upper over the last in different locations respectively, and means for optionally maintaining some of said grippers in retracted positions away from the last to prevent them from acting on the upper during the operations of the other grippers on the upper.

64. In a machine for shaping uppers over lasts, a plurality of grippers arranged to grip the margin of an upper on a last and to pull the upper heightwise of the last in different locations respectively, means for moving said grippers inwardly toward the last into engagement with the lateral periphery of the last before they grip the upper, and means for optionally preventing such inward movements of some of said grippers and for thereby preventing them from acting on the upper during the operations of the other grippers on the upper.

65. In a machine for shaping uppers over lasts, a plurality of grippers arranged to grip the margin of an upper on a last and to pull the upper heightwise of the last in different locations respectively, said grippers being positioned initially in outwardly retracted positions away from the lateral periphery of the last, fluid-operated members associated respectively with the different grippers for moving them inwardly by fluid pressure into engagement with the lateral periphery of the last before they grip the upper, and means for optionally locking some of said fluid-operated members against the pressure of the operating fluid thereon and for thereby preventing such inward movements of the corresponding grippers to prevent those grippers from acting on the upper during the operations of the other grippers on the upper.

66. In a machine for shaping uppers over lasts, a plurality of grippers arranged to grip and pull an upper on a last in different locations respectively about the toe-end portion of the last, two pairs of additional grippers arranged similarly to grip and pull the upper respectively at the opposite sides of the forepart beyond the toe grippers, and means for optionally preventing said pairs of additional grippers from operating on the upper during the operations of the toe grippers on the upper.

67. In a machine for shaping uppers over lasts, a plurality of grippers arranged to grip and pull an upper on a last in different locations respectively about the toe-end portion of the last, two pairs of additional grippers arranged similarly to grip and pull the upper respectively at the opposite sides of the forepart beyond the toe grippers, and means for optionally preventing one or both grippers of each of said pairs selectively from operating on the upper during the operations of the toe grippers on the upper.

68. In a machine for shaping uppers over lasts, a plurality of grippers arranged to grip and pull an upper on a last in different locations respectively about the toe-end portion of the last, two pairs of additional grippers arranged similarly to grip and pull the upper respectively at the opposite sides of the forepart beyond the toe grippers, and means for optionally maintaining one or both grippers of each of said pairs selectively in outwardly retracted positions away from the last to prevent them from acting on the upper during the operations of the toe grippers on the upper.

69. In a machine for shaping uppers over lasts, a plurality of grippers arranged to grip and pull an upper respectively at the opposite sides of the toe-end portion of a last, two pairs of additional grippers arranged similarly to grip and pull the upper respectively at the opposite sides of the forepart beyond the toe grippers, all said grippers being positioned initially in outwardly retracted positions away from the lateral periphery of the last, fluid-operated members associated respectively with the different grippers for moving them inwardly by fluid pressure into engagement with the lateral periphery of the last before they grip the upper, and means for optionally locking one or both of the fluid-operated members associated with each of said pairs of grippers against the pressure of the operating fluid thereon and for thereby preventing inward movements of the corresponding grippers to prevent them from acting on the upper during the operations of the toe grippers on the upper.

70. In a machine for shaping uppers over lasts, means for positioning a last for the shaping of an upper thereover, a plurality of grippers having upper-gripping jaws and mounted for movements heightwise of the last to pull the upper in different locations respectively, a controlling member movable by the operator, power-operated means for imparting to said grippers positioning movements relatively to the last and for thereafter effecting relative closing movements of their jaws in response respectively to successive movements of said controlling member, and power-operated means for operating said grippers to pull the upper in response to a third movement of said controlling member.

71. In a machine for shaping uppers over lasts, means for positioning a last for the shaping of an upper thereover, a plurality of grippers having upper-gripping jaws and mounted for movements heightwise of the last to pull the upper in different locations respectively, fluid-operated means for imparting to said grippers positioning movements relatively to the last and for thereafter effecting relative closing movements of their jaws, a controlling member movable by the operator, valve means for admitting operating fluid to said fluid-operated means thus to position the grippers and to effect the relative closing movements of their jaws in response respectively to successive movements of said controlling member, fluid-operated means for operating said grippers to pull the upper, and valve means for admitting fluid to said last-named fluid-operated means in response to a third movement of said controlling member.

72. In a machine for shaping uppers over lasts, means for positioning a last for the shaping of an upper thereover, a plurality of grippers having upper-gripping jaws and mounted for movements heightwise of the last to pull the upper in different locations respectively, said grippers being also mounted for movements in directions transverse to the directions of their pull on the upper from initial positions into engagement with the lateral periphery of the last, fluid-operated means for thus moving said grippers into engagement with the last and for thereafter effecting relative closing movements of their jaws, a controlling member movable by the operator, valve means for admitting operating fluid to said fluid-operated means thus to move the grippers into engagement with the last and to effect relative closing movements of their jaws in response respectively to successive movements of said controlling member, fluid-operated means for operating said grippers to pull the upper, and valve means for admitting fluid to said last-named fluid-operated means in response to a third movement of said controlling member.

73. In a machine for shaping uppers over lasts, means for positioning a last for the shaping of an upper thereover, a plurality of grippers having upper-gripping jaws and mounted for movements heightwise of the last to pull the upper in different locations respectively, fluid-operated means for imparting to said grippers positioning movements relatively to the last and for thereafter effecting relative closing movements of their jaws, additional fluid-operated means for operating said grippers to pull the upper, valves for admitting operating fluid to said different fluid-operated means, cams rotatable to control said valves, a controlling member movable by the operator, and power-operated means for rotating said cams in three successive stages in response to three successive movements of said controlling member to cause respectively the positioning movements of the grippers, the relative closing movements of their jaws and their upper-pulling movements.

74. In a machine for shaping uppers over lasts, means for positioning a last for the shaping of an upper thereover, a plurality of grippers for gripping the marginal portion of the upper and for pulling the upper, fluid-operated means for closing said grippers on the upper, additional fluid-operated means for moving the grippers to pull the upper, valves for admitting operating fluid respectively to said different fluid-operated means, cams rotatable in unison to control said valves, a controlling member movable by the operator, and means for rotating said cams in successive stages in response to successive movements of said controlling member to cause the closing of the grippers in response to their rotation in one stage and the upper-pulling movements of the grippers in response to their rotation in the next stage.

75. In a machine for shaping uppers over lasts, means for positioning a last for the shaping of an upper thereover, a plurality of grippers for gripping the marginal portion of the upper and for pulling the upper, fluid-operated means for closing said grippers on the upper, additional fluid-operated means for moving the grippers to pull the upper, valves for admitting operating fluid respectively to said different fluid-operated means, cams rotatable in unison to control said valves, a controlling member movable by the operator, and fluid-operated means for thus rotating said cams to cause the closing of the grippers in response to one movement of said controlling member and the upper-pulling movements of the grippers in response to another movement of said controlling member.

76. In a machine for shaping uppers over lasts, means for positioning a last for the shaping of an upper thereover, a plurality of grippers for gripping the marginal portion of the upper and for pulling the upper, fluid-operated means for closing said grippers on the upper, additional fluid-operated means for moving the grippers to pull the upper, valves for admitting operating fluid respectively to said different fluid-operated means, cams rotatable in unison to control said valves, a cylinder-and-piston device for thus rotating said cams intermittently by fluid pressure to cause the closing of the grippers in response to one operation of the device and the upper-pulling movements of the grippers in response to the next operation of the device, and a valve movable by the operator for repeatedly admitting operating fluid to said device to cause the device thus to operate successively.

77. In a machine for shaping uppers over lasts, a gripper arranged to grip the margin of an upper on a last and to pull the upper, a fluid-operated member arranged to be subjected to the pressure of operating fluid for operating said gripper thus to pull the upper, a retarding device including a member subject to the pressure of fluid in said device and arranged to act in opposition to said first-named member to retard the upper-pulling movement of the gripper, and a valve unaffected by the pressure of the fluid in said device and movable in automatically determined time relation to the upper-pulling movement of the gripper to release fluid from said device and thereby to decrease the resistance of said retarding member to that movement of the gripper.

78. In a machine for shaping uppers over lasts, a gripper arranged to grip the margin of an upper on a last and to pull the upper, fluid-operated means for operating said gripper thus to pull the upper, means for admitting operating fluid to said fluid-operated means, a retarding device including a member subject to the pressure of fluid in said device and arranged to retard the upper-pulling movement of the gripper, and a fluid-operated valve movable in response to the admission of fluid to said fluid-operated means to release fluid from said device and thereby to decrease the resistance of said retarding member to the movement of the gripper.

79. In a machine for shaping uppers over lasts, a gripper arranged to grip the margin of an upper on a last and to pull the upper, fluid-operated means for operating said gripper thus to pull the upper, a source of supply of operating fluid. means for admitting fluid from said source to said fluid-operated means, a retarding device including a member subject to the pressure of fluid in said device and arranged to retard the upper-pulling movement of the gripper, said device being initially in communication with said source, and means for interrupting the communication between said device and said source and for opening an outlet for the fluid from said device in automatically determined time relation to the upper-pulling movement of the gripper to decrease the resistance of said retarding member to that movement of the gripper.

80. In a machine for shaping uppers over lasts, a gripper arranged to grip the margin of an upper on a last and to pull the upper, fluid-operated means for operating said gripper thus to pull the upper, a source of supply of operating fluid, means for admitting fluid from said source to said fluid-operated means, a retarding device including a member subject to the pressure of fluid in said device and arranged to retard the upper-pulling movement of the gripper, said device being initially in communication with said source, and a fluid-operated valve movable in response to the admission of fluid to said fluid-operated means for interrupting the communication between said device and said source and for opening an outlet for the fluid from said device to decrease the resistance of said retarding member to the upper-pulling movement of the gripper.

81. In a machine for shaping uppers over lasts, a gripper arranged to grip the margin of an upper on a last and to pull the upper, a cylinder having a piston therein for operating said gripper by fluid pressure, another cylinder having therein a piston subject to fluid pressure and of smaller diameter than said first-named piston for retarding the upper-pulling movement of the gripper, and a valve unaffected by the pressure of the fluid in said other cylinder and movable substantially at the beginning of the upper-pulling movement of the gripper to open an outlet from said other cylinder and thereby to decrease the resistance of the piston therein to that movement of the gripper.

82. In a machine for shaping uppers over lasts, a plurality of grippers arranged to grip the margin of an upper on a last and to pull the upper in different locations respectively, a plurality of cylinders having pistons therein for operating said grippers by fluid pressure, a plurality of other cylinders having therein pistons subject to fluid pressure for retarding the upper-pulling movements of the grippers, said other cylinders being in communication with one another, and a valve unaffected by the pressure of the fluid in said other cylinders and movable automatically to release fluid therefrom substantially at the beginning of the upper-pulling operation and thereby to decrease the resistance to the upper-pulling movements of the grippers.

83. In a machine for shaping uppers over lasts, a plurality of grippers arranged to grip the margin of an upper on a last and to pull the upper in different locations respectively, a plurality of cylinders having pistons therein for operating said grippers by fluid pressure thus to pull the upper, a source of supply of operating fluid, means for admitting fluid from said source to said cylinders, a plurality of other cylinders having therein pistons subject to fluid pressure for retarding the upper-pulling movements of the grippers, said other cylinders being in communication with one another and also initially in communication with said source, and a valve movable in automatically determined time relation to the upper-pulling movements of the grippers for interrupting communication between said other cylinders and said source and for opening an outlet for the fluid from said other cylinders to decrease the resistance of the pistons therein to the movements of the grippers.

84. In a machine for shaping uppers over lasts, a plurality of grippers arranged to grip the margin of an upper on a last and to pull the upper in different locations respectively around the toe end of the last, said grippers including a gripper at the end of the toe and a plurality of grippers at each of the opposite sides of the toe, and a member mounted for movement about an axis extending heightwise of the last to shift all said grippers simultaneously in the same peripheral direction around the toe end of the last, said member being provided with a plurality of fingers extending radially of said axis thus to act on the different grippers.

85. In a machine for shaping uppers over lasts, a plurality of grippers arranged to grip the margin of an upper on a last and to pull the upper in different locations respectively around the toe end of the last, said grippers including a gripper at the end of the toe and a plurality of grippers at each of the opposite sides of the toe, means movable by the operator to shift all said grippers simultaneously in the same peripheral direction around the toe end of the last while they are holding the upper, additional grippers arranged to grip and pull the upper respectively at the opposite sides of the forepart beyond said first-named grippers, and means enabling the operator to shift said additional grippers lengthwise of the last independently of said first-named grippers.

86. In a machine for shaping uppers over lasts, a plurality of grippers arranged to grip the margin of an upper on a last and to pull the upper in different locations respectively around the toe end of the last, said grippers including a gripper at the end of the toe and a plurality of grippers at each of the opposite sides of the toe, means movable by the operator to shift all said grippers simultaneously in the same peripheral direction around the toe end of the last while they are holding the upper, two pairs of additional grippers arranged to grip and pull the upper respectively at the opposite sides of the forepart beyond said first-named grippers, and members associated respectively with said pairs of grippers for shifting each pair lengthwise of the last independently of the other pair and independently of said first-named grippers.

87. In a machine for shaping uppers over lasts, a plurality of grippers arranged to grip the margin of an upper on a last and to pull the upper in different locations respectively around the toe end of the last, said grippers including a gripper at the end of the toe and a plurality of grippers at each of the opposite sides of the toe, means movable by the operator to shift all said grippers simultaneously in the same peripheral direction around the toe end of the last while they are holding the upper after the pull to adjust the upper relatively to the last, and means for relieving the force of the pull of said grippers on the upper to facilitate such adjustment of the upper.

88. In a machine for shaping uppers over lasts, a plurality of grippers arranged to grip the margin of an upper on a last and to pull the upper in different locations respectively around the toe end of the last, said grippers including a gripper at the end of the toe and a plurality of grippers at each of the opposite sides of the toe, means movable to shift all said grippers simultaneously in the same peripheral direction around the toe end of the last while they are holding the upper after the pull to adjust the upper relatively to the last, additional grippers arranged to grip and pull the upper respectively at the opposite sides of the forepart beyond said first-named grippers, means for shifting said additional grippers lengthwise of the last independently of said first-named grippers while they are holding the upper after the pull, and means for relieving the force of the pull of all said grippers on the upper simultaneously to facilitate such shifting of the grippers.

89. In a machine for shaping uppers over lasts, a plurality of grippers arranged to grip the margin of an upper on a last and to pull the upper in different locations respectively around the toe end of the last including locations at the end and sides of the toe, fluid-pressure means for operating said grippers thus to pull the upper, means for shifting said grippers simultaneously in the same peripheral direction around the toe end of the last while they are holding the upper after the pull to adjust the upper relatively to the last, and means for reducing the pressure of the fluid effective on said fluid-pressure means to relieve the force of the pull of the grippers on the upper and thus to facilitate such adjustment of the upper.

90. In a machine for shaping uppers over lasts, upper-gripping means arranged to grip the margin of an upper on a last and to pull the upper, fluid-pressure means for operating said upper-gripping means thus to pull the upper, a valve for admitting operating fluid to said fluid-pressure means, means for moving said upper-gripping means to adjust the upper relatively to the last while holding the upper after the pull thereon, and another valve movable to open a passage for escape of fluid from said fluid-pressure means to relieve the force of the pull on the upper and thus to facilitate such adjustment of the upper.

91. In a machine for shaping uppers over lasts, upper-gripping means arranged to grip the margin of an upper on a last and to pull the upper, fluid-pressure means for operating said upper-gripping means thus to pull the upper, means for moving said upper-gripping means to adjust the upper relatively to the last while holding the upper after the pull thereon, a valve movable to open a restricted passage for escape of fluid from said fluid-pressure means to relieve the force of the pull on the upper and thus to facilitate such adjustment of the upper, and a fluid-operated member movable at the will of the operator thus to move said valve.

92. In a machine for shaping uppers over lasts, upper-gripping means arranged to grip the margin of an upper on a last and to pull the upper, fluid-pressure means for operating said upper-gripping means thus to pull the upper, means for moving said upper-gripping means to adjust the upper relatively to the last while holding the upper after the pull thereon, a valve movable to open a restricted passage for escape of fluid from said fluid-pressure means to relieve the force of the pull on the upper and thus to facilitate such adjustment of the upper, a cylinder having a piston therein for thus moving said valve, another valve movable by the operator to admit fluid to said cylinder, and means for positively limiting the movement of said piston.

93. In a machine for shaping uppers over lasts, upper-gripping means arranged to grip the margin of an upper on a last and to pull the upper, fluid-pressure means for operating said upper-gripping means thus to pull the upper, a source of fluid under pressure, a valve for admitting fluid from said source to said fluid-pressure means, means for moving said upper-gripping means to adjust the upper relatively to the last while holding the upper after the pull thereon, and another valve movable to interrupt communication between said source and said fluid-pressure means and to open a passage for escape of fluid from said fluid-pressure means to relieve the force of the pull on the upper prior to the adjustment of the upper.

94. In a machine for shaping uppers over lasts, upper-gripping means arranged to grip the margin of an upper on a last and to pull the upper, fluid-pressure means for operating said upper-gripping means thus to pull the upper, a source of fluid under pressure, a valve for admitting fluid from said source to said fluid-pressure means, means for moving said upper-gripping means to adjust the upper relatively to the last while holding the upper after the pull thereon, another valve movable to interrupt communication between said source and said fluid-pressure means and to open a passage for escape of fluid from said fluid-pressure means to relieve the force of the pull on the upper prior to the adjustment of the upper, and means for returning said other valve into position to close said passage and to restore communication between said source and said fluid-pressure means after the adjustment of the upper.

95. In a machine for shaping uppers over lasts, upper-gripping means arranged to grip the margin of an upper on a last and to pull the upper, fluid-pressure means for operating said upper-gripping means thus to pull the upper, a source of fluid under pressure, a valve for admitting fluid from said source to said fluid-pressure means, means for moving said upper-gripping means to adjust the upper relatively to the last while holding the upper after the pull thereon, another valve movable to interrupt communication between said source and said fluid-pressure means and to open a restricted passage for escape of fluid from said fluid-pressure means to relieve the force of the pull on the upper prior to the adjustment of the upper, said other valve being movable to close said passage and to restore communication between said source and said fluid-pressure means after the adjustment of the upper, and means for momentarily increasing the pressure of the fluid at said source and for thereby increasing the pressure effective on said fluid-pressure means when communication between said source and said fluid-pressure means is thus restored.

96. In a machine for shaping uppers over lasts, upper-gripping means arranged to grip the margin of an upper on a last and to pull the upper, fluid-pressure means for operating said upper-gripping means thus to pull the upper, a source of fluid under pressure, means for admitting fluid from said source to said fluid-pressure means, means for moving said upper-gripping means to adjust the upper relatively to the last while holding the upper after the pull thereon, means for reducing the pressure of the fluid effective on said fluid-pressure means prior to such adjustment of the upper and for thereafter restoring such pressure, and means for momentarily increasing the pressure of the fluid at said source and for thereby increasing the pressure effective on said fluid-pressure means when the pressure is thus restored.

97. In a machine for shaping uppers over lasts, upper-gripping means arranged to grip the margin of an upper on a last and to pull the upper, fluid-pressure means for operating said upper-gripping means thus to pull the upper, a source of fluid under pressure, means for admitting fluid from said source to said fluid-pressure means, means for moving said upper-gripping means to adjust the upper relatively to the last while holding the upper after the pull thereon, a valve movable to interrupt communication between said source and said fluid-pressure means and to open a restricted passage for escape of fluid from said fluid-pressure means to relieve the force of the pull on the upper prior to the adjustment of the upper, said valve being movable to close said passage and to restore communication between said source and said fluid-pressure means after the adjustment of the upper, and means movable by the operator for momentarily increasing the pressure of the fluid at said source and for thereby increasing the pressure effective on said fluid-pressure means when communication between said source and said fluid-pressure means is thus restored.

98. In a machine for shaping uppers over lasts, upper-gripping means arranged to grip the margin of an upper on a last and to pull the upper, fluid-pressure means for operating said upper-gripping means thus to pull the upper, a source of fluid under pressure, means for admitting fluid from said source to said fluid-pressure means, means for moving said upper-gripping means to adjust the upper relatively to the last while holding the upper after the pull thereon, a valve movable to interrupt communication between said source and said fluid-pressure means and to open a restricted passage for escape of fluid from said fluid-pressure means to relieve the force of the pull on the upper prior to the adjustment of the upper, said valve being movable to close said passage and to restore communication between said source and said fluid-pressure means after the adjustment of the upper, a pump for maintaining pressure at said source, a relief valve for limiting said pressure, a spring for controlling said relief valve, and means for momentarily increasing the pressure of the fluid at said source by control of said spring and for thereby increasing the pressure effective on said fluid-pressure means when communication between said source and said fluid-pressure means is thus restored.

99. In a machine for shaping uppers over lasts, a plurality of grippers arranged to grip the margin of an upper on a last and to pull the upper in different locations respectively about the forepart of the last, pistons associated respectively with the different grippers for operating them by fluid pressure to pull the upper, cylinders in which said pistons are mounted, valve means for admitting operating fluid to said cylinders, means for moving said grippers to adjust the upper relatively to the last while holding the upper after the pull thereon, and other valve means movable at the will of the operator to release a portion of the fluid in said cylinders and thereby to relieve the force of the pull of the grippers on the upper to facilitate such adjustment of the upper.

100. In a machine for shaping uppers over lasts, a plurality of grippers arranged to grip the margin of an upper on a last and to pull the upper in different locations respectively about the forepart of the last, pistons associated respectively with the different grippers for operating them by fluid pressure to pull the upper, cylinders in which said pistons are mounted, a source of fluid under pressure, valve means for admitting fluid from said source to said cylinders, means for moving the grippers to adjust the upper relatively to the last while holding the upper after the pull thereon, and other valve means movable at the will of the operator to interrupt communication between said source and the cylinders and to release a portion of the fluid in the cylinders to relieve the force of the pull of the grippers on the upper and thus to facilitate such adjustment of the upper.

101. In a machine for shaping uppers over lasts, a plurality of grippers arranged to grip the margin of an upper on a last and to pull the upper in different locations respectively about the forepart of the last, pistons associated respectively with the different grippers for operating them by fluid pressure to pull the upper, cylinders in which said pistons are mounted, a source of fluid under pressure, valve means for admitting fluid from said source to said cylinders, means for moving said grippers to adjust the upper relatively to the last while holding the upper after the pull thereon, other valve means movable at the will of the operator to interrupt communication between said source and the cylinders and to release a portion of the fluid in the cylinders to relieve the force of the pull of the grippers on the upper prior to such adjustment of the upper, said other valve means being movable thereafter to restore communication between said source and the cylinders, and means for momentarily increasing the pressure of the fluid at said source and for thereby increasing the pressure in said cylinders when communication between said source and the cylinders is thus restored.

102. In a machine for shaping uppers over lasts, fluid-pressure means for conforming an upper to a last, a source of fluid under pressure, means for admitting fluid from said source to said fluid-pressure means, a pump for maintaining pressure at said source, a pressure-controlling valve for determining a normal maximum pressure at said source, a member movable by the operator to increase said pressure by control of said valve, and means for automatically restoring the pressure to normal in response to release of said member by the operator.

103. In a machine for shaping uppers over lasts, fluid-pressure means for conforming an upper to a last, a source of fluid under pressure, means for admitting fluid from said source to said fluid-pressure means, a pump for maintaining pressure at said source, a pressure-controlling valve for limiting said pressure, a spring under predetermined stress for controlling said valve and for thereby determining a normal maximum pressure at said source, and a member movable by the operator to increase the stress of said spring and thereby to increase said pressure, said spring being arranged to resume its normal stress in response to release of said member by the operator.

104. In a machine for shaping uppers over lasts, fluid-pressure means for conforming an upper to a last, a source of fluid under pressure, means for admitting fluid from said source to said fluid-pressure means, a pump for maintaining pressure at said source, a relief valve for determining a normal maximum pressure at said source by permitting escape of fluid delivered by the pump, a member movable by the operator to increase said pressure by control of said relief valve, and means for automatically restoring the pressure to normal in response to release of said member by the operator.

105. In a machine for shaping uppers over lasts, fluid-pressure means for conforming an upper to a last, a source of fluid under pressure, means for admitting fluid from said source to said fluid-pressure means, a pump for maintaining pressure at said source, a relief valve movable by the pressure of the fluid to permit escape of fluid delivered by the pump and thereby to limit said pressure, a spring under predetermined stress for controlling said relief valve and for thereby determining a normal maximum pressure at said source, and a member movable by the operator to increase the stress of said spring and thereby to increase said pressure, said spring being arranged to resume its normal stress in response to release of said member by the operator.

106. In a machine for shaping uppers over lasts, a plurality of grippers arranged to grip the marginal portion of an upper on a last and to pull the upper heightwise of the last in different locations respectively about the forepart of the last, means for operating said grippers thus to pull the upper, a plurality of stop members associated respectively with different grippers for limiting their upper-pulling movements, said stop members having cam faces thereon and being movable to vary through the action of said cam faces the positions of the grippers heightwise of the last while they are holding the upper after the pull, and means controlled by the operator for thus moving said stop members.

107. In a machine for shaping uppers over lasts, a plurality of grippers arranged to grip the marginal portion of an upper on a last and to pull the upper heightwise of the last in different locations respectively about the forepart of the last, means for operating said grippers thus to pull the upper, a plurality of stop members associated respectively with different grippers for limiting their upper-pulling movements, said stop members having cam faces thereon and being mounted for rotary movements to vary through the action of said cam faces the positions of the grippers heightwise of the last while they are holding the upper after the pull, and means movable by the operator and connected to said stop members for thus rotating them.

108. In a machine for shaping uppers over lasts, a plurality of grippers arranged to grip the marginal portion of an upper on a last and to pull the upper heightwise of the last in different locations respectively about the forepart of the last, means for operating said grippers thus to pull the upper, a plurality of stop members associated respectively with different grippers for limiting their upper-pulling movements, said stop members having cam faces thereon and being movable to vary through the action of said cam faces the positions of the grippers heightwise of the last while they are holding the upper after the pull, and controlling members movable by the operator and connected respectively to different stop members for thus moving them independently of one another.

109. In a machine for shaping uppers over lasts, grippers arranged to grip the marginal portion of an upper on a last and to pull the upper heightwise of the last at the end of the toe and the opposite sides of the forepart respectively, means for operating said grippers thus to pull the upper, stop members associated respectively with the grippers at the end of the toe and the sides of the forepart for limiting their upper-pulling movements, said stop members being mounted for movements to vary the positions of the grippers heightwise of the last while they are holding the upper after the pull, and means controlled by the operator for thus moving selectively the stop members associated respectively with the grippers at the end of the toe and the sides of the forepart.

110. In a machine for shaping uppers over lasts, grippers arranged to grip the marginal portion of an upper on a last and to pull the upper heightwise of the last at the end of the toe and the opposite sides of the forepart respectively, means for operating said grippers thus to pull the upper, stop members associated respectively with the grippers at the end of the toe and the sides of the forepart for limiting their upper-pulling movements, said stop members having cam faces thereon and being movable to vary through the action of said cam faces the positions of the grippers heightwise of the last while they are holding the upper after the pull, and controlling members movable by the operator and connected respectively to the stop members associated with the grippers at the end of the toe and the sides of the forepart for thus moving said stop members.

111. In a machine for shaping uppers over lasts, grippers arranged to grip the marginal portion of an upper on a last and to pull the upper heightwise of the last at the opposite sides of the forepart respectively, means for operating said grippers thus to pull the upper, stop members associated respectively with said different grippers for limiting their upper-pulling movements, said stop members being movable to vary the positions of the grippers heightwise of the last while they are holding the upper after the pull, and hand levers movable by the operator independently of each other and connected respectively to said different stop members for thus moving them.

112. In a machine for shaping uppers over lasts, grippers arranged to grip the marginal portion of an upper on a last and to pull the upper heightwise of the last at the opposite sides of the forepart respectively, means for operating said grippers thus to pull the upper, stop members associated respectively with said different grippers for limiting their upper-pulling movements, said stop members having cam faces thereon and being mounted for rotary movements to vary through the action of said cam faces the positions of the grippers heightwise of the last while they are holding the upper after the pull, and controlling members movable independently of each other and connected respectively to said different stop members for thus turning them.

113. In a machine for shaping uppers over lasts, a plurality of grippers arranged to grip the marginal portion of an upper on a last and to pull the upper heightwise of the last in different locations respectively about the forepart of the last, means for operating said grippers thus to pull the upper, a plurality of stop members associated respectively with different grippers for limiting their upper-pulling movements, said stop members being movable to vary the positions of the grippers heightwise of the last while they are holding the upper after the pull, means controlled by the operator for thus moving said stop members, and means for automatically returning said stop members to predetermined positions after release of the upper by the grippers.

114. In a machine for shaping uppers over lasts, a plurality of grippers arranged to grip the marginal portion of an upper on a last and to pull the upper heightwise of the last in different locations respectively about the forepart of the last, means for operating said grippers thus to pull the upper, a plurality of stop members associated respectively with different grippers for limiting their upper-pulling movements, said stop members being movable to vary the positions of the grippers heightwise of the last while they are holding the upper after the pull, means controlled by the operator for thus moving said stop members, spring means arranged yieldingly to oppose such movements of the stop members and to return them to predetermined positions after release of the upper by the grippers, and means for temporarily holding said members in the positions to which they are moved against the resistance of said spring means.

115. In a machine for shaping uppers over lasts, a plurality of grippers arranged to grip the marginal portion of an upper on a last and to pull the upper heightwise of the last in different locations respectively about the forepart of the last, means for operating said grippers thus to pull the upper, a plurality of stop members associated respectively with different grippers for limiting their upper-pulling movements, said stop members having cam faces thereon and being mounted for rotary movements to vary through said cam faces the positions of the grippers heightwise of the last while they are holding the upper after the pull, means movable by the operator and connected to said stop members for thus rotating them, and spring means arranged yieldingly to oppose such movements of the stop members and to return them to predetermined positions after release of the upper by the grippers.

116. In a machine for shaping uppers over lasts, a plurality of grippers arranged to grip the marginal portion of an upper on a last and to pull the upper heightwise of the last in different locations respectively about the forepart of the last, fluid-operated members for operating said grippers thus to pull the upper, a plurality of stop members associated respectively with said different fluid-operated members for limiting their movements and for thereby limiting the upper-pulling movements of the grippers, said stop members being mounted for movements to vary the positions of the grippers heightwise of the last while they are holding the upper after the pull, and means controlled by the operator for thus moving said stop members.

117. In a machine for shaping uppers over lasts, a plurality of grippers arranged to grip the marginal portion of an upper on a last and to pull the upper heightwise of the last in different locations respectively about the forepart of the last, fluid-operated members for operating said grippers thus to pull the upper, a plurality of stop members associated respectively with said different fluid-operated members for limiting their movements and for thereby limiting the upper-pulling movements of the grippers, said stop members having cam faces thereon and being mounted for rotary movements to vary through the action of said cam faces the positions of the grippers heightwise of the last while they are holding the upper after the pull, and means movable by the operator for thus rotating said stop members.

118. In a machine for shaping uppers over lasts, a plurality of grippers arranged to grip the marginal portion of an upper on a last and to pull the upper heightwise of the last, fluid-operated members for operating said grippers by fluid pressure thus to pull the upper, a plurality of stop members associated respectively with different grippers for limiting their upper-pulling movements, said stop members being mounted for movements to vary the positions of the grippers heightwise of the last while they are holding the upper after the pull, means for thus moving said stop members, and means for reducing the pressure of the fluid effective on said fluid-operated members and for thereby relieving the force of the pull of the grippers on the upper prior to such movements of the stop members.

119. In a machine for shaping uppers over lasts, a plurality of grippers arranged to grip the marginal portion of an upper on a last and to pull the upper heightwise of the last, fluid-pressure means for operating said grippers thus to pull the upper, a source of fluid under pressure, means for admitting fluid from said source to said fluid-pressure means, a plurality of stop members associated respectively with different grippers for limiting their upper-pulling movements, said stop members being mounted for movements to vary the positions of the grippers heightwise of the last while they are holding the upper after the pull, means for thus moving said stop members, means for reducing the pressure of the fluid effective on said fluid-pressure means and for thereby relieving the force of the pull of the grippers on the upper prior to such movements of the stop members, said last-named means being movable to restore the pressure after the movements of the stop members, and means for momentarily increasing the pressure of the fluid at said source and for thereby increasing the pressure effective on said fluid-pressure means when the pressure is thus restored.

120. In a machine for shaping uppers over lasts, a gripper arranged to grip the margin of an upper on a last and to pull the upper heightwise of the last, means for operating said gripper thus to pull the upper, means for limiting the upper-pulling movement of the gripper, means for causing the gripper to release the upper after the pull, and additional means arranged automatically to move the gripper farther in the direction of the pull after its release of the upper.

121. In a machine for shaping uppers over lasts, a gripper arranged to grip the margin of an upper on a last and to pull the upper heightwise of the last, fluid-operated means for operating said gripper by fluid pressure thus to pull the upper, means for causing the gripper to release the upper after the pull, additional fluid-operated means arranged to move the gripper farther in the direction of the pull after its release of the upper, and means for applying fluid pressure to said additional fluid-operated means substantially at the time when the gripper releases the upper.

122. In a machine for shaping uppers over lasts, a gripper arranged to grip the margin of an upper on a last and to pull the upper heightwise of the last, fluid-operated means for operating said gripper by fluid pressure thus to pull the upper, means for causing the gripper to release the upper after the pull, a fluid-operated piston arranged to move the gripper farther in the direction of the pull after its release of the upper, a cylinder in which said piston is mounted, a valve for admitting operating fluid to said cylinder, and means for operating said valve thus to admit the fluid substantially at the time when the gripper releases the upper.

123. In a machine for shaping uppers over lasts, a gripper arranged to grip the margin of an upper on a last and to pull the upper heightwise of the last, a fluid-operated member for operating said gripper by fluid pressure thus to pull the upper, means for limiting the movement of said fluid-operated member and for thereby limiting the upper-pulling movement of the gripper, means for causing the gripper to release the upper after the pull, and another fluid-operated member arranged to move the gripper farther in the direction of the pull independently of said first-named member after its release of the upper.

124. In a machine for shaping uppers over lasts, a plurality of grippers arranged to grip the margin of an upper on a last and to pull the upper heightwise of the last in different locations respectively about the forepart of the last, members associated respectively with the different grippers and movable to operate them thus to pull the upper, means for limiting the movements of said members and for thereby limiting the upper-pulling movements of the grippers, means for causing the grippers to release the upper after the pull, and additional means arranged automatically to move the grippers farther in the direction of the pull independently of said members after their release of the upper.

125. In a machine for shaping uppers over lasts, a plurality of grippers arranged to grip the margin of an upper on a last and to pull the upper heightwise of the last in different locations respectively about the forepart of the last, members associated respectively with the different grippers and movable to operate them thus to pull the upper, means for limiting the movements of said members and for thereby limiting the upper-pulling movements of the grippers, means for causing the grippers to release the upper after the pull, and another member common to the several grippers and arranged automatically to move them farther in the direction of the pull independently of said first-named members after their release of the upper.

126. In a machine for shaping uppers over lasts, a plurality of grippers arranged to grip the margin of an upper on a last and to pull the upper heightwise of the last in different locations respectively, fluid-operated pistons associated respectively with the different grippers for operating them by fluid pressure thus to pull the upper, means for limiting the movements of said pistons and for thereby limiting the upper-pulling movements of the grippers, means for causing the grippers to release the upper after the pull, and another fluid-operated piston common to the several grippers and arranged to move them farther in the direction of the pull after their release of the upper.

127. In a machine for shaping uppers over lasts, a plurality of grippers arranged to grip the margin of an upper on a last and to pull the upper heightwise of the last in different locations respectively, fluid-operated members associated respectively with the different grippers for operating them by fluid pressure thus to pull the upper, means for limiting the movements of said members and for thereby limiting the upper-pulling movements of the grippers, means for causing the grippers to release the upper after the pull, and fluid-operated means for moving the grippers farther in the direction of the pull independently of said members after their release of the upper.

128. In a machine for shaping uppers over lasts, a plurality of grippers arranged to grip the margin of an upper on a last and to pull the upper heightwise of the last in different locations respectively, fluid-operated members associated respectively with the different grippers for operating them by fluid pressure thus to pull the upper, means for limiting the movements of said members and for thereby limiting the upper-pulling movements of the grippers, levers arranged to transmit movements from said members to the grippers, said levers being further movable independently of said members, means for causing the grippers to release the upper after the pull, and additional fluid-operated means arranged thus further to move said levers and thereby to move the grippers farther in the direction of the pull after their release of the upper.

129. In a machine for shaping uppers over lasts, a plurality of grippers arranged to grip the margin of an upper on a last and to pull the upper heightwise of the last in different locations respectively, fluid-operated pistons associated respectively with the different grippers for operating them by fluid pressure thus to pull the upper, means for limiting the movements of said pistons and for thereby limiting the upper-pulling movements of the grippers, levers arranged to transmit movements from the pistons to the grippers, said levers being further movable independently of the pistons, means for causing the grippers to release the upper after the pull, and another piston common to the several grippers and arranged thus further to move said levers by fluid pressure and thereby to move the grippers farther in the direction of the pull after their release of the upper.

130. In a machine for shaping uppers over lasts, means for positioning a last for the shaping of an upper thereover, a plurality of grippers for gripping the marginal portion of the upper and for pulling the upper, a controlling member movable by the operator, fluid-operated means for operating said grippers thus to pull the upper in response to movement of said controlling member, wipers for wiping the marginal portion of the upper inwardly over the bottom of the last after the pulling of the upper, a clutch through which said wipers are operated, and another controlling member movable by the operator to actuate said clutch.

131. In a machine for shaping uppers over lasts, means for positioning a last for the shaping of an upper thereover, a plurality of grippers for gripping the marginal portion of the upper and for pulling the upper, a controlling member movable by the operator, fluid-operated means for operating said grippers thus to pull the upper in response to movement of said controlling member, wipers for wiping the marginal portion of the upper inwardly over the bottom of the last after the pulling of the upper, cam means for operating said wipers, a clutch through which said cam means is operated, and another controlling member movable by the operator to actuate said clutch.

132. In a machine for shaping uppers over lasts, means for positioning a last for the shaping of an upper thereover, a plurality of grippers for gripping the marginal portion of the upper and for pulling the upper, fluid-pressure means for operating said grippers thus to pull the upper, a treadle, valve means for admitting operating fluid to said fluid-pressure means in response to movement of said treadle, wipers for wiping the marginal portion of the upper inwardly over the bottom of the last after the pulling of the upper, a clutch through which said wipers are operated, and another treadle for actuating said clutch.

133. In a machine for shaping uppers over lasts, means for positioning a last for the shaping of an upper thereover, a plurality of grippers for gripping the marginal portion of the upper and for pulling the upper, fluid-pressure means for operating said grippers thus to pull the upper, valve means for admitting operating fluid to said fluid-pressure means, a controlling member movable by the operator, cam means rotatable to render said valve means operative thus to admit the fluid in response to movement of said controlling member, wipers for wiping the marginal portion of the upper inwardly over the bottom of the last after the pulling of the upper, a clutch through which said wipers are operated, another controlling member movable by the operator to actuate said clutch, and means also operated through said clutch for further rotating said cam means.

134. In a machine for shaping uppers over lasts, means for positioning a last for the shaping of an upper thereover, a plurality of grippers for gripping the marginal portion of the upper and for pulling the upper, fluid-operated means for closing said grippers on the upper, additional fluid-operated means for moving the grippers to pull the upper, valves for admitting operating fluid respectively to said different fluid-operated means, cams rotatable in unison to operate said valves, means for turning said cams through a partial revolution to cause the grippers thus to close and to pull the upper, wipers for thereafter wiping the marginal portion of the upper inwardly over the bottom of the last, a clutch through which said wipers are operated, and means also operated through said clutch for completing the revolution of said cams.

135. In a machine for shaping uppers over lasts, means for positioning a last for the shaping of an upper thereover, a plurality of grippers for gripping the marginal portion of the upper and for pulling the upper, fluid-operated means for closing said grippers on the upper, additional fluid-operated means for moving the grippers to pull the upper, valves for admitting operating fluid respectively to said different fluid-operated means, cams rotatable in unison to operate said valves, a controlling member movable by the operator, means controlled by said member for turning said cams through a partial revolution to cause the grippers thus to close and to pull the upper, wipers for thereafter wiping the marginal portion of the upper inwardly over the bottom of the last, a clutch through which said wipers are operated, another controlling member movable by the operator to actuate said clutch, and means also operated through said clutch for completing the revolution of said cams.

136. In a machine for shaping uppers over lasts, means for positioning a last for the shaping of an upper thereover, a plurality of grippers having upper-gripping jaws and mounted for movements heightwise of the last to pull the upper, fluid-operated means for imparting to said grippers positioning movements relatively to the last and for thereafter effecting relative closing movements of their jaws, additional fluid-operated means for operating said grippers to pull the upper, valves for admitting operating fluid to said different fluid-operated means, cams rotatable in unison to operate said valves, a controlling member movable by the operator, means for turning said cams through a partial revolution in response to three successive movements of said controlling member to cause respectively the positioning movements of the grippers, the relative closing movements of their jaws and their upper-pulling movements, wipers for thereafter wiping the marginal portion of the upper inwardly over the bottom of the last, a clutch through which said wipers are operated, another controlling member movable by the operator to actuate said clutch, and means also operated through said clutch for completing the revolution of said cams.

137. In a machine for shaping uppers over lasts, means for positioning a last for the shaping of an upper thereover, a heel rest arranged to engage the upper on the heel end of the last to support the last and shoe against lengthwise displacement in a heelward direction, said heel rest being movably mounted to permit it to assume a position determined by the position of the last, ball-lasting devices arranged ot act on the shoe respectively in locations where the edge of the shoe bottom curves inwardly toward the shank beyond the ball line at the opposite sides of the shoe, and means for positioning said devices lengthwise of the shoe as determined by the position of the heel rest prior to their operation on the shoe.

138. In a machine for shaping uppers over lasts, means for positioning a last for the shaping of an upper thereover, a heel rest arranged to engage the upper on the heel end of the last to support the last and shoe against lengthwise displacement in a heelward direction, said heel rest being movably mounted to permit it to assume a position determined by the position of the last, ball-lasting devices arranged to act on the shoe respectively in locations where the edge of the shoe bottom curves inwardly toward the shank beyond the ball line at the opposite sides of the shoe, said devices being adjustable relatively to each other lengthwise of the shoe, and means for moving the devices lengthwise of each shoe after such adjustment to positions determined by the position of the heel rest prior to their operation on the shoe.

139. In a machine for shaping uppers over lasts, means for positioning a last for the shaping of an upper thereover, a heel rest arranged to engage the upper on the heel end of the last to support the last and shoe against lengthwise displacement in a heelward direction, said heel rest being movably mounted to permit it to assume a position determined by the position of the last, a heel rest holder arranged to be moved relatively to the heel rest lengthwise of each shoe into position to hold the heel rest against displacement by the shoe, and ball-lasting devices arranged to act on the shoe respectively in locations where the edge of the shoe bottom curves inwardly toward the shank beyond the ball line at the opposite sides of the shoe, said devices being mounted for movements lengthwise of each shoe with said heel rest holder to positions determined by the position of the heel rest prior to their operation on the shoe.

140. In a machine for shaping uppers over lasts, means for positioning a last for the shaping of an upper thereover, a heel rest arranged to engage the upper on the heel end of the last to support the last and shoe against lengthwise displacement in a heelward direction, said heel rest being movably mounted to permit it to assume a position determined by the position of the last, a heel rest holder, means for moving said holder relatively to the heel rest lengthwise of each shoe into position to hold the heel rest against displacement by the shoe, ball-lasting devices arranged to act on the shoe respectively in locations where the edge of the shoe bottom curves inwardly toward the shank beyond the ball line at the opposite sides of the shoe, and connections between said devices and the means for thus moving said heel rest holder for moving the devices lengthwise of the shoe with the holder to positions determined by the position of the heel rest prior to their operation on the shoe.

141. In a machine for shaping uppers over lasts, means for positioning a last for the shaping of an upper thereover, a heel rest arranged to engage the upper on the heel end of the last to support the last and shoe against lengthwise displacement in a heelward direction, said heel rest being movably mounted to permit it to assume a position determined by the position of the last, a heel rest holder, means for moving said holder relatively to the heel rest lengthwise of each shoe into position to hold the heel rest against displacement by the shoe, ball-lasting devices arranged to act on the shoe respectively in locations where the edge of the shoe bottom curves inwardly toward the shank beyond the ball line at the opposite sides of the shoe, means for adjusting said devices relatively to each other lengthwise of the shoe, and means for moving the devices after such adjustment lengthwise of the shoe with said heel rest holder to positions determined by the position of the heel rest prior to their operation on the shoe.

142. In a machine for shaping uppers over lasts, means for positioning a last for the shaping of an upper thereover, a heel rest arranged to engage the upper on the heel end of the last to support the last and shoe against lengthwise displacement in a heelward direction, said heel rest being movably mounted to permit it to assume a position determined by the position of the last, ball-lasting units arranged to act on the shoe respectively in locations where the edge of the shoe bottom curves inwardly toward the shank beyond the ball line at the opposite sides of the shoe, each of said units including a gripper for pulling the upper and means for wiping the upper inwardly over an insole on the last, and means for positioning said units lengthwise of the shoe as determined by the position of the heel rest prior to their operation on the shoe.

143. In a machine for shaping uppers over lasts, means for positioning a last for the shaping of an upper thereover, a heel rest arranged to engage the upper on the heel end of the last to support the last and shoe against lengthwise displacement in a heelward direction, said heel rest being movably mounted to permit it to assume a position determined by the position of the last, ball-lasting units arranged to act on the shoe respectively in locations where the edge of the shoe bottom curves inwardly toward the shank beyond the ball line at the opposite sides of the shoe, each of said units including a gripper for pulling the upper and means for wiping the upper inwardly over an insole on the last, and means for moving said units relatively to the heel rest lengthwise of each shoe to positions determined by the position of the heel rest prior to their operation on the shoe.

144. In a machine for shaping uppers over lasts, means for positioning a last and shoe lengthwise for the operation of the machine thereon, ball-lasting units arranged to act on the shoe respectively in locations where the edge of the shoe bottom curves inwardly toward the shank beyond the ball line at the opposite sides of the shoe, said units being mounted for positioning movements lengthwise of the shoe, and members carried by said units and positioned thereby lengthwise of the shoe for engaging the opposite side portions of the bottom of the forepart of the shoe to assist in positioning the shoe heightwise.

145. In a machine for shaping uppers over lasts, means for positioning a last and shoe lengthwise for the operation of the machine thereon, ball-lasting units arranged to act on the shoe respectively in locations where the edge of the shoe bottom curves inwardly toward the shank beyond the ball line at the opposite sides of the shoe, said units being adjustable relatively to each other lengthwise of the shoe to different positions for operating respectively on right and left shoes, and members carried by said units and positioned thereby lengthwise of each right or left shoe for engaging the opposite side portions of the bottom of the forepart of the shoe to assist in positioning the shoe heightwise.

146. In a machine for shaping uppers over lasts, means for positioning a last and shoe lengthwise for the operation of the machine thereon, ball-lasting units arranged to act on the shoe respectively in locations where the edge of the shoe bottom curves inwardly toward the shank beyond the ball line at the opposite sides of the shoe, means for moving said units lengthwise of each shoe toward its toe end to predetermined positions prior to their operation on the shoe, and members carried by said units and positioned thereby lengthwise of the shoe for engaging the opposite side portions of the bottom of the forepart of the shoe to assist in positioning the shoe heightwise.

147. In a machine for shaping uppers over lasts, means for positioning a last and shoe lengthwise for the operation of the machine thereon, a heel rest arranged to engage the heel end of the shoe to support the shoe against lengthwise displacement in a heelward direction, said heel rest being movably mounted to permit it to assume a position determined by the position of the shoe, ball-lasting units arranged to act on the shoe respectively in locations where the edge of the shoe bottom curves inwardly toward the shank beyond the ball line at the opposite sides of the shoe, means for moving said units lengthwise of each shoe to positions determined by the position of the heel rest prior to their operation on the shoe, and members carried by said units and positioned thereby lengthwise of the shoe for engaging the opposite side portions of the bottom of the forepart of the shoe to assist in positioning the shoe heightwise.

148. In a machine for shaping uppers over lasts, grippers arranged to grip the marginal portion of an upper on a last and to pull the upper at the opposite sides of the ball portion of the last respectively, members associated respectively with said different grippers and movable for first closing them on the upper and for thereafter by continued movements operating them to pull the upper, other members associated respectively with the different grippers for holding them against upper-pulling movements until after they have closed on the upper, stop members arranged to abut against said other members to hold the latter against movements until after the closing of the grippers, and means for thereafter moving said stop members to free said other members for movements and thus to permit the upper-pulling movements of the grippers.

149. In a machine for shaping uppers over lasts, grippers arranged to grip the marginal portion of an upper on a last and to pull the upper at the opposite sides of the ball portion of the last respectively, members associated respectively with said different grippers and movable for first closing them on the upper and for thereafter by continued movements operating them to pull the upper, other members associated respectively with the different grippers for holding them against upper-pulling movements until after they have closed on the upper, springs arranged to be subjected to stress by the gripper-closing movements of said first-named members and thereafter to impart gripper-releasing movements to said other members, and means for holding said other members against such movements until after the closing of the grippers and for then releasing them to the action of said springs.

150. In a machine for shaping uppers over lasts, grippers arranged to grip the marginal portion of an upper on a last and to pull the upper at the opposite sides of the ball portion of the last respectively, levers associated respectively with said different grippers and movable for first closing them on the upper and for thereafter by continued movements operating them to pull the upper, other levers associated respectively with the different grippers for holding them against upper-pulling movements until after they have closed on the upper, and means for holding said other levers against movements until after the closing of the grippers and for thereafter freeing them for movements to permit the upper-pulling movements of the grippers.

151. In a machine for shaping uppers over lasts, grippers arranged to grip the marginal portion of an upper on a last and to pull the upper at the opposite sides of the ball portion of the last respectively, levers associated respectively with said different grippers and movable for first closing them on the upper and for thereafter by continued movements operating them to pull the upper, other levers associated respectively with the different grippers for holding them against upper-pulling movements until after they have closed on the upper, springs arranged to be subjected to stress by the gripper-closing movements of said first-named levers and thereafter to impart gripper-releasing movements to said other levers, and means for holding said other levers against such movements until after the closing of the grippers and for then releasing them to the action of said springs.

152. In a machine for shaping uppers over lasts, grippers arranged to grip the marginal portion of an upper on a last and to pull the upper at the opposite sides of the ball portion of the last respectively, members associated respectively with said different grippers and movable for first closing them on the upper and for thereafter by continued movements operating them to pull the upper, other members associated respectively with the different grippers for holding them against upper-pulling movements until after they have closed on the upper, wipers associated respectively with the different grippers for wiping the marginal portion of the upper inwardly over an insole on the last, means for thus operating said wipers, and means controlled by said wiper-operating means for holding said other members against movements until after the closing of the grippers and for then releasing them to permit the upper-pulling movements of the grippers.

153. In a machine for shaping uppers over lasts, grippers arranged to grip the marginal portion of an upper on a last and to pull the upper at the opposite sides of the ball portion of the last respectively, levers associated respectively with said different grippers and movable for first closing them on the upper and for thereafter by continued movements operating them to pull the upper, other levers associated respectively with the different grippers for holding them against upper-pulling movements until after they have closed on the upper, wipers associated respectively with the different grippers for wiping the marginal portion of the upper inwardly over an insole on the last, means for thus operating said wipers, and means controlled by said wiper-operating means for holding said other levers against movements until after the closing of the grippers and for then releasing them to permit the upper-pulling movements of the grippers.

154. In a machine for shaping uppers over lasts, grippers arranged to grip the marginal portion of an upper on a last and to pull the upper at the opposite sides of the ball portion of the last respectively, levers associated respectively with said different grippers and movable for first closing them on the upper and for thereafter by continued movements operating them to pull the upper, other levers associated respectively with the different grippers for holding them against upper-pulling movements until after they have closed on the upper, wipers associated respectively with the different grippers for wiping the marginal portion of the upper inwardly over an insole on the last, mechanisms for thus operating said wipers, and stop members carried by said wiper-operating mechanisms for holding said other levers against movements until after the closing of the grippers and for then releasing them in time relation to the movements of the wipers.

155. In a machine for shaping uppers over lasts, a pair of gripper jaws arranged to grip the marginal portion of an upper on a last and to pull the upper, a gripper casing on which said jaws are mounted for relative closing movement to grip the upper, a gripper bar slidingly movable in said casing to effect the relative closing movement of the jaws and further movable thereafter to impart upper-pulling movement to the casing and the jaws, a member for thus operating said gripper bar, another member arranged to hold the gripper casing initially against movement, and means for holding said other member stationary until after the relative closing movement of the jaws and for thereafter releasing it for movement to permit the upper-pulling movement of the jaws by said first-named member.

156. In a machine for shaping uppers over lasts, a pair of gripper jaws arranged to grip the marginal portion of an upper on a last and to pull the upper, a gripper casing on which said jaws are mounted for relative closing movement to grip the upper, a gripper bar movable relatively to said casing to effect the relative closing movement of the jaws and further movable thereafter to impart upper-pulling movement to the casing and the jaws, a member for thus operating said gripper bar, another member arranged to hold the gripper casing initially against movement, a spring arranged to be subjected to stress by the jaw-closing movement of said first-named member and thereafter to impart to said other member movement to release the casing, and means for holding said other member against movement until after the relative closing movement of the jaws and for then releasing it to the action of said spring.

157. In a machine for shaping uppers over lasts, a pair of gripper jaws arranged to grip the marginal portion of an upper on a last and to pull the upper, a gripper casing on which said jaws are mounted for relative closing movement to grip the upper, a gripper bar movable relatively to said casing to effect the relative closing movement of the jaws and further movable thereafter to impart upper-pulling movement to the casing and the jaws, a lever for thus operating said gripper bar, another lever arranged to hold the gripper casing initially against movement, and means for holding said other lever stationary until after the relative closing movement of the jaws and for then releasing it to permit the upper-pulling movement of the jaws by said first-named lever.

158. In a machine for shaping uppers over lasts, a pair of gripper jaws arranged to grip the marginal portion of an upper on a last and to pull the upper, a gripper casing on which said jaws are mounted for relative closing movement to grip the upper, a gripper bar movable relatively to said casing to effect the relative closing movement of the jaws and further movable thereafter to impart upper-pulling movement to the casing and the jaws, a lever for thus operating said gripper bar, another lever arranged to hold the gripper casing initially against movement, a spring arranged to be subjected to stress by the jaw-closing movement of said first-named lever and thereafter to impart to said other lever movement to release the casing, and means for holding said other lever against such movement until after the relative closing movement of the jaws and for then releasing it to the action of said spring.

159. In a machine for shaping uppers over lasts, a pair of gripper jaws arranged to grip the marginal portion of an upper on a last and to pull the upper, a gripper casing on which said jaws are mounted for relative closing movement to grip the upper, a gripper bar movable relatively to said casing to effect the relative closing movement of the jaws and further movable thereafter to impart upper-pulling movement to the casing and the jaws, a lever for thus operating said gripper bar, another lever arranged to hold the gripper casing initially against movement, a stop member for holding said other lever stationary until after the relative closing movement of the jaws, and means for then moving said stop member to release said other lever and thus to permit the upper-pulling movement of the jaws by said first-named lever.

160. In a machine for shaping uppers over lasts, a pair of gripper jaws arranged to grip the marginal portion of an upper on a last and to pull the upper, a gripper casing on which said jaws are mounted for relative closing movement to grip the upper, a gripper bar movable relatively to said casing to effect the relative closing movement of the jaws and further movable thereafter to impart upper-pulling movement to the casing and the jaws, a lever for thus operating said gripper bar, fluid-pressure means for operating said lever, another lever arranged to hold the gripper casing initially against movement, and cam-operated means for holding said other lever stationary until after the relative closing movement of the jaws and for then releasing it to permit the upper-pulling movement of the jaws by said first-named lever.

161. In a machine for shaping uppers over lasts, grippers arranged to grip the marginal portion of an upper on a last and to pull the upper at the opposite sides of the ball portion of the last respectively, members associated respectively with said different grippers and movable for first closing them on the upper and for thereafter by continued movements operating them to pull the upper, and fluid-pressure means constructed and arranged to operate said members thus to close the grippers and thereafter to operate them with reduced force to pull the upper.

162. In a machine for shaping uppers over lasts, grippers arranged to grip the marginal portion of an upper on a last and to pull the upper at the opposite sides of the ball portion of the last respectively, members associated respectively with said different grippers and movable for first closing them on the upper and for thereafter by continued movements operating them to pull the upper, cylinders associated respectively with the different grippers and each having therein a pair of fluid-operated pistons, one within the other, for operating the member associated with the corresponding gripper to close the gripper, and means for rendering one piston alone of each pair thereafter effective on the corresponding gripper in the pulling of the upper.

163. In a machine for shaping uppers over lasts, a gripper arranged to grip the marginal portion of an upper on a last and to pull the upper, a member movable for first closing said gripper on the upper and for thereafter by further movement operating it to pull the upper, and fluid pressure means for operating said member thus to close the gripper and for thereafter operating it with reduced force to effect the pulling of the upper.

164. In a machine for shaping uppers over lasts, a gripper arranged to grip the marginal portion of an upper on a last and to pull the upper, a lever movable for first closing said gripper on the upper and for thereafter by further movement operating it to pull the upper, a pair of members movable by pressure of fluid thereon for operating said lever to close the gripper, and means for stopping the movement of one only of said members after the gripping of the upper to cause said lever to be operated with reduced force by the other member alone to effect the pulling of the upper.

165. In a machine for shaping uppers over lasts, a gripper arranged to grip the marginal portion of an upper on a last and to pull the upper, a member movable for first closing said gripper on the upper and for thereafter by further movement operating it to pull the upper, a cylinder having therein a pair of pistons, one within the other, for operating said member by fluid pressure to close the gripper, and means for stopping the movement of one only of said pistons after the gripping of the upper to cause said member to be operated with reduced force by the other piston alone to effect the pulling of the upper.

166. In a machine for shaping uppers over lasts, a pair of gripper jaws arranged to grip the marginal portion of an upper on a last and to pull the upper, a gripper casing on which said jaws are mounted for relative closing movement to grip the upper, a gripper bar movable relatively to said casing to effect the relative closing movement of the jaws and further movable thereafter to impart upper-pulling movement to the casing and the jaws, a lever for thus operating said gripper bar, means for holding said casing against movement until after the relative closing movement of the jaws and for then releasing it, and fluid-pressure means for operating said lever to effect the relative closing movement of the jaws and for thereafter operating it with reduced force to effect the pulling of the upper.

167. In a machine for shaping uppers over lasts, a pair of gripper jaws arranged to grip the marginal portion of an upper on a last and to pull the upper, a gripper casing on which said jaws are mounted for relative closing movement to grip the upper, a gripper bar movable relatively to said casing to effect the relative closing movement of the jaws and further movable thereafter to impart upper-pulling movement to the casing and the jaws, a lever for thus operating said gripper bar, means for holding said casing against movement until after the relative closing movement of the jaws and for then releasing it, a cylinder having therein a pair of pistons, one within the other, for operating said lever by fluid pressure to effect the relative closing movement of the jaws, and means for thereafter stopping the movement of one only of said pistons to cause said lever to be operated with reduced force by the other piston alone to effect the pulling of the upper.

168. In a machine for shaping uppers over lasts, means for positioning a last having an upper and an insole thereon, wipers arranged respectively to wipe the marginal portion of the upper inwardly over the insole in locations where the edge of the shoe bottom curves inwardly toward the shank beyond the ball line at the opposite sides of the shoe, means for imparting to said wipers preliminary movements lengthwise of the shoe to position them relatively to the shoe, means for causing the wipers thereafter to move heightwise of the shoe further to position them prior to their operation on the upper, and members movable heightwise of the shoe with the wipers into engagement with the insole to limit their positioning movements in that direction.

169. In a machine for shaping uppers over lasts, means for positioning a last having an upper and an insole thereon, wipers arranged respectively to wipe the marginal portion of the upper inwardly over the insole in locations where the edge of the shoe bottom curves inwardly toward the shank beyond the ball line at the opposite sides of the shoe, supports for said wipers relatively to which they are movable thus to act on the upper, means for moving said supports and wipers preliminarily lengthwise of the shoe to position the wipers relatively to the shoe, said supports being mounted for movements also heightwise of the shoe, means for thus moving said supports to position the wipers in that respect relatively to the shoe prior to their operation on the upper, and members carried by said supports for limiting the positioning movements of the wipers heightwise of the shoe by engagement with the insole.

170. In a machine for shaping uppers over lasts, means for positioning a last having an upper and an insole thereon, wipers arranged respectively to wipe the marginal portion of the upper inwardly over the insole in locations where the edge of the shoe bottom curves inwardly toward the shank beyond the ball line at the opposite sides of the shoe, means for causing said wipers to move heightwise of the shoe to position them relatively to the shoe prior to their operation on the upper, and members movable heightwise of the shoe with the wipers into engagement with the insole to limit their positioning movements.

171. In a machine for shaping uppers over lasts, means for positioning a last having an upper and an insole thereon, wipers arranged respectively to wipe the marginal portion of the upper inwardly over the insole in locations where the edge of the shoe bottom curves inwardly toward the shank beyond the ball line at the opposite sides of the shoe, means for causing said wipers to move heightwise of the shoe to position them relatively to the shoe prior to their operation on the upper, and members movable heightwise of the shoe with the wipers into engagement with the insole to limit their positioning movements, said members being displaceable away from the insole by the inward movements of the wipers to permit the wipers to be pressed more firmly against the upper.

172. In a machine for shaping uppers over lasts, means for positioning a last having an upper and an insole thereon, wipers arranged respectively to wipe the marginal portion of the upper inwardly over the insole in locations where the edge of the shoe bottom curves inwardly toward the shank beyond the ball line at the opposite sides of the shoe, means for moving the wipers heightwise of the shoe to position them relatively to the shoe prior to their operation on the upper, and members movable heightwise of the shoe with the wipers into engagement with the marginal portion of the insole in the paths of the inward movements of the wipers to limit their positioning movements, said members being mounted for movements away from the insole by the inward movements of the wipers to permit the wipers to be pressed more firmly against the upper by the means for moving them heightwise of the shoe.

173. In a machine for shaping uppers over lasts, means for positioning a last having an upper and an insole thereon, a wiper movable to wipe the marginal portion of the upper inwardly over the insole, means for moving said wiper heightwise of the shoe to position it relatively to the shoe prior to its inward movement over the insole, and a member movable heightwise of the shoe with the wiper into engagement with the insole to limit the positioning movement of the wiper, said member being displaceable away from the insole by the inward movement of the wiper to permit the wiper to be pressed more firmly against the upper.

174. In a machine for shaping uppers over lasts, means for positioning a last having an upper and an insole thereon, a wiper movable to wipe the marginal portion of the upper inwardly over the insole, a support for said wiper relatively to which it is thus movable inwardly over the insole, said support being mounted for movement heightwise of the shoe, means for thus moving said support to position the wiper heightwise of the shoe prior to its action on the upper, and a member carried by said support for engaging the marginal portion of the insole in the path of the inward movement of the wiper, said member being displaceable away from the insole by the inward movement of the wiper to cause the wiper to be pressed more firmly against the upper by the means for moving said support heightwise of the shoe.

175. In a machine for shaping uppers over lasts, means for positioning a last having an upper and an insole thereon, a wiper movable to wipe the marginal portion of the upper inwardly over the insole, a support for said wiper relatively to which it is thus movable inwardly over the insole, said support being mounted for movement heightwise of the shoe, means including a spring for thus moving said support to position the wiper relatively to the shoe prior to its action on the upper, and a member mounted on said support for engaging the marginal portion of the insole in the path of the inward movement of the wiper to limit such movement of the support, said member being pivotally mounted for movement away from the insole by the inward movement of the wiper to cause the wiper to be pressed more firmly against the upper by said spring.

176. In a machine for shaping uppers over lasts, means for positioning a last having an upper and an insole thereon, wipers arranged respectively to wipe the marginal portion of the upper inwardly over the insole in locations where the edge of the shoe bottom curves inwardly toward the shank beyond the ball line at the opposite sides of the shoe, means for moving said wipers inwardly thus to act on the upper, other wipers arranged to wipe the marginal portion of the upper inwardly over the insole around the toe and along the sides of the forepart far enough lengthwise of the shoe to extend over portions of the upper already wiped inwardly by said first-named wipers, and means for causing the first-named wipers to move heightwise of the shoe away from the portions of the upper engaged thereby before said other wipers arrive in positions to extend over those portions of the upper.

177. In a machine for shaping uppers over lasts, means for positioning a last having an upper and an insole thereon, wipers arranged respectively to wipe the marginal portion of the upper inwardly over the insole in locations where the edge of the shoe bottom curves inwardly toward the shank beyond the ball line at the opposite sides of the shoe, means for moving said wipers inwardly thus to act on the upper, said wipers being supported also for positioning movements heightwise of the shoe, other wipers arranged to wipe the marginal portion of the upper inwardly over the insole around the toe and along the sides of the forepart far enough lengthwise of the shoe to extend over portions of the margin of the upper already wiped inwardly by said first-named wipers, and cam-controlled means for first moving the first-named wipers heightwise of the shoe to position them relatively to the shoe and for causing them thereafter to move reversely heightwise of the shoe away from the portions of the upper engaged thereby before said other wipers arrive in positions to extend over those portions of the upper.

178. In a machine for shaping uppers over lasts, means for positioning a last having an upper and an insole thereon, wipers arranged respectively to wipe the marginal portion of the upper inwardly over the insole in locations where the edge of the shoe bottom curves inwardly toward the shank beyond the ball line at the opposite sides of the shoe, supports for said wipers relatively to which they are inwardly movable thus to act on the upper, said supports being pivotally mounted for movements heightwise of the shoe, other wipers arranged to wipe the marginal portion of the upper inwardly over the insole around the toe and along the sides of the forepart far enough lengthwise of the shoe to extend over portions of the upper already wiped inwardly by said first-named wipers, and means for causing said wiper supports to swing heightwise of the shoe to carry the first-named wipers away from the portions of the upper engaged thereby before said other wipers arrive in positions to extend over those portions of the upper.

179. In a machine for shaping uppers over lasts, the combination with means for positioning a last having an upper and an insole thereon, of different pairs of wipers arranged respectively to wipe the marginal portion of the upper inwardly over the insole in locations at the opposite sides of the ball portion of the shoe including locations where the edge of the shoe bottom curves inwardly toward the shank beyond the ball line, each of said pairs of wipers including a wiper arranged to extend initially farther toward the toe end of the shoe than the other wiper, means for moving both wipers of each pair in unison obliquely widthwise of the shoe and lengthwise thereof toward its toe end substantially into positions to begin the wiping of the upper over the insole, and means for thereafter causing the first-named wiper to move more directly widthwise of the shoe in wiping engagement with the upper during continued movement of the other wiper in the same oblique direction.

180. In a machine for shaping uppers over lasts, the combination with means for positioning a last having an upper and an insole thereon, of different pairs of wipers arranged respectively to wipe the marginal portion of the upper inwardly over the insole in locations at the opposite sides of the ball portion of the shoe including locations where the edge of the shoe bottom curves inwardly towards the shank beyond the ball line, each of said pairs of wipers including a wiper arranged to extend initially farther toward the toe end of the shoe than the other wiper, means for moving both wipers of each pair in unison obliquely widthwise of the shoe and lengthwise thereof toward its toe end substantially into positions to begin the wiping of the upper over the insole, and means for thereafter causing the first-named wiper to move more directly widthwise of the shoe in wiping engagement with the upper during continued movement of the other wiper in the same oblique direction, said other wiper having therein a recess arranged to receive the first-named wiper in response to such relative movement of the wipers.

181. In a machine for shaping uppers over lasts, the combination with means for positioning a last having an upper and an insole thereon, of different pairs of wipers arranged respectively to wipe the marginal portion of the upper inwardly over the insole in locations at the opposite sides of the ball portion of the shoe including locations where the edge of the shoe bottom curves inwardly toward the shank beyond the ball line, each of said pairs of wipers including a wiper arranged to extend initially farther toward the toe end of the shoe than the other wiper, each pair having associated therewith a member movable obliquely widthwise of the shoe and lengthwise thereof toward its toe end to carry both wipers substantially into positions to begin the wiping of the upper over the insole, and means for thereafter deflecting the first-named wiper in a path more directly widthwise of the shoe in wiping engagement with the upper in response to continued movement of said member and the other wiper in the same oblique direction.

182. In a machine for shaping uppers over lasts, the combination with means for positioning a last having an upper and an insole thereon, of different pairs of wipers arranged respectively to wipe the marginal portion of the upper inwardly over the insole in locations at the opposite sides of the ball portion of the shoe including locations where the edge of the shoe bottom curves inwardly toward the shank beyond the ball line, each of said pairs of wipers including a wiper arranged to extend initially farther toward the toe end of the shoe than the other wiper, each pair having associated therewith a member movable obliquely widthwise of the shoe and lengthwise thereof towards its toe end to carry both wipers substantially into positions to begin the wiping of the upper over the insole, and a support relatively to which said member is thus movable, said support being provided with guiding means extending generally widthwise of the shoe for thereafter guiding the first-named wiper to move more directly widthwise of the shoe in wiping engagement with the upper in response to continued movement of said member and the other wiper in the same oblique direction.

183. In a machine for shaping uppers over lasts, the combination with means for positioning a last having an upper and an insole thereon, of different pairs of wipers arranged respectively to wipe the marginal portion of the upper inwardly over the insole in locations at the opposite sides of the ball portion of the shoe including locations where the edge of the shoe bottom curves inwardly toward the shank beyond the ball line, each of said pairs of wipers including a wiper arranged to extend initially further toward the toe end of the shoe than the other wiper, each pair having associated therewith a member movable obliquely widthwise of the shoe and lengthwise thereof towards its toe end to carry both wipers substantially into positions to begin the wiping of the upper over the insole, said other wiper being secured to said member and the first-named wiper being movably supported by said member, and guiding means relatively to which said member is thus movable for thereafter causing the first-named wiper to move relatively to the member in a path more directly widthwise of the shoe in wiping engagement with the upper in response to continued movement of said member and the other wiper in the same oblique direction.

184. In a machine for shaping uppers over lasts, the combination with means for positioning a last having an upper and an insole thereon, of different pairs of wipers arranged respectively to wipe the marginal portion of the upper inwardly over the insole in locations at the opposite sides of the ball portion of the shoe including locations where the edge of the shoe bottom curves inwardly toward the shank beyond the ball line, each of said pairs of wipers including a wiper arranged to extend initially farther toward the toe end of the shoe than the other wiper, each pair having associated therewith a slide mounted for rectilinear movement obliquely widthwise of the shoe and lengthwise thereof toward its toe end to carry both wipers substantially into positions to begin the wiping of the upper over the insole, and means relatively to which said slide is thus movable for thereafter deflecting the first-named wiper in a path more directly widthwise of the shoe in wiping engagement with the upper in response to continued movement of said slide and the other wiper in the same oblique direction.

185. In a machine for shaping uppers over lasts, the combination with means for positioning a last having an upper and an insole thereon, of different pairs of wipers arranged respectively to wipe the marginal portion of the upper inwardly over the insole in locations at the opposite sides of the ball portion of the shoe including locations where the edge of the shoe bottom curves inwardly toward the shank beyond the ball line, each of said pairs of wipers including a wiper arranged to extend initially farther toward the toe end of the shoe than the other wiper, each pair having associated therewith a slide mounted for rectilinear movement obliquely widthwise of the shoe and lengthwise thereof toward its toe end to carry both wipers substantially into positions to begin the wiping of the upper over the insole, a support along which said slide is thus movable, said other wiper being secured to said slide, a second slide carried by said first-named slide and to which the first-named wiper is secured, the second slide being movably mounted on a guideway extending generally lengthwise of the shoe on the first slide, said support having therein a slot extending generally widthwise of the shoe, and means carried by the second slide and arranged to extend into said slot for causing the first-named wiper to be deflected by the slot more directly widthwise of the shoe in wiping engagement with the upper in response to continued movement of the first-named slide and said other wiper in the same oblique direction.

186. In a machine for shaping uppers over lasts, grippers arranged to grip the marginal portion of an upper on a last and to pull the upper at opposite sides of the last respectively, means for operating said grippers thus to pull the upper, wipers movable to wipe the marginal portion of the upper acted upon by said grippers inwardly over an insole on the last, means for thus moving said wipers, and means responsive to resistance of the upper held under tension by the grippers to the inward movements of the wipers for causing the grippers to release the upper.

187. In a machine for shaping uppers over lasts, grippers arranged to grip the marginal portion of an upper on a last and to pull the upper at opposite sides of the last respectively, means for operating said grippers thus to pull the upper, wipers movable to wipe the marginal portion of the upper acted upon by said grippers inwardly over an insole on the last, operating means for thus moving said wipers, said wiper-operating means comprising members relatively movable in response to resistance of the upper held under tension by the grippers to the inward movements of the wipers, and means responsive to the relative movements of said members for causing the grippers to release the upper.

188. In a machine for shaping uppers over lasts, grippers arranged to grip the marginal portion of an upper on a last and to pull the upper at opposite sides of the last respectively, fluid-pressure means for operating said grippers thus to grip and pull the upper, wipers movable to wipe the marginal portion of the upper acted upon by said grippers inwardly over an insole on the last, operating means for thus moving said wipers, and valve means responsive to resistance of the upper held under tension by the grippers to the inward movements of the wipers for releasing fluid from said fluid-pressure means and for thereby causing the grippers to release the upper.

189. In a machine for shaping uppers over lasts, grippers arranged to grip the marginal portion of an upper on a last and to pull the upper at the opposite sides of the last respectively, fluid-pressure means for operating said grippers thus to grip and pull the upper, wipers movable to wipe the marginal portion of the upper acted upon by said grippers inwardly over an insole on the last, operating means for thus moving said wipers, said wiper-operating means comprising members relatively movable in response to resistance of the upper held under tension by the grippers to the inward movements of the wipers, and valve means responsive to the relative movements of said members for releasing fluid from said fluid-pressure means to cause the grippers to release the upper.

190. In a machine for shaping uppers over lasts, grippers arranged to grip the marginal portion of an upper on a last and to pull the upper at opposite sides of the last respectively, cylinder-and-piston devices associated respectively with the different grippers for operating them by fluid pressure thus to grip and pull the upper, wipers movable to wipe the marginal portion of the upper acted upon by said grippers inwardly over an insole on the last, operating means for thus moving said wipers, valves associated respectively with said different devices and movable to release fluid therefrom and thereby to cause the grippers to release the upper, and means for thus moving said valves in response to resistance of the upper held under tension by the grippers to the inward movements of the wipers.

191. In a machine for shaping uppers over lasts, grippers arranged to grip the marginal portion of an upper on a last and to pull the upper at opposite sides of the last respectively, cylinder-and-piston devices associated respectively with said different grippers for operating them by fluid pressure thus to grip and pull the upper, wipers movable to wipe the marginal portion of the upper acted upon by said grippers inwardly over an insole on the last, operating means for thus moving said wipers, said wiper-operating means comprising members relatively movable in response to resistance of the upper held under tension by the grippers to the inward movements of the wipers, valves associated respectively with said different devices and movable to release fluid therefrom and thereby to cause the grippers to release the upper, and means responsive to the relative movements of said wiper-operating members for thus moving said valves.

192. In a machine for shaping uppers over lasts, grippers arranged to grip the marginal portion of an upper on a last and to pull the upper at opposite sides of the last respectively, cylinder-and-piston devices associated respectively with said different grippers for operating them by fluid pressure thus to grip and pull the upper, a source of fluid under pressure, a valve for admitting fluid from said source to said devices, wipers movable to wipe the marginal portion of the upper acted upon by said grippers inwardly over an insole on the last, operating means for thus moving said wipers, other valves associated respectively with said different devices and movable to release fluid therefrom and thereby to cause the grippers to release the upper, and means responsive to resistance of the upper held under tension by the grippers to the inward movements of the wipers for thus moving said other valves.

193. In a machine for shaping uppers over lasts, a gripper arranged to grip the marginal portion of an upper on a last and to pull the upper, means for operating said gripper thus to pull the upper, a wiper movable to wipe the marginal portion of the upper acted upon by said gripper inwardly over the bottom of the last, means for thus moving said wiper, and means responsive to resistance of the upper held under tension by the gripper to the inward movement of the wiper for causing the gripper to release the upper.

194. In a machine for shaping uppers over lasts, a gripper arranged to grip the marginal portion of an upper on a last and to pull the upper, fluid-pressure means for operating said gripper thus to grip and pull the upper, a wiper movable to wipe the marginal portion of the upper acted upon by said gripper inwardly over the bottom of the lasts, operating means for thus moving said wiper, a valve movable to release fluid from said fluid-pressure means and thereby to cause the gripper to release the upper, and means for thus moving said valve in response to resistance of the upper held under tension by the gripper to the inward movement of the wiper.

195. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a member movable bodily lengthwise of the last thus to close said wipers, said member being mounted for movement about an axis in response to resistance of the shoe to closing movement of one or the other of the wipers to permit them to adjust themselves to the shoe, and means responsive to resistance of the shoe to further closing movements of the wipers after they have thus adjusted themselves to the shoe for locking said member against further movement about said axis and for thus causing the wipers thereafter to be closed equal distances by further bodily movement of said member.

196. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a crossbar connected at its opposite ends respectively to the different wipers and movable bodily thus to close the wipers, said crossbar being pivotally mounted between its opposite ends for swinging movement in response to resistance of the shoe to closing movement of one or the other of the wipers to permit them to adjust themselves to the shoe, and means responsive to resistance of the shoe to further closing movements of the wipers after they have thus adjusted themselves to the shoe for locking said crossbar against further swinging movement and for thus causing the wipers thereafter to be closed equal distances by further bodily movement of the crossbar.

197. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a slide movable lengthwise of the last, a member carried by said slide, separate connections between said member and the different wipers for thus closing them by the movement of the slide, said member being pivotally mounted to move relatively to the slide about an axis extending heightwise of the last in response to resistance of the shoe to closing movement of one or the other of the wipers to permit them to adjust themselves to the shoe, and means carried by said slide and responsive to resistance of the shoe to further closing movements of the wipers after they have thus adjusted themselves to the shoe for locking said member against further movement about said axis and for thus causing the wipers thereafter to be closed equal distances by further movement of the slide.

198. In a machine for shaping uppers over lasts, wipers constructed and arranged to embrace an upper around an end portion of a last and to wipe the marginal portion of the upper inwardly over an insole on the last, wiper holders supporting said wipers and mounted for swinging movements to close them inwardly widthwise of the last, a slide movable lengthwise of the last, a crossbar carried by said slide and extending widthwise of the last, link connections between the opposite ends of said crossbar and the different wiper holders for thus closing the wipers by the movement of the slide, the crossbar being pivotally mounted midway between its opposite ends on the slide for swinging movement about an axis extending heightwise of the last in response to resistance of the upper to closing movement of one or the other of the wipers to permit them to adjust themselves to the shoe, and means carried by the slide and responsive to resistance of the shoe to further closing movements of the wipers after they have thus adjusted themselves to the shoe for locking the crossbar against further movement about said axis and for thus causing the wipers thereafter to be closed equal distances by further movement of the slide.

199. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a member movable bodily thus to close the wipers, said member being mounted for movement about an axis in response to resistance of the shoe to closing movement of one or the other of the wipers to permit them to adjust themselves to the shoe, means for locking said member against further movement about said axis after the wipers have thus adjusted themselves to the shoe and for thus causing them thereafter to be closed equal distances by further bodily movement of said member, and means for rendering said member effective also to advance the wipers bodily lengthwise of the shoe only after they have thus adjusted themselves to the shoe.

200. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a member movable bodily thus to close the wipers, said member being mounted for movement about an axis in response to resistance of the shoe to closing movement of one or the other of the wipers to permit them to adjust themselves to the shoe, means responsive to resistance of the shoe to further closing movements of the wipers after they have thus adjusted themselves to the shoe for locking said member against further movement about said axis during further bodily movement of said member, and means also responsive to resistance of the shoe to the further closing movements of the wipers for rendering said member effective in its further bodily movement also to advance the wipers bodily lengthwise of the shoe.

201. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a crossbar movable bodily lengthwise of the last, link connections between the opposite ends of said crossbar and the different wipers for thus closing them by the bodily movement of the crossbar, the crossbar being mounted between its ends for movement about an axis in response to resistance of the shoe to closing movement of one or the other of the wipers to permit them to adjust themselves to the shoe, mechanism for advancing the wipers bodily lengthwise of the shoe, and means responsive to resistance of the shoe to further closing movements of the wipers after they have thus adjusted themselves to the shoe for rendering said crossbar effective also to operate said wiper-advancing mechanism.

202. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a crossbar movable bodily lengthwise of the last, link connections between the opposite ends of said crossbar and the different wipers for thus closing them by the bodily movement of the crossbar, the crossbar being mounted between its ends for movement about an axis in response to resistance of the shoe to closing movement of one or the other of the wipers to permit them to adjust themselves to the shoe, levers for advancing the wipers bodily lengthwise of the shoe, and means responsive to resistance of the shoe to further closing movements of the wipers after they have thus adjusted themselves to the shoe for rendering said crossbar effective thereafter to operate said levers.

203. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a crossbar movable bodily lengthwise of the last, link connections between the opposite ends of said crossbar and the different wipers for thus closing them by the bodily movement of the crossbar, the crossbar being mounted between its ends for movement about an axis in response to resistance of the shoe to closing movement of one or the other of the wipers to permit them to adjust themselves to the shoe, levers for advancing the wipers bodily lengthwise of the shoe, members connected to said levers and having teeth thereon, and pawls carried by said link connections and arranged to engage said teeth in response to resistance of the shoe to the further closing movements of the wipers after they have thus adjusted themselves to the shoe to render said crossbar effective thereafter to operate said lever.

204. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a crossbar movable bodily lengthwise of the last, link connections between the opposite ends of said crossbar and the different wipers for thus closing them by the bodily movement of the crossbar, the crossbar being mounted between its ends for movement about an axis in response to resistance of the shoe to closing movement of one or the other of the wipers to permit them to adjust themselves to the shoe, a member movable to carry said wipers bodily lengthwise of the shoe, levers mounted independently of said member and connected thereto thus to move the member, blocks connected to said levers and having teeth thereon, and pawls carried by said link connections and arranged to engage said teeth in response to resistance of the shoe to the further closing movements of the wipers after they have thus adjusted themselves to the shoe to render said crossbar effective thereafter to operate said levers.

205. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a wiper carrier movable to advance the wipers bodily lengthwise of the last to positions where they have begun to wipe the margin of the upper inwardly over the insole at the extreme end of the last prior to their closing movements, a member supporting said wipers on the wiper carrier, and means for thereafter moving said member relatively to the wiper carrier lengthwise of the last further to advance the wipers while also imparting to them closing movements widthwise of the last.

206. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a wiper carrier movable to advance the wipers bodily lengthwise of the last to positions where they have begun to wipe the margin of the upper inwardly over the insole at the extreme end of the last prior to their closing movements, a member supporting said wipers on the wiper carrier, said member being movable relatively to the wiper carrier further to advance the wipers, wiper-closing mechasnism constructed and arranged to permit the wipers to adjust themselves to the shoe widthwise thereof and thereafter to close them equal distances, and means for rendering said wiper-closing mechanism effective also to move said member relatively to the wiper carrier and thereby further to advance the wipers only after they have thus adjusted themselves to the shoe.

207. In a machine for shaping uppers over lasts, wipers constructed and arranged to embrace an upper around an end portion of a last and to wipe the marginal portion of the upper inwardly over an insole on the last, said wipers being mounted for closing movements widthwise of the last, a wiper carrier movable to advance the wipers bodily lengthwise of the last to positions where they have begun to wipe the margin of the upper inwardly over the insole at the extreme end of the last prior to their closing movements, a plate supporting said wipers on the wiper carrier, said plate being movable relatively to the wiper carrier further to advance the wipers, a member movable bodily lengthwise of the last to close the wipers, said member being mounted for movement about an axis in response to resistance of the shoe to closing movement of one or the other of the wipers to permit them to adjust themselves to the shoe, means for locking said member against further movement about said axis after the wipers have thus adjusted themselves to the shoe and for thus causing them thereafter to be closed equal distances by further bodily movement of said member, and means for rendering said member effective also to move said plate relatively to the wiper carrier and thereby further to advance the wipers lengthwise of the shoe only after they have thus adjusted themselves to the shoe.

208. In a machine for shaping uppers over lasts, wipers constructed and arranged to embrace an upper around the toe end of a last and to wipe the marginal portion of the upper inwardly over an insole on the last substantially throughout the length of the forepart of the last, means for closing said wipers widthwise of the last each about an axis extending heightwise of the last thus to act on the upper, a toe rest arranged to engage the shoe on the top of the forepart, and a spring for pressing said toe rest on the shoe, said wipers having inwardly curved ends arranged to engage the upper in locations where the bottom of the shoe is inclined toward the shank beyond the ball line before other portions thereof arrive in positions to act on the upper at the sides of the forepart of the shoe and by such engagement to deflect the forepart of the shoe heightwise against the resistance of said spring in their further closing movements.

References Cited in the file of this patent

UNITED STATES PATENTS

| | | |
|---|---|---|
| 594,179 | Preston | Nov. 23, 1897 |
| 1,023,194 | Bohacek | Apr. 16, 1912 |
| 1,274,589 | Pym | Aug. 6, 1918 |
| 1,274,590 | Pym | Aug. 6, 1918 |
| 1,344,316 | Pym | June 22, 1920 |
| 1,382,564 | Sorensen | June 21, 1921 |
| 1,634,510 | Pym | July 5, 1927 |
| 2,210,586 | Kamborian | Aug. 6, 1940 |